FIG. 5

Dec. 30, 1958   A. NELSON ET AL   2,866,550
SEQUENTIALLY CONTROLLED COLLATING REPRODUCER
Filed Sept. 13, 1952   20 Sheets-Sheet 7

INVENTORS.
ARTHUR NELSON
WILLIAM R. SCHWOLOW
BY
ATTORNEYS

Dec. 30, 1958     A. NELSON ET AL     2,866,550

SEQUENTIALLY CONTROLLED COLLATING REPRODUCER

Filed Sept. 13, 1952     20 Sheets-Sheet 8

*INVENTORS.*
ARTHUR NELSON
WILLIAM R. SCHWOLOW
BY
ATTORNEYS

Dec. 30, 1958  A. NELSON ET AL  2,866,550
SEQUENTIALLY CONTROLLED COLLATING REPRODUCER
Filed Sept. 13, 1952  20 Sheets-Sheet 9
FIG. 10.
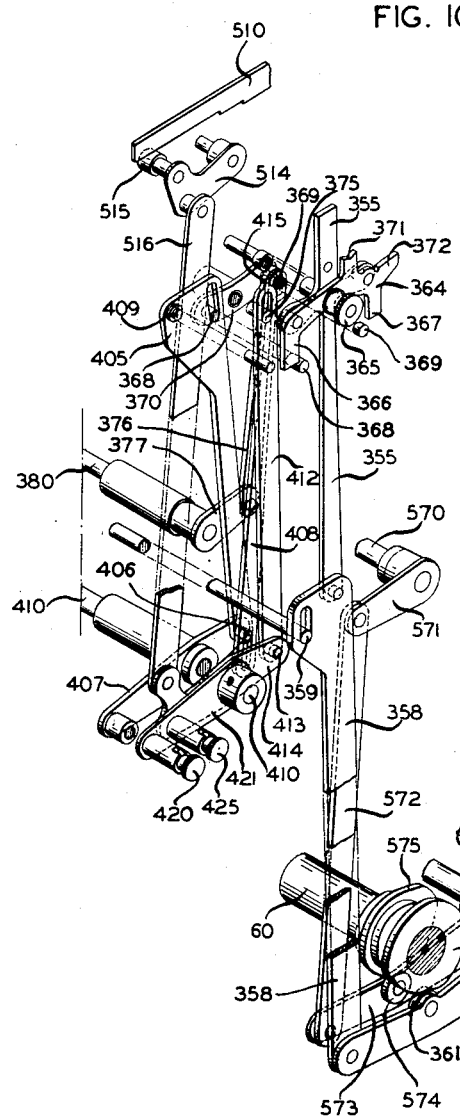
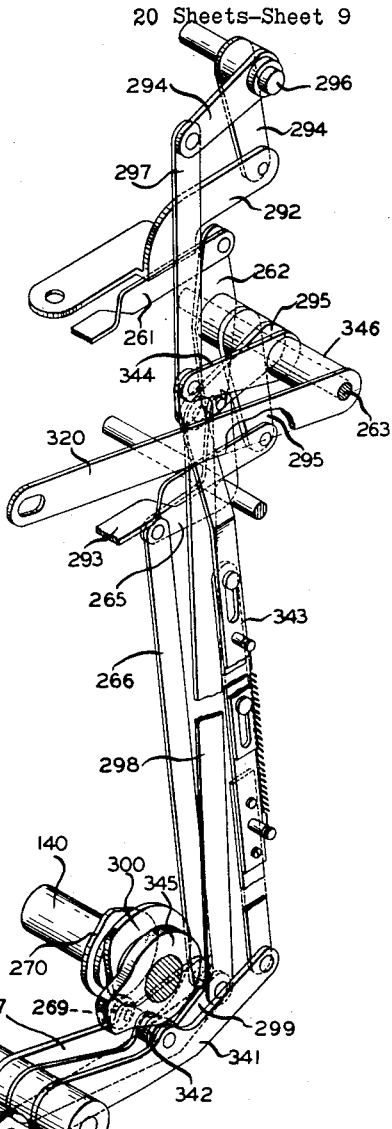
INVENTORS.
ARTHUR NELSON
WILLIAM R. SCHWOLOW
BY
ATTORNEYS

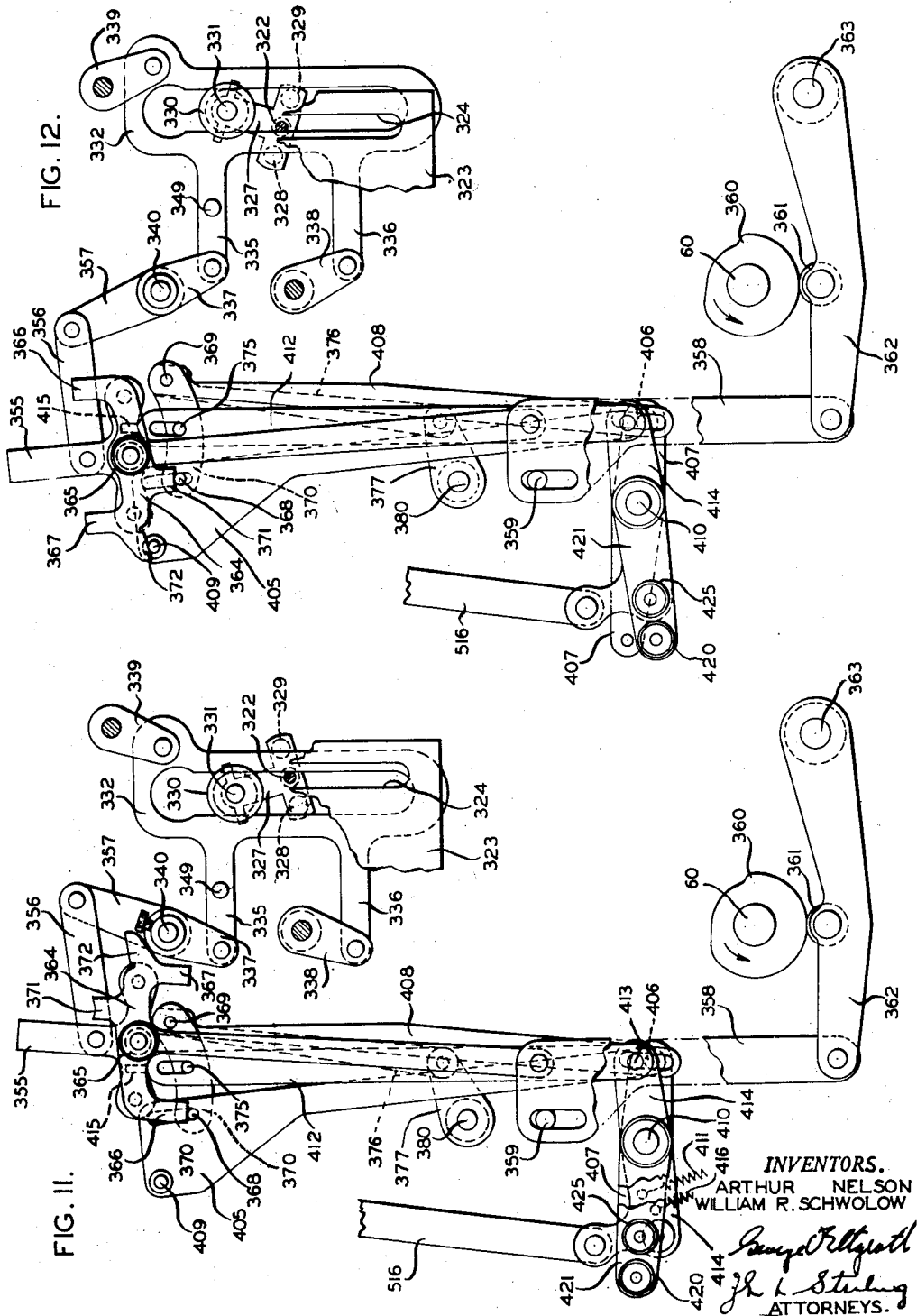

Dec. 30, 1958   A. NELSON ET AL   2,866,550
SEQUENTIALLY CONTROLLED COLLATING REPRODUCER
Filed Sept. 13, 1952   20 Sheets-Sheet 12

INVENTORS.
ARTHUR NELSON
WILLIAM R. SCHWOLOW
BY
ATTORNEYS

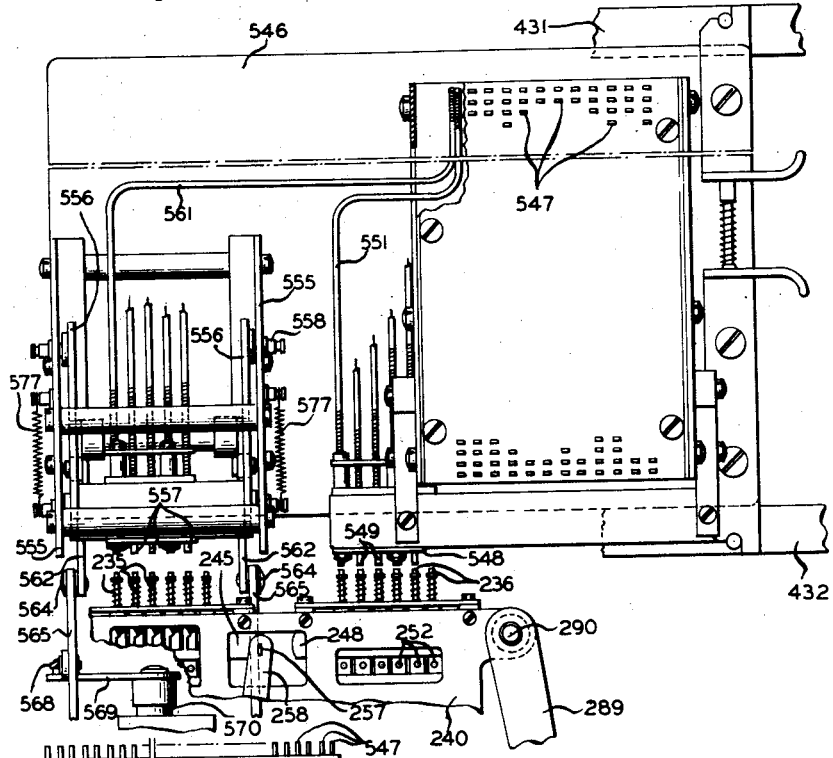
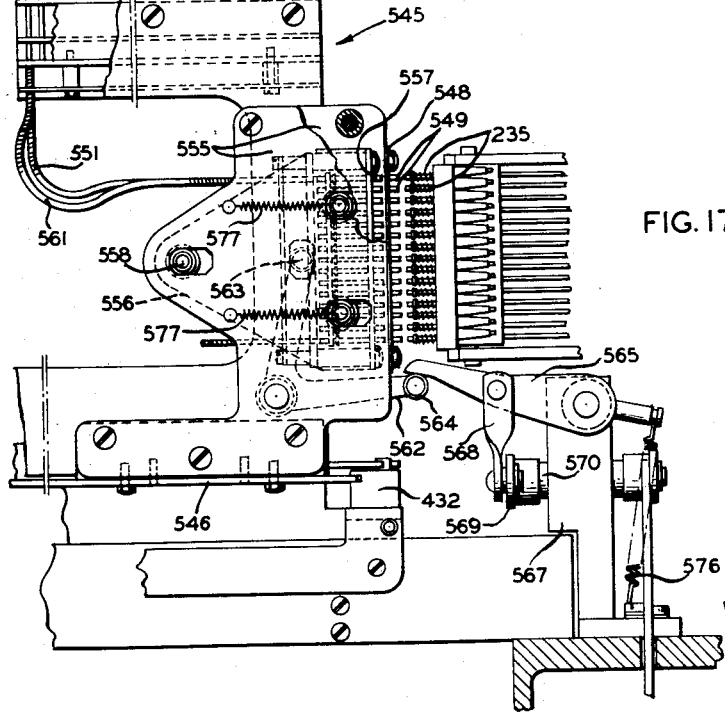

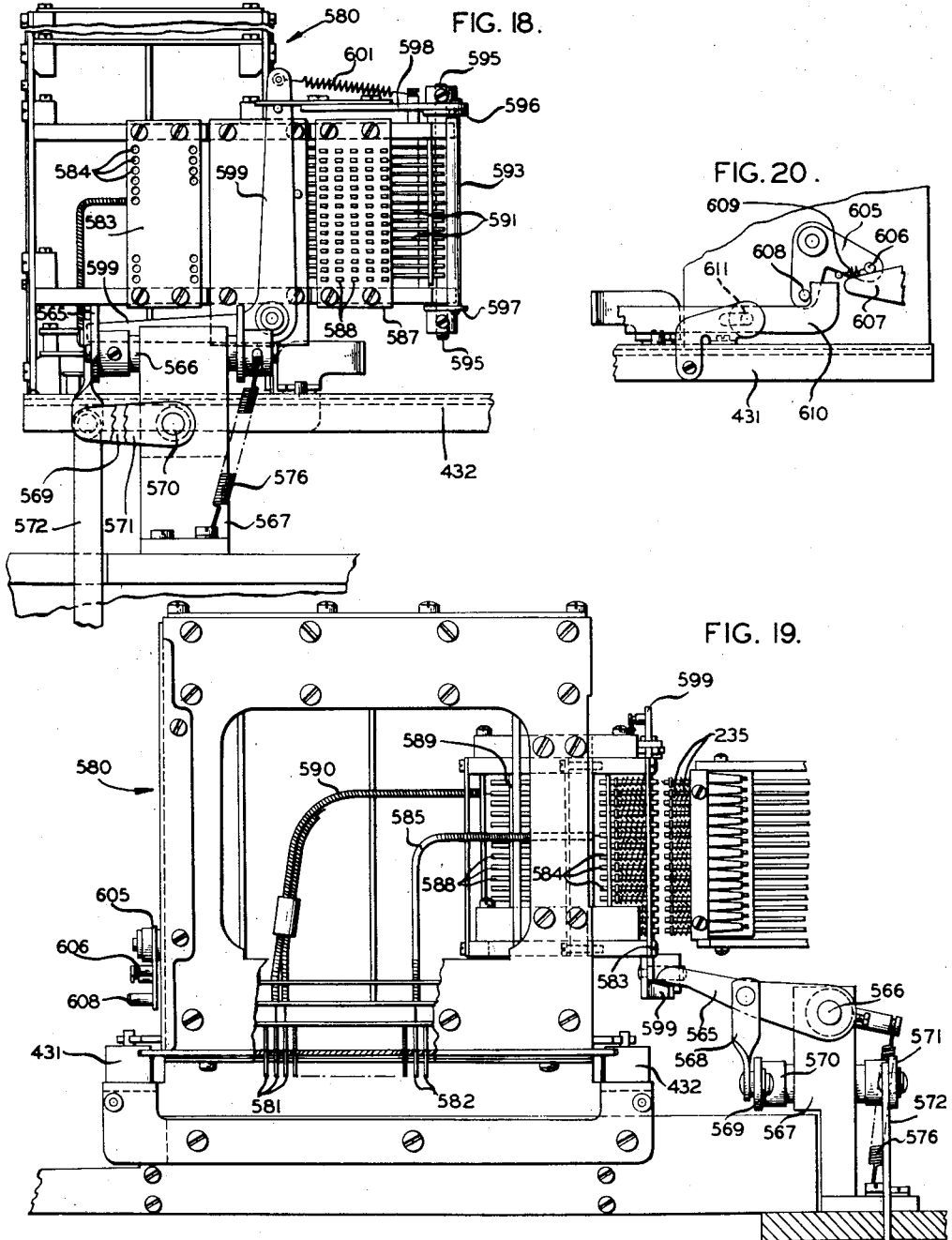

INVENTORS.
ARTHUR NELSON
WILLIAM R. SCHWOLOW

Dec. 30, 1958    A. NELSON ET AL    2,866,550
SEQUENTIALLY CONTROLLED COLLATING REPRODUCER
Filed Sept. 13, 1952    20 Sheets-Sheet 16

INVENTORS.
ARTHUR NELSON
WILLIAM R. SCHWOLOW
BY
ATTORNEYS

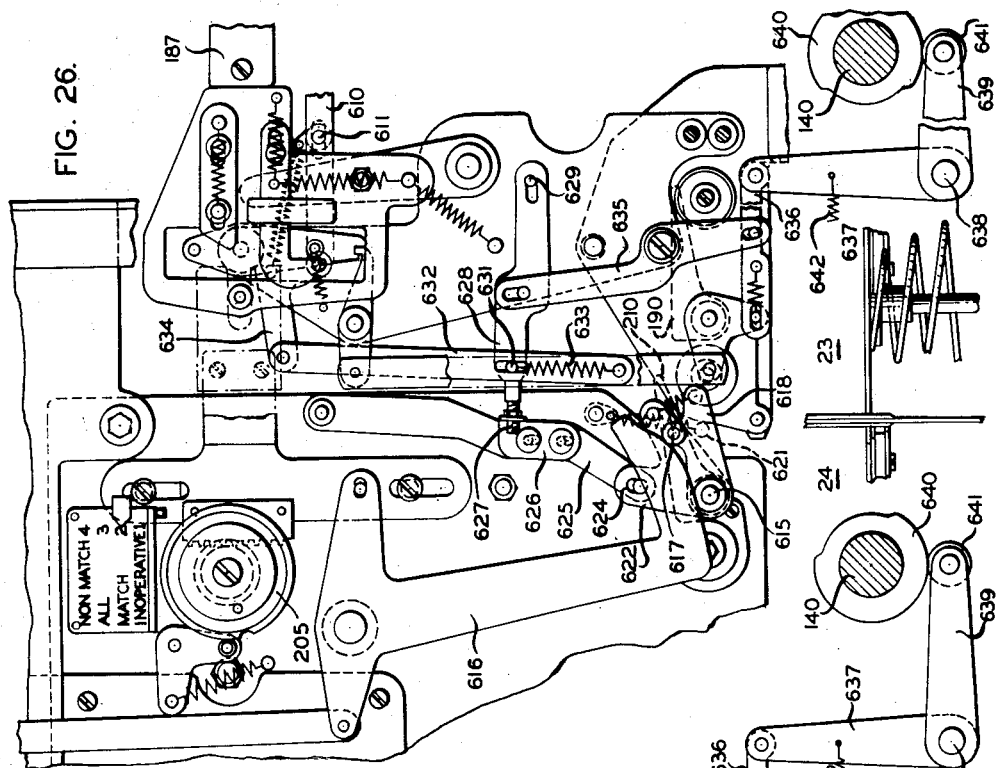

Dec. 30, 1958　　　A. NELSON ET AL　　　2,866,550
SEQUENTIALLY CONTROLLED COLLATING REPRODUCER
Filed Sept. 13, 1952　　　20 Sheets-Sheet 18

FIG. 28

TWO FILE OPERATION – COMBINED SEQUENCE & COMPARING CONTROL

NUMBER 2 SEQUENCE CONTROL CARD FEEDING OPERATION (DIAL 155)
ONLY LOWER MAGAZINE FEEDS EQUAL CARDS
LOW ORDER (UNEQUAL) CARD FEEDING FROM EITHER UPPER OR LOWER

PUNCH – EQUAL – MATCH & EQUAL NON-MATCH CARDS
SEGREGATE – LOWER EQUAL – NON-MATCH CARDS
INTERFILE – ALL UPPER & LOWER CARDS EXCEPT LOWER EQUAL-NON-MATCH CARDS

S – SEQUENCE CONTROL
C – COMPARING CONTROL
E – EQUAL
U – UNEQUAL
M – MATCH
N – NON-MATCH
P – PUNCHED

CONTROL SETTINGS:
SEQUENCE CONTROL KNOB 365 – TWO FILE OPERATION
SEQUENCE SIGNAL CONTROLS:
　EQUAL SIGNAL CONTROL BUTTON 425 – IN
　UNEQUAL SIGNAL CONTROL BUTTON 420 – OUT
UPPER CARD HOLDING CONTROL LEVER 390 – CENTER (HOLD)
PUNCHING CONTROL LEVER 175 – DOWN (SELECTIVE)
SEGREGATION CONTROL LEVER 200 – LOWER
PUNCHING & SEGREGATING CONTROL DIAL 225 – M N/N
INTERFILING CONTROL DIAL 205 – #2 (MATCH)

FIG. 27

TWO FILE OPERATION – SEQUENCE CONTROL

NUMBER 1 SEQUENCE CONTROL CARD FEEDING OPERATION (DIAL 155)
BOTH MAGAZINES FEED EQUAL CARDS SIMULTANEOUSLY
LOWER ORDER (UNEQUAL) CARD FEEDING FROM EITHER UPPER OR LOWER

NO PUNCHING.
SEGREGATE – UPPER AND LOWER UNEQUAL CARDS
INTERFILE – EQUAL CARDS

E – EQUAL
U – UNEQUAL

CONTROL SETTINGS:
SEQUENCE CONTROL KNOB 365 – TWO FILE OPERATION
SEQUENCE SIGNAL CONTROLS:
　EQUAL SIGNAL CONTROL BUTTON 425 – OUT
　UNEQUAL SIGNAL CONTROL BUTTON 420 – IN
UPPER CARD HOLDING CONTROL LEVER 390 – CENTER (HOLD)
PUNCHING CONTROL LEVER 175 – UP (NO)
SEGREGATION CONTROL LEVER 200 – BOTH
PUNCHING & SEGREGATING CONTROL DIAL 225 – M/M
INTERFILING CONTROL DIAL 205 – #2 (MATCH)

INVENTORS.
ARTHUR NELSON
WILLIAM R. SCHWOLOW
BY
ATTORNEYS

Dec. 30, 1958  A. NELSON ET AL  2,866,550
SEQUENTIALLY CONTROLLED COLLATING REPRODUCER
Filed Sept. 13, 1952  20 Sheets-Sheet 19

FIG. 29

TWO FILE OPERATION—COMBINED SEQUENCE & COMPARING CONTROL
NUMBER 2 SEQUENCE CONTROL CARD FEEDING OPERATION (DIAL 155)
ONLY LOWER MAGAZINE FEEDS EQUAL CARDS
LOW ORDER (UNEQUAL) CARD FEEDING FROM EITHER UPPER OR LOWER
PUNCH ONLY THE FIRST CARD OF EACH LOWER
   EQUAL—NON-MATCH CARD GROUP
SEGREGATE—LOWER EQUAL—NON-MATCH CARDS
INTERFILE—ALL UPPER & LOWER CARDS EXCEPT
   LOWER—EQUAL—NON-MATCH CARDS

S—SEQUENCE CONTROL
C—COMPARING CONTROL
E—EQUAL
U—UNEQUAL
M—MATCH
N—NONMATCH
P—PUNCHED

CONTROL SETTINGS:
SEQUENCE CONTROL KNOB 365—TWO FILE OPERATION
SEQUENCE SIGNAL CONTROLS:
   EQUAL SIGNAL CONTROL BUTTON 425—IN
   UNEQUAL SIGNAL CONTROL BUTTON 420—OUT
UPPER CARD HOLDING CONTROL LEVER 390—CENTER (HOLD)
PUNCHING CONTROL LEVER 175—DOWN (SELECTIVE)
SEGREGATION CONTROL LEVER 200—LOWER
PUNCHING & SEGREGATING CONTROL DIAL 225—N/N
INTERFILING CONTROL DIAL 205—#2 (MATCH)
FIRST CARD PUNCH CONTROL BUTTON 465—OPERATIVE
FIRST CARD INTERFILE CONTROL BUTTON 470—INOPERATIVE

FIG. 30

TWO FILE OPERATION—SEQUENCE CONTROL
NUMBER 2A SEQUENCE CONTROL CARD FEEDING OPERATION (DIAL 155)
ONLY LOWER MAGAZINE FEEDS EQUAL CARDS
LOW ORDER (UNEQUAL) CARD FEEDING FROM EITHER UPPER OR LOWER
FIRST EQUAL CARD OF UPPER GROUPS RELEASED

PUNCH—EQUAL CARDS
SEGREGATE—UPPER UNEQUAL CARDS & LOWER EQUAL CARDS
INTERFILE—UPPER EQUAL CARDS & LOWER UNEQUAL CARDS

E— EQUAL
U— UNEQUAL
P— PUNCHED

CONTROL SETTINGS:
SEQUENCE FEEDING CONTROL KNOB 365—TWO FILE OPERATION
SEQUENCE SIGNAL CONTROLS:
   EQUAL SIGNAL CONTROL BUTTON 425— IN
   UNEQUAL SIGNAL CONTROL BUTTON 420—OUT
UPPER CARD HOLDING CONTROL LEVER 390—UP (2A)
PUNCHING CONTROL LEVER 175—DOWN (SELECTIVE)
SEGREGATION CONTROL LEVER 200—LOWER
PUNCHING & SEGREGATING DIAL 225—M/M
INTERFILING CONTROL DIAL 205—#2 (MATCH)
AUXILIARY SEGREGATING CONTROL KNOB 540—IN AT U

INVENTORS.
ARTHUR NELSON
WILLIAM R. SCHWOLOW
BY
ATTORNEYS

Dec. 30, 1958    A. NELSON ET AL    2,866,550
SEQUENTIALLY CONTROLLED COLLATING REPRODUCER
Filed Sept. 13, 1952    20 Sheets-Sheet 20
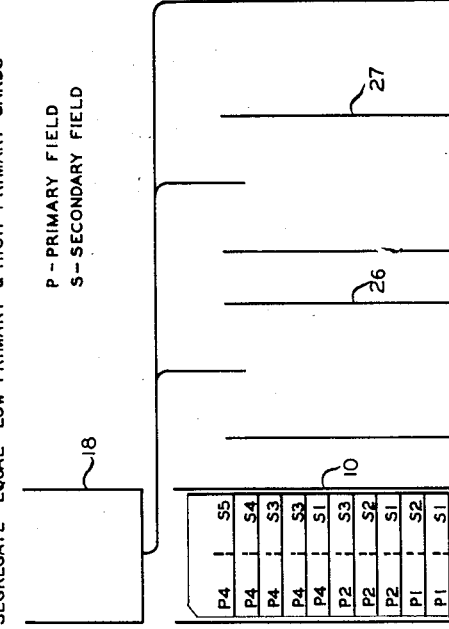
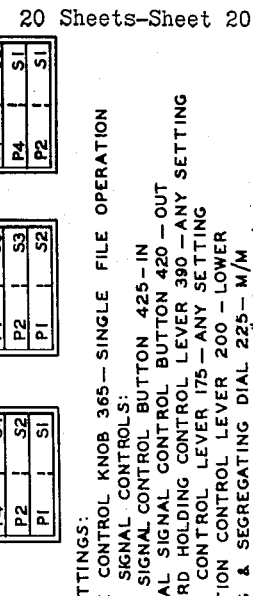
FIG.32
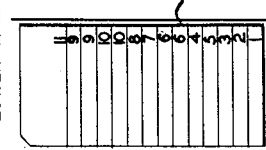
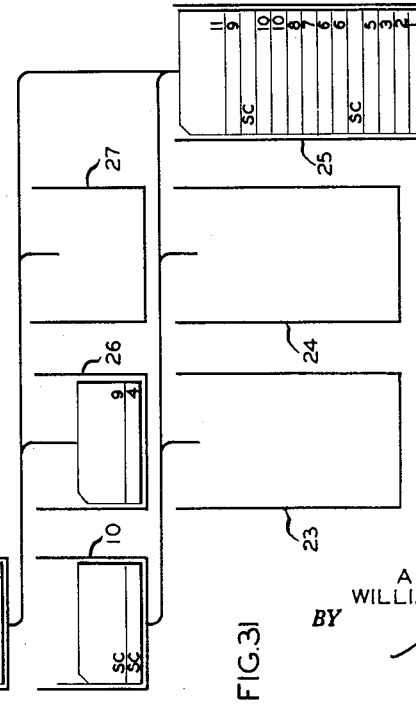
FIG.31
INVENTORS.
ARTHUR NELSON
WILLIAM R. SCHWOLOW
BY
ATTORNEYS

United States Patent Office 2,866,550
Patented Dec. 30, 1958

2,866,550

SEQUENTIALLY CONTROLLED COLLATING REPRODUCER

Arthur Nelson and William R. Schwolow, Norwalk, Conn., assignors to Sperry Rand Corporation, a corporation of Delaware Application September 13, 1952, Serial No. 309,422

46 Claims. (Cl. 209—110)

This invention relates to statistical record controlled machines in general and, more particularly, to that class of machine controlled by the comparison of data recorded by perforation patterns in different data recording fields. The invention is shown herein in an embodiment adapted for a statistical card comparing and reproducing machine of the general type disclosed in the patent to K. J. Braun 2,211,094, issued August 13, 1940, including improvements thereon of the type disclosed in the patent to J. T. Ferry 2,496,124, issued January 31, 1950, together with improvements of the type disclosed in the co-pending application of F. J. Schutt and J. B. Day S. N. 152,728, filed March 29, 1950 now Patent 2,702,629.

Generally stated, the machine disclosed in the above mentioned patent of Braun provides separate feeding mechanisms for feeding individual groups of records, which may be referred to as master and detail records, respectively. Comparing means enables a master record to be compared with a detail record to determine match or non-match relationships. A plurality of pockets are associated with each feeding mechanism which enable the segregation of records from either group, Punching mechanism, associated with the detail cards, permits preselected fields of a master card to be reproduced on a detail card. The selective feeding of one or the other or both record groups, the punching of the detail records, and the segregation of master and detail records may be controlled by the comparing mechanism in accordance with a match or non-match relationship between the compared cards. In the machine of said patent to Braun, when set to segregate cards from both the master and detail files, the segregation of records of both files can result only from the same match or non-match compared relationship, and the same punching and segregation functions will result in every operating cycle wherein the selected match or non-match relationship occurs.

The machine disclosed in the above mentioned patent of Ferry provides, in addition, means for interfiling, in a common or interfile pocket, the unsegregated records of both groups. The interfiling means, when operative, may be set to interfile only as a result of a match relationship, a non-match relationship, or to interfile all records regardless of the compared relationship. Said patent of Ferry also discloses segregation control means which may be settable to dissociate the separate segregating mechanism associated with one or the other record groups from control by the comparing mechanism.

The machine disclosed in the above mentioned copending application of Schutt and Day is provided also with means for detecting sequence relationships between preselected fields of the compared master and detail cards. The sequence detecting means operates to determine whether said preselected fields are equal or unequal and, when unequal, which is of the higher order. Said sequence detecting means is effective for controlling the respective feed mechanisms so as to permit, on unequal relationships, the feed of only the card of lower order and, on equal relationships, to permit the respective feeding mechanisms to operate either singly or simultaneously, depending on the setting of the feed control means associated with the comparing mechanisms. Said sequence detecting means may also be employed, in place of the comparing mechanism, to selectively control the punching and segregating functions of the machine in accordance with equal or unequal relationships between the sequentially compared card fields. Said application also discloses means for enabling a single file sequence checking operation wherein successive cards of a single file are sequentially compared to determine whether a succeeding card is in correct, equal, or wrong sequence relationship to the card that preceded it. For this type of operation, control means are provided which may be set to segregate, from the file, all cards giving rise to a wrong sequence relationship. When set in this manner, concurrent segregation of all cards giving rise to an equal sequential relationship will also occur. In two file collating and/or reproducing operations, the sequence detecting means may be employed to control the feed of the respective card groups on a low order basis, as above mentioned, in which event, the punching and segregating functions of the machine may also be controlled solely by the sequence detecting means in accordance with equal or unequal sequence conditions, or said punching and segregating functions may be controlled solely by the comparing mechanism in accordance with match or non-match relationship, as desired.

One object of the instant invention is to enable, in a sequentially controlled collating reproducer of the type described, joint or combined control of the punching and segregating functions in accordance with relationships determined between two different fields of the respective master and detail cards. The accomplishment of this object results in a combined comparing and sequence control wherein the desired punching and/or segregating functions will be effected only when the selected match or non-match relationship exists in the compared card fields, and only when the selected equal or unequal relationships exist in the sequentially compared card fields. This object is achieved through the provision of improved sequence control means inter-cooperating with the comparing control means in a novel manner to provide the combined sequence and comparing control of the machine functions, said means including an additional control member settable to select the punching and segregating functions independently of the control member settable to select the desired feeding function.

Another object of the instant invention is to enable the punching and/or segregating functions with respect to the first card of a predetermined card group to be different than the punching and/or segregating function with respect to the remaining cards in such card group. This object is achieved through provision of a novel first card punching and/or interfiling device which operates in cooperation with the machine feed control mechanism.

Another object of the instant invention is to enable the segregation of cards from one group to be controlled independently of the segregation of cards from the other group. The accomplishment of this object permits segregation of predetermined card groups from both master and detail files in the same operation and also segregation from one group as a result of a different sequence relationship than that for segragating cards from the other group. This object is achieved through provision of auxiliary segregating mechanism cooperating with the improved sequence control means in such a manner that the segregation of cards from one group is controlled jointly by an impulse indicative of equality between the sequentially compared cards of the respective groups, and an impulse indicative of a change of designation (unequality) between successive cards of the said one group.

Another object of the instant invention is to enable, in single file sequence checking operations, the segregation of only cards giving rise to wrong sequence relationships without the concurrent segregation of card giving rise to equal sequence relationships. This object is achieved through the improved sequence control means which is settable to provide unequal segregation control impulses independently of equal segregation control impulses.

A further object of the instant invention is to enable a machine of this class to perform single file self-sequencing operations wherein the cards of a single file may be separately segregated in accordance with each separate sequence relationship detected between two sequentially compared fields of the same card. This object is achieved through the improved sequence control means operating in conjunction with additional segregating mechanism associated with the detail card receiving pockets and a novel wiring unit which permits detecting of sequence relationships between separate fields of a single card.

Other objects of the invention, together with the structural features by which they are accomplished, will be apparent from the following description when read in connection with the accompanying drawing, wherein Fig. 1 is a side elevation in section showing the general arrangement of the separate card feeding mechanisms and receiving pockets, viewed from the right substantially along the line 1—1 of Fig. 2, and illustrating the wiring units employed for a two file operation;

Fig. 2 is a sectional plan view of the machine taken substantially along the line 2—2 of Fig. 1 but showing the wiring unit employed for single file self-sequencing operations;

Figs. 3 and 4, when taken together, is a side elevation from the left hand side of the lower portion of the machine illustrating the segregating mechanism and control thereof associated with the lower or detail card feeding mechanism;

Fig. 5 is a side elevation from the right hand side of a portion of the machine which shows the sequence detecting unit and the auxiliary segregating mechanism associated with the upper or master card feeding means;

Figure 1:
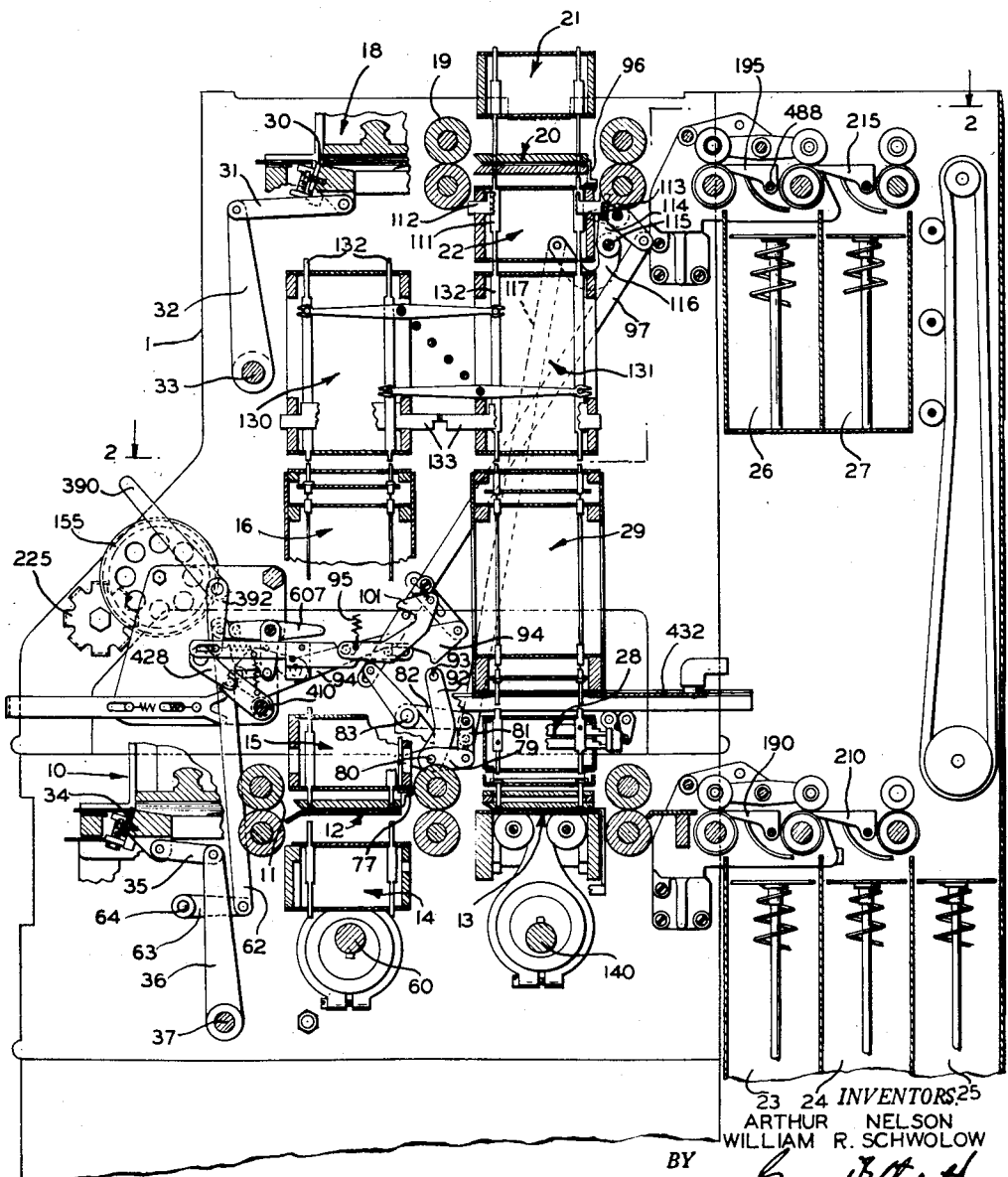
Figure 3:
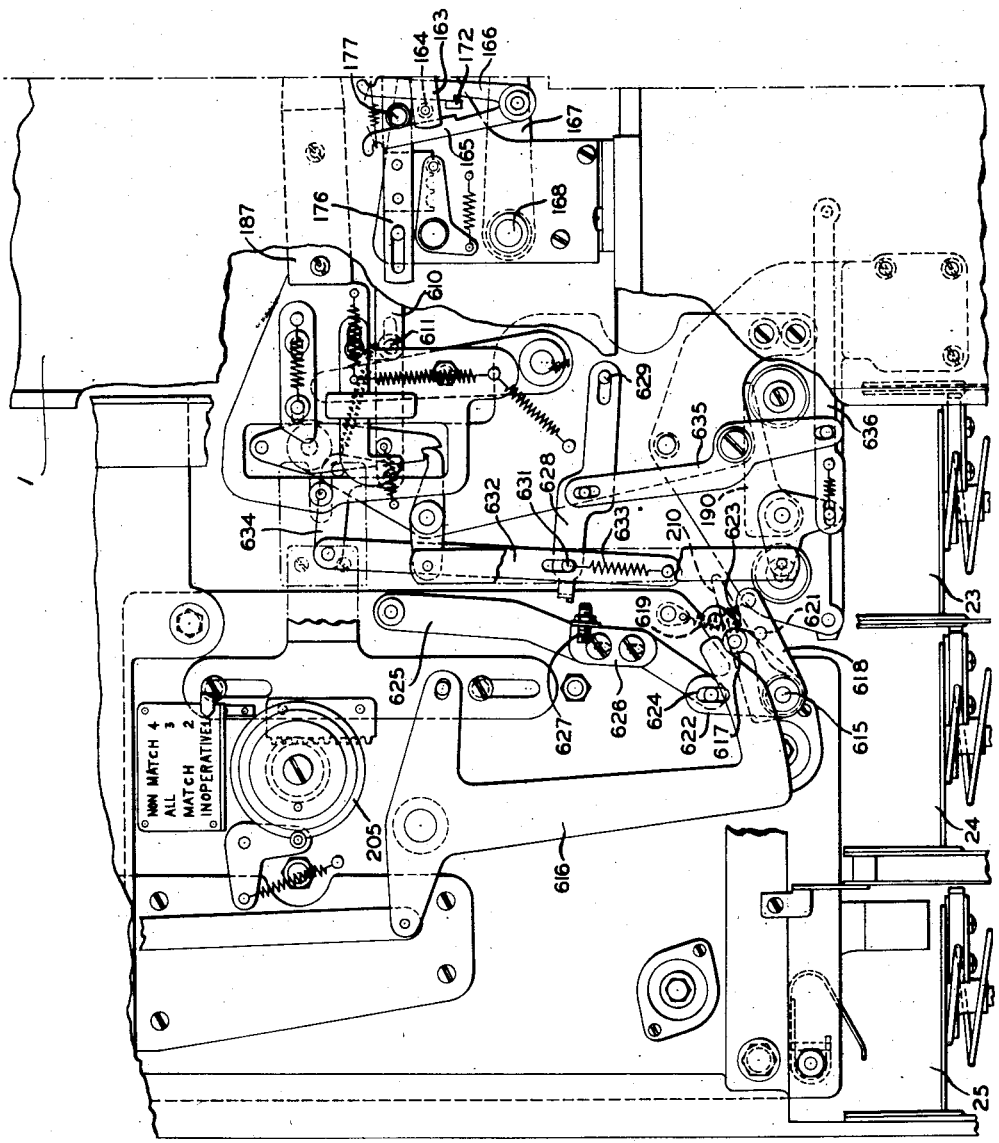
Figure 4:
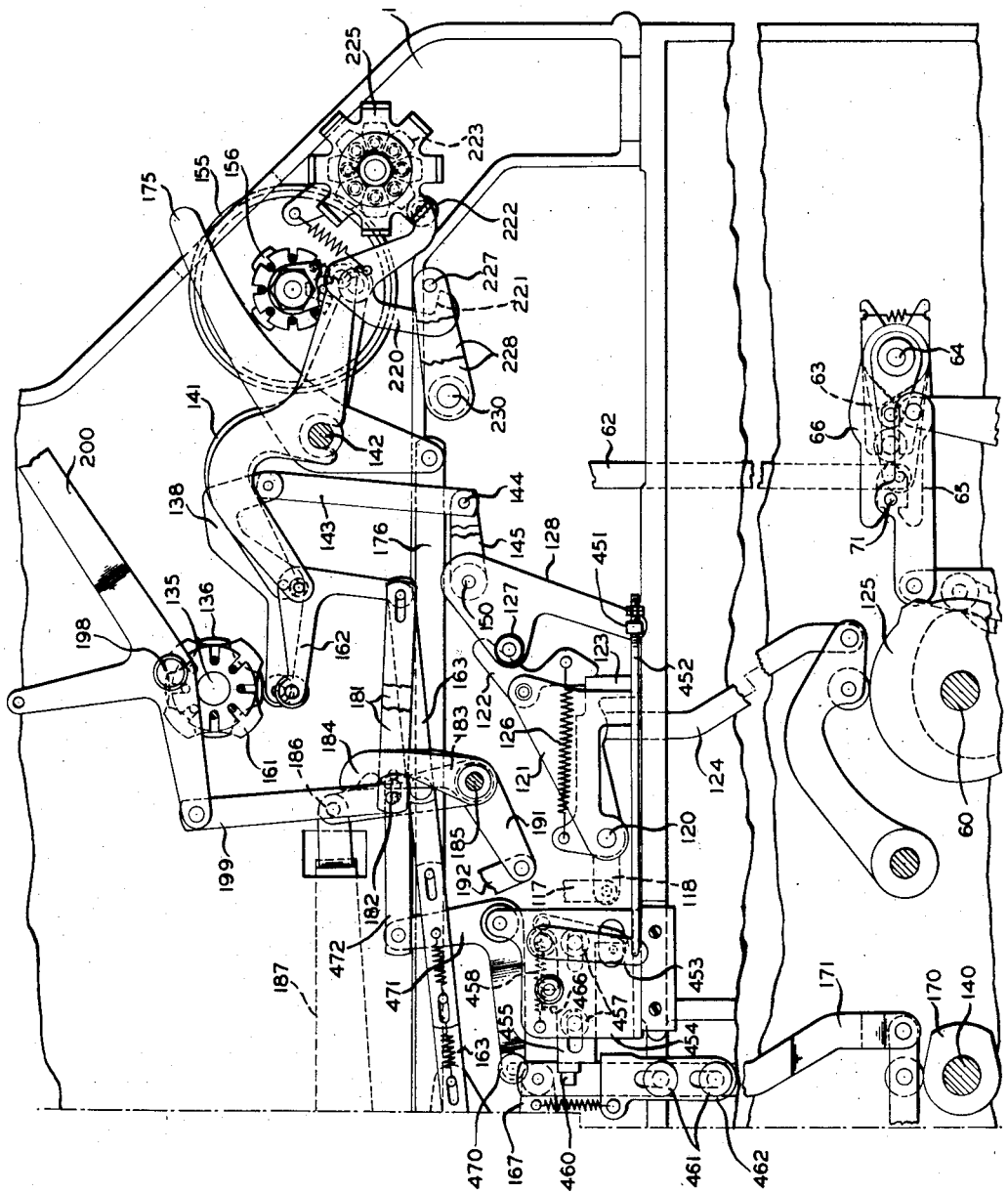
Figure 9:
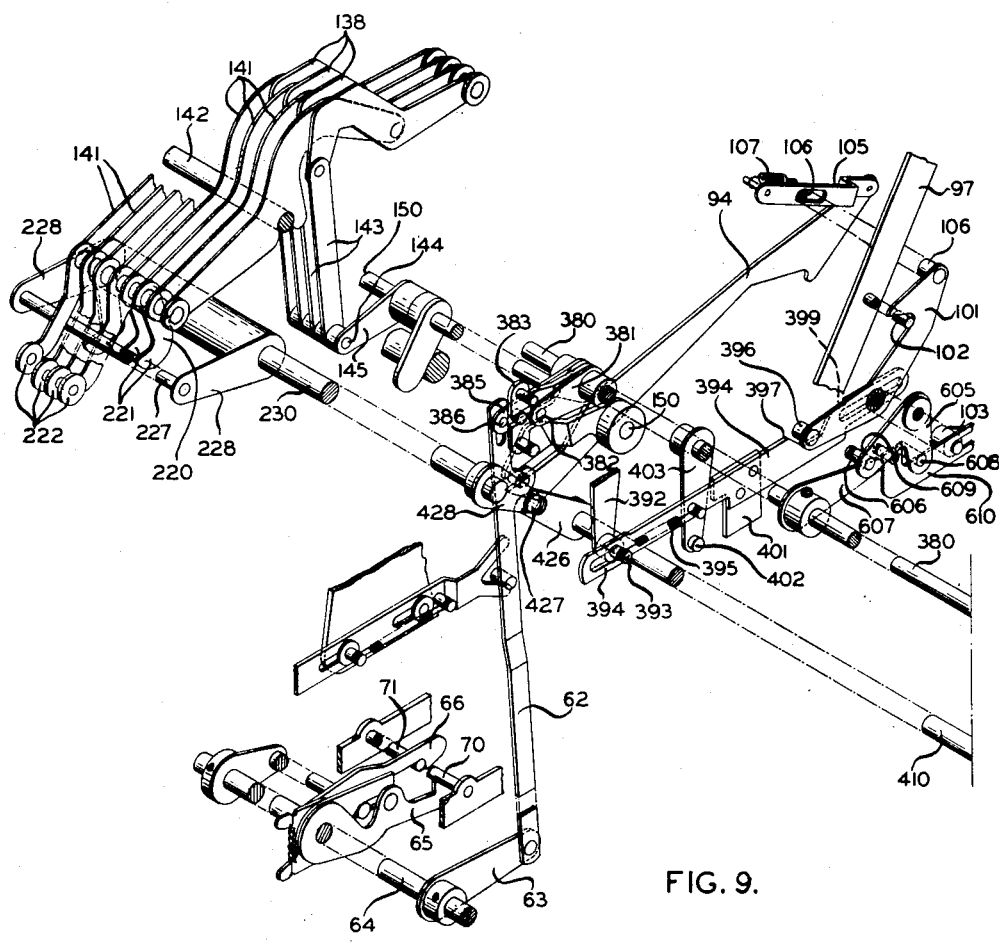
Figure 13:
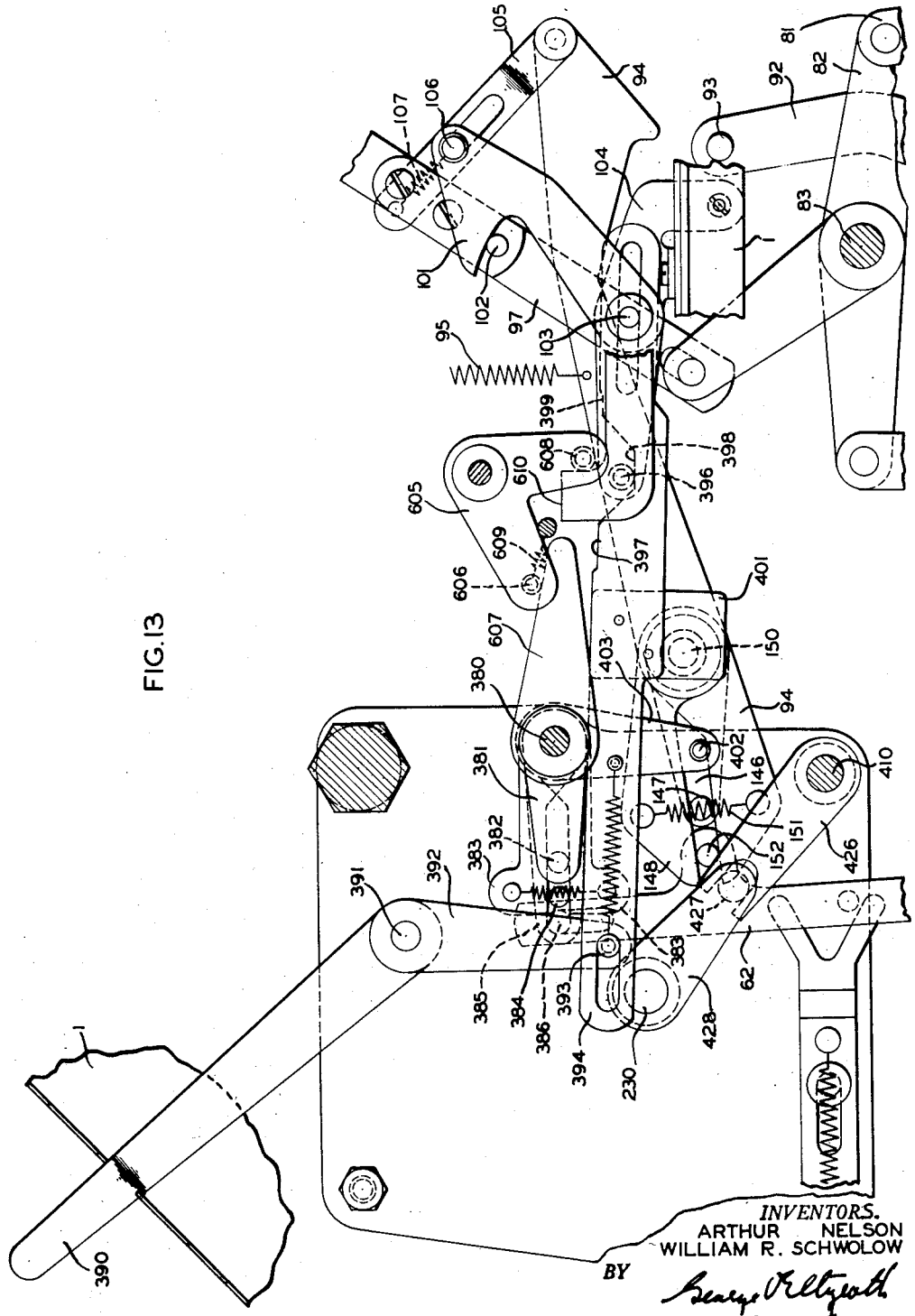
Figure 14:
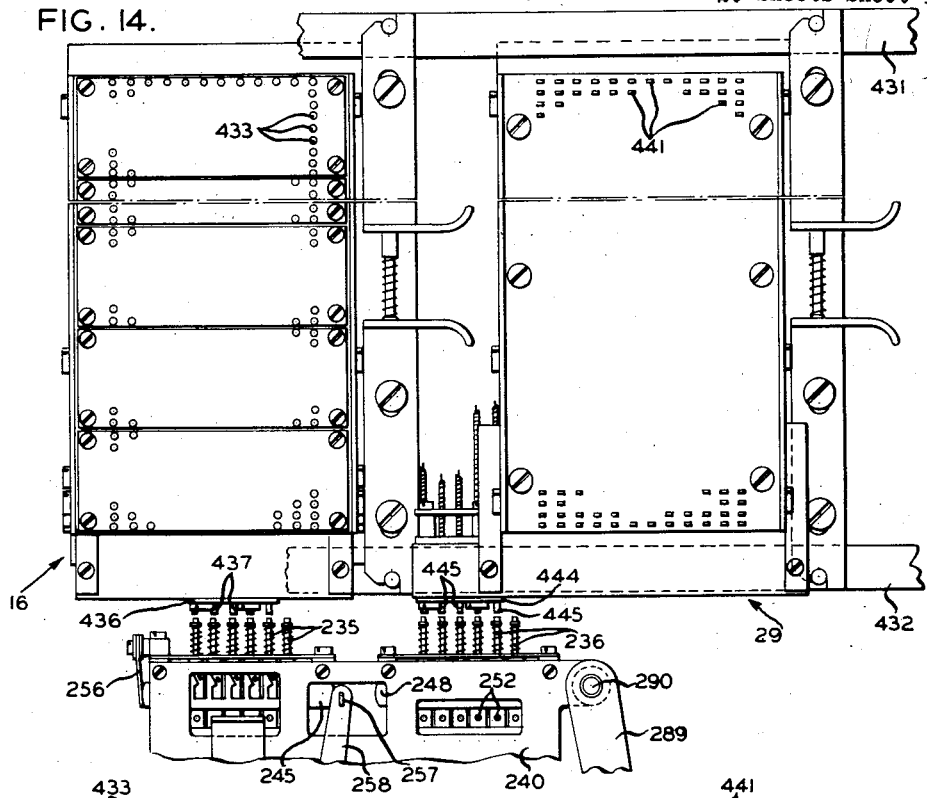
Figure 15:
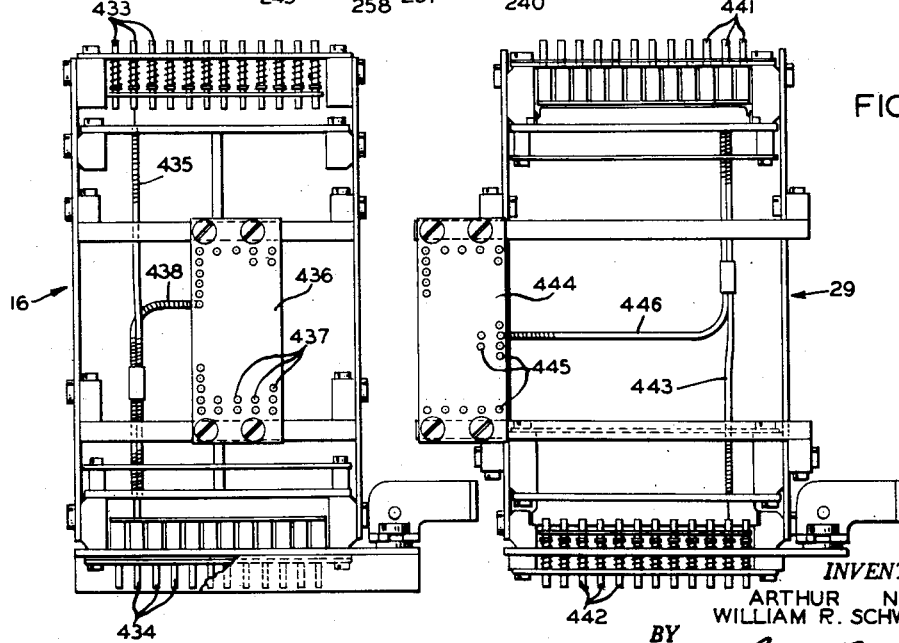
Figure 21:
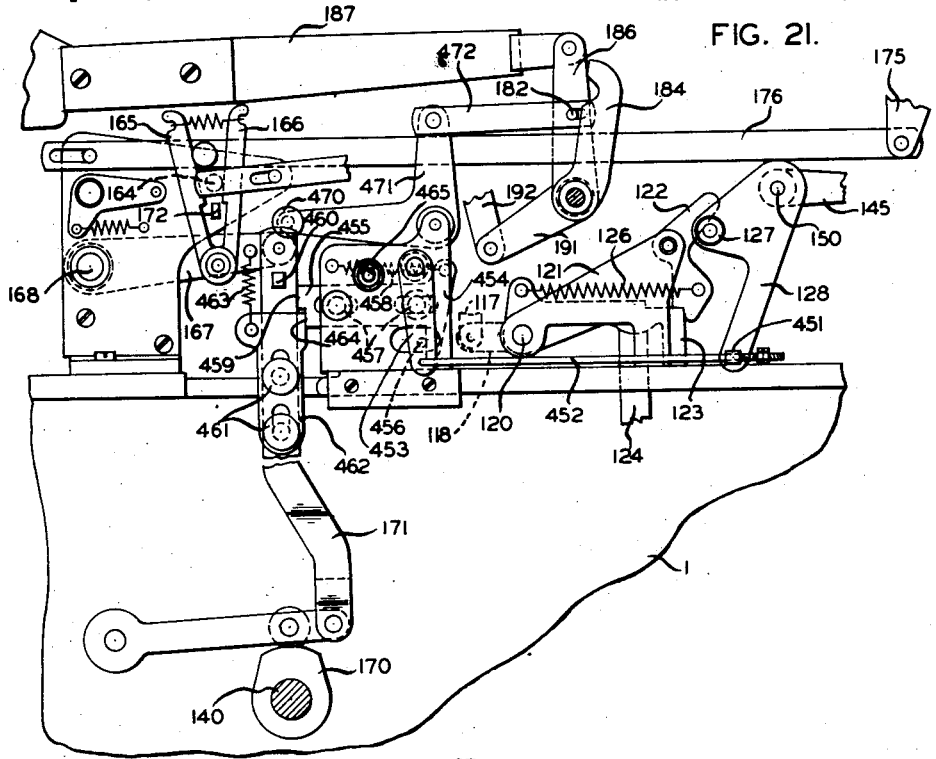
Figure 22:
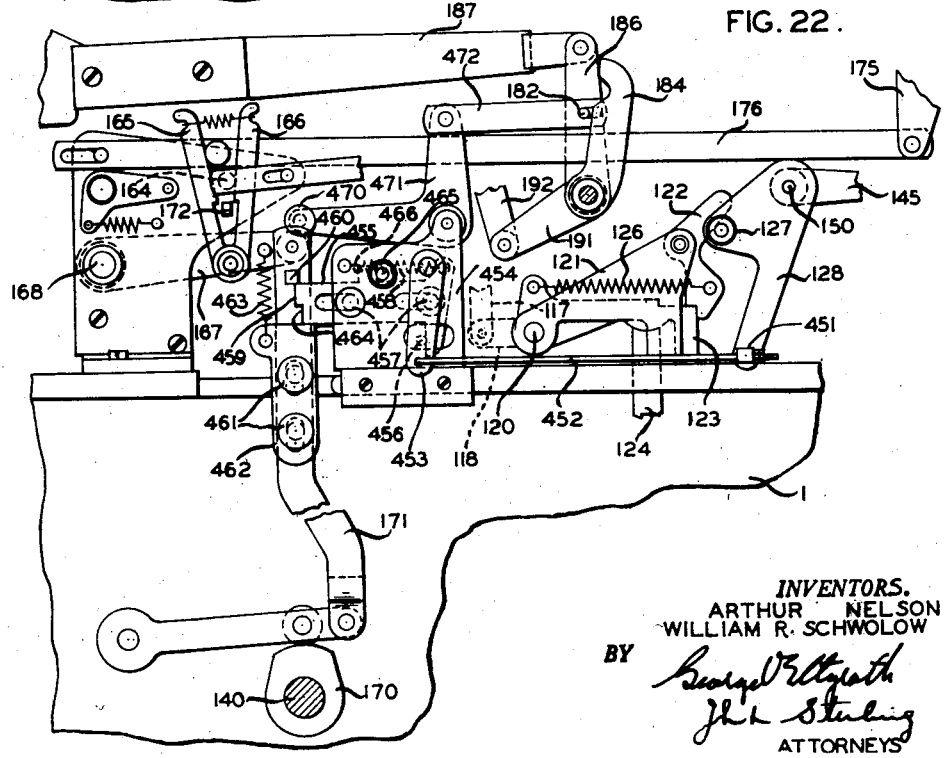

Figs. 9 and 10 taken together is a view in isometric projection illustrating the inter-relationship of the sequence control means and the comparing control means in regard to the machine feeding, punching, and segregating control mechanism;

Figs. 11 and 12 are operational detail views of the sequence control mechanism, Fig. 11 illustrating the position of the parts resulting from an unequal sequence relationship during a two file operation, Fig. 12 illustrating the position of the same parts resulting from an unequal sequence relationship during a single file operation;

Fig. 13 is an enlarged detail view of a portion of the structure shown in Fig. 1, illustrating the mechanism for controlling the operation of the respective master and detail card stops;

Fig. 14 is a plan view of the wiring units employed in a two file operation showing the relationship thereof to the sequence detecting unit;

Fig. 15 is a side elevation of the wiring units shown in Fig. 14;

Fig. 16 is a plan view of the wiring unit employed in a single file sequence checking operation, showing the relation thereof to the sequence detecting unit;

Fig. 17 is an elevation from front to rear of the mechanism shown in Fig. 16;

Fig. 18 is a side elevation of the wiring unit employed in a single file self-sequencing operation;

Fig. 19 is an elevation from front to rear of the wiring unit shown in Fig. 18 illustrating the relation thereof to the sequence detecting unit;

Fig. 20 is a detail view in side elevation of a part of the structure also shown in Fig. 19;

Figs. 21 and 22 are operational views of certain detail card segregating mechanism also shown in Figs. 3 and 4, illustrating the operation of the first card punching and/or interfiling device. Fig. 21 illustrates the position of the parts as controlled by the first card of a predetermined detail card group, Fig. 22 illustrating the position of the same parts resulting from a comparison involving the next succeeding or second card of such predetermined detail card group.

Figure 5:
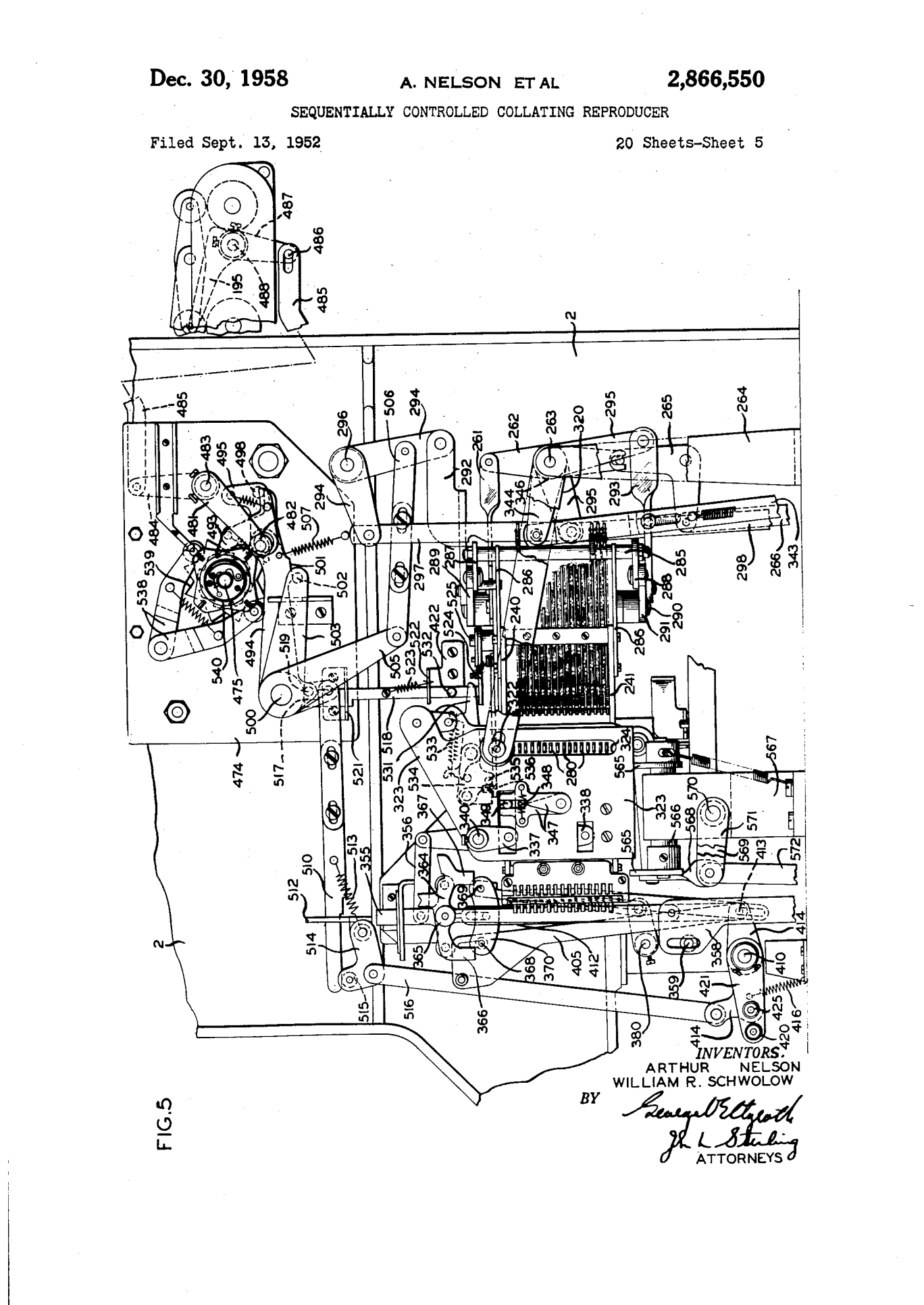
Figure 23:
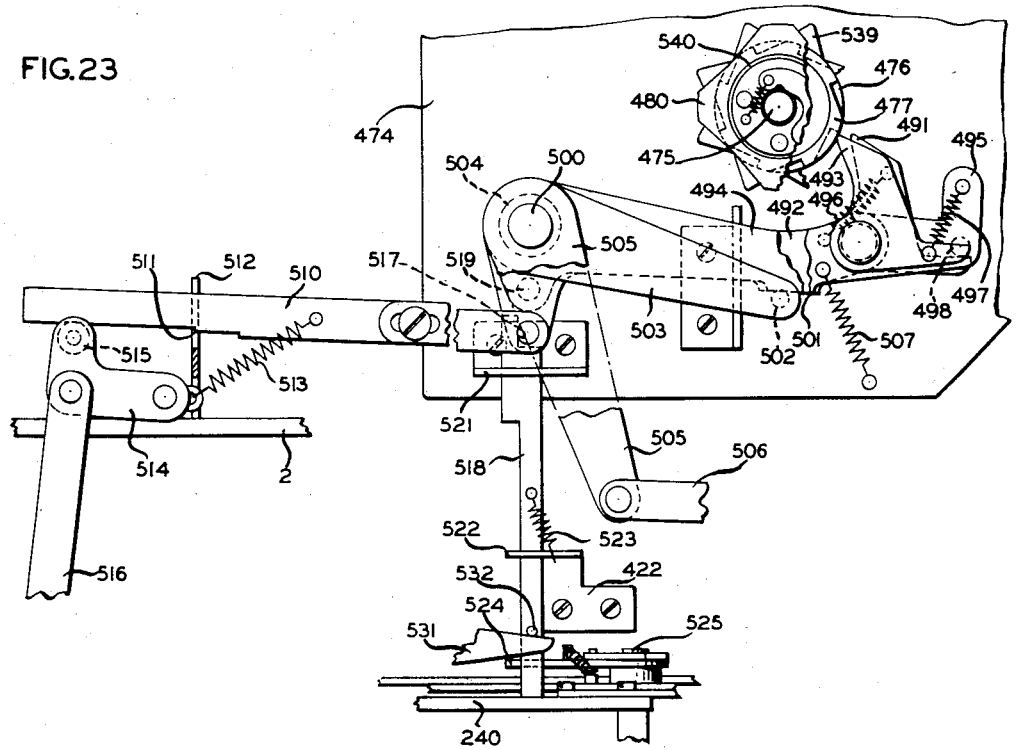
Figure 24:
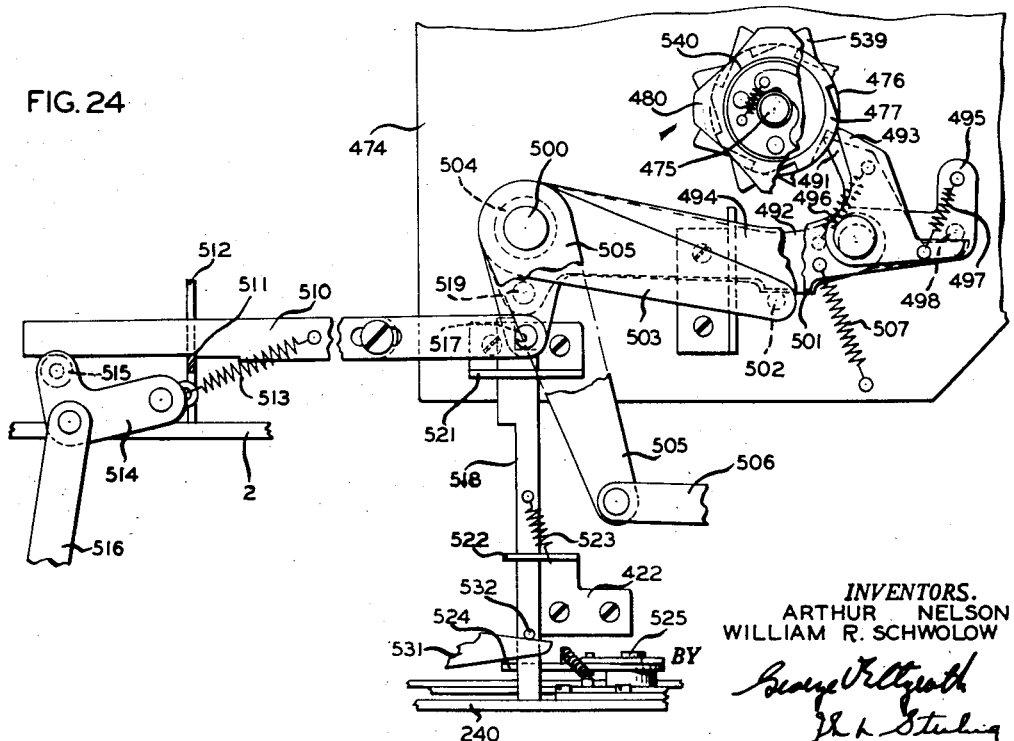

Figs. 23 and 24 are operational views of a portion of the mechanism also shown in Fig. 5, illustrating the operation of the auxiliary segregating control mechanism associated with the master card feeding mechanism. Fig. 23 illustrates the position of the parts resulting from a concurrent receipt of both equal and change-of-designation impulses from the sequence control means, and Fig. 24 illustrates the position of the parts resulting from receipt of only a change-of-designation impulse;

Figs. 25 and 26 are operational views of the detail card segregating mechanism also shown in Fig. 3, illustrating the operation of the additional segregating mechanism employed in single file self-sequencing operations. Fig. 25 illustrates the position of the parts initially upon receipt of a segregation impulse, and Fig. 26 illustrates the position of the same parts at a subsequent time in the cycle;

Fig. 27 is a schematic diagram illustrating typical two file operations of the machine wherein the segregating functions are solely under sequence control;

Fig. 28 is a schematic diagram illustrating a typical two file operation of the machine wherein the punching and segregating functions are under joint sequence and comparing control;

Fig. 29 is a schematic diagram of a joint sequence and comparing control operation illustrating the operation of the first card punching and/or interfiling mechanism;

Fig. 30 is a schematic diagram of a two file sequence control operation, illustrating the operation of the auxiliary segregating mechanism associated with the master card feeding mechanism;

Fig. 31 is a schematic diagram of a single file sequence checking operation, illustrating segregation of only those cards giving rise to a wrong sequence condition; and Fig. 32 is a schematic diagram of a single file self-sequencing operation illustrating the separate segregation of the records in accordance with the three possible sequence relationships.

Generally speaking, the frame work of the machine comprises a left hand frame casting 1, and a right hand frame casting 2. By reference to Fig. 1, it will be seen that detail cards are placed in a lower detail card magazine 10 (which corresponds to the magazine 170 of Patent 2,496,124) and are passed seriatim to feed rolls 11, Fig. 1, whereby they are conveyed, first to the detail card sensing chamber 12 in which their perforated data is analyzed, and second, to a punch chamber 13, in which additional data may be punched in the cards, as will be hereinafter described. From the punch chamber, the detail cards are conveyed to an eject pocket 23, a receiver pocket 24, or an interfiler pocket 25. Into what pockets the detail cards will be fed depends upon the setting of the segregating control mechanism, the interfiling control mechanism, and the sequence control mechanism, in accordance with the data designations contained in the respective card fields and the relation they bear to each other. During the period in which a detail card is held in the detail card sensing chamber, the perforation pattern therein is analyzed by the sensing pins mounted in a reciprocating pin box 14 of a detail card sensing mechanism. By this means, a mechanical representation of such perforation pattern is transmitted by pins in a pin box 15 and wires in a wiring unit 16 to the detail card comparing pin assembly 130 of the comparing mechanism and/or to a sequence detecting mechanism, depending upon the respective choice of wiring units as will be hereinafter described.

Master cards are placed in a master card magazine 18, which corresponds to the magazine 290 of Patent 2,496,124, and are passed seriatim to suitable feed rolls 19 whereby they are conveyed to the master card sensing chamber 20 in which their perforated data is analyzed. From the sensing chamber, the master cards are conveyed to an eject pocket 26, receiver pocket 27, or the interfile pocket 25, depending upon the setting of the segregating control mechanism, the interfiling control mechanism, and the sequence control mechanism, in accordance with the data designations contained in the respective card fields and the relation each bears to the other.

During the period in which a master card is held in the master card sensing chamber 20, the perforation pattern contained therein is analyzed by sensing pins mounted in a reciprocating pin box 21 of the master card sensing mechanism. By this means, a mechanical representation of such perforation pattern is transmitted to pins in a master card reading retaining mechanism, generally shown as 22, wherein it is retained, by a locking mechanism, until a new master card is sensed. The movement of the pins in the reading retaining mechanism 22 is transmitted directly to the master card comparing pin assembly 131 of the comparing mechanism and thence by wires in a wiring unit 29 to the punch set bar box 28 and/or sequence detecting mechanism, the operation of which will be hereinafter more fully described together with other alternate wiring unit connections of the master and detail sensing mechanisms to the sequence detecting means. The detail card sensing mechanism is reciprocated from a front main drive shaft 60, and the master card sensing mechanism from a rear main drive shaft 140, said drive shafts being suitably journalled in the side frame castings 1 and 2.

As best seen in Fig. 1, the master card and detail cards are fed from the respective magazines by picker blades such as is shown in Patent No. 2,211,094. The master card picker blade 30 is operated by the usual picker link 31 and arm 32. Arm 32 is securely fastened to a rock shaft 33 which runs laterally across the front of the machine and is journalled in the side castings 1 and 2. The detail card picker blade 34 is operated by a similar link 35 and arm 36. The arm 36 is securely fastened at the middle of a rock shaft 37 which is also journalled in side castings 1 and 2. The rock shafts 33, 37 are independently actuated cyclically by means more fully shown in said application S. N. 152,728, which means include a card feed cam on the front drive shaft 60 and cam follower linkage which include slides each having a feed disabling stud 70, 71, respectively, see Fig. 9, carried thereon. Stud 71 is on the slide associated with the master card picker 30, and stud 70 is on the slide associated with the detail card picker 34. Cooperating with said studs is a pair of opposed feed disabling hooks 65, 66, yieldably tensioned toward each other and carried by a short feed disabling rock shaft 64.

The shaft 64 is rocked to one of three effective feed control positions through means including an upright feed control link 62 pivotally joined to an arm 63 fast on the shaft 64. The link 62 is adapted to be actuated under the control of impulse signals interpreting the setups of the sequence detecting mechanism and/or the comparing mechanism by means to be hereinafter described. When in its intermediate position, the link holds the hooks 65, 66 clear of their respective studs 70, 71, so as to permit operation of both master and detail card feed mechanism. When urged downwardly, the link 62 causes hook 66 to engage stud 71 to disable the master card feed mechanism and permit operation of only the detail feed mechanism. When urged upwardly from its intermediate position hook 65 is caused to engage stud 70 so as to disable the detail feeding mechanism and to permit operation of only the master card feeding mechanism.

Figure 2:
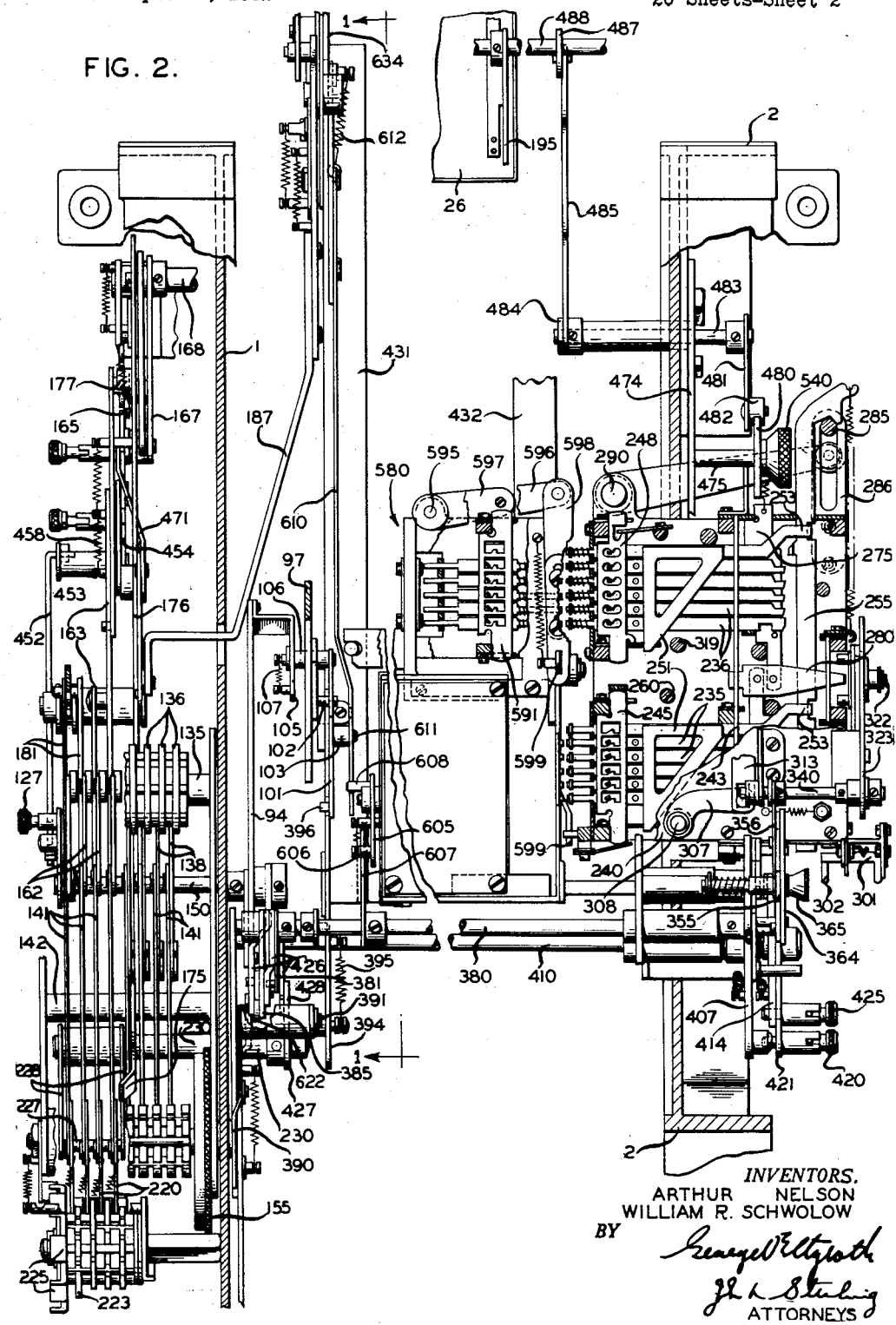

To retain the master and detail cards in the sensing chamber during the period in which they are sensed, the usual card stop mechanism is provided, see Fig. 1, including inverted L-shaped detail card stops 77 and 96, respectively. To close card stop 77 during the period in which a detail card is sensed, a pair of arms 79 fastened to each end of a transverse rock shaft 80 extend forwardly into slots in the stops 77. The other end of one arm 79 is joined by a pin-in-slot connection to a link 81 which, in turn, is connected to an arm 82 fast on a rock shaft 83. Shaft 83 is mounted in a suitable bracket on the framework of the machine and is operated in the well known manner by a card stop cam keyed to the front main operating shaft 60. The above arrangement is fully described as part of copending application Serial No. 152,728 as indicated in Fig. 2 therein. Under certain conditions, hereinafter described, it is required that card stop 77 be held in closed position. For this purpose an arm 92, fixed to rock shaft 80, is provided with a pin 93 arranged to be engaged by a hook lever 94 operatively associated with the feed control link 62. A spring 95 urges the lever 94 counterclockwise away from pin 93. The hook lever 94 when rocked clockwise to its "down" position engages pin 93 to hold card stop 77 in closed position. However, the pin-in-slot connection between arm 79 and link 81 permits the rocking of shaft 83 for controlling the card stop of the master sensing chamber, as hereinafter described.

To retain the master cards in the sensing chamber during the period in which they are sensed, a master card stop mechanism likewise is provided, and is substantially of the character described in the above cited copending application. This device includes an L-shaped master card stop 96, see Fig. 1, suitably guided for vertical movement at the rear of the sensing chamber 20. Card stop 96 of the master card sensing mechanism is actuated from rock shaft 83 by a link 97 in the same manner and at the same time as card stop 77 of the detail card sensing mechanism. It will be noted that card stop 96 may be opened and closed, even though card stop 77 may be held in closed position during certain cycles.

In order to hold the master card stops 96 effective during cycles in which the master card feed is disabled, a hook lever 101 is provided to engage with a stud 102 formed on the link 97. This mechanism can be best seen in Fig. 13 wherein it will be noted that the hook lever 101 is mounted on a pivot stud 103 carried by a bracket 104 secured to the left hand machine frame casting 1. Means hereinafter to be described are provided for presetting the hook lever 101 so as to be ineffective under certain operating conditions. However, in the normal setting of said mechanism, which is the setting shown in Fig. 13, the hook lever 101 is free to rock into and out of engagement with the stud 102 through the influence of a link 105 connecting said hook lever with the hook lever 94 associated with the detail card stop mechanism. A stud 106 on the lever 101 rides in a slot formed in the link 105 under tension of a spring 107 so as to provide a yieldable connection between the lever 101 and the link 105. In this manner, the two levers 101, 94 are yieldably maintained at a definite spaced relation to each other. Said levers may be jointly rocked to one of three controlling positions, said positions corresponding to the three controlling positions of the feed control link 62 as heretofore described. In their intermediate position, corresponding to the intermediate position of the feed control link 62, both hook levers 101, 94 are clear of their respective studs 102, 93 respectively, so as to permit both master card feed mechanism and the detail card feed mechanism to operate concurrently. When rocked counter-clockwise to the position shown in Fig. 13, which position corresponds to the lowermost position on the feed control link, it will be seen that the hook lever 101 is effective for engaging stud 102 while the hook lever 94 is disengaged from its stud 93. In this counterclockwise rocked position, since the master card feed mechanism is disabled, the master card stops 96 are held closed to retain a master card in the master card sensing chamber 20 while at the same time, permitting the detail card stops 77 to open and release detail cards from the detail card sensing chamber in the normal manner. When rocked clockwise to the third control position, corresponding to the third or uppermost position of the feed control link 62, the hook lever 94 will engage stud 93 but the hook lever 101 will be clear of its associated stud 102. In this third control position, the detail card stops 77 will be held closed to retain a detail card in the sensing chamber 12 while at the same time the master card stops 96 will be free to open to release a master card from the sensing chamber 20 in the normal manner. The positioning of the feed control link 62 together with the related hook levers 94, 101 is under the joint control of a comparing control mechanism and a sequence control mechanism as is described in copending application S. N. 152,728, and the manner of operation thereof will also be herein referred to more fully in connection with the description of said separate control mechanisms.

The master card reading retaining mechanism 22, more fully disclosed in Patent 2,211,094, includes set pins 111 cooperating with locking slides 112. These slides are normally resiliently urged into locking position by spring means (not shown). Thus, the set-up of pins 111 is retained therein until a new set-up is made or until released by retract means which effectively erases the set-up from a preceding sensing cycle.

The retract mechanism comprises a retract bail 113 arranged to co-act with slides 112 and supported by arms 114 fast on shaft 115. A V-shaped arm 116 fast on shaft 115 has a link 117 connected thereto which link is joined to an arm 118, Fig. 4, connected to its other end. The arm 118 is fast on a rock shaft 120 that is journalled on the machine frame casting 1. Fast on the shaft 120 is a substantially triangular plate 121 at the apex of which is pivoted a pawl 122 having cut-away shoulder on its pendent arm adapted to engage the forward end of an arm 123 pivotally mounted on rock shaft 120. Arm 123 overlies the upper end of a push rod 124 cyclically reciprocated by a retract cam 125 on the front main drive shaft 60. Thus, arm 123 is rocked counter-clockwise as viewed in Fig. 4, by cam 125 immediately before the end of each cycle. A spring 126 serves to maintain pawl 122 in engagement with the forward end of the arm 123 so that each actuation of cam 125 is imparted to plate 121 to rock shaft 120 counter-clockwise. This movement through arm 118, link 117, causes bail bar 113 to shift the slides 112 out of locking relation with the pins 111 and thereby to release the set up retained from a preceding sensing cycle. However, as hereinafter more fully described, means associated with the feed control mechanism and including a stud 127 on a rock arm 128 are provided to prevent the operation of the retract mechanism of the master card retaining mechanism when the master card feeding mechanism is disabled.

By operation of the comparing mechanism, mechanical representations of master and detail card perforation patterns are compared, and the occurrence of a comparison, or non-comparison, between such perforation patterns is utilized to control functions of the machine.

The construction of the comparing mechanism is the same as fully described in the above-mentioned Patent 2,211,094. Briefly stated, it will be understood that the movement of the pins 132 in the master and detail card comparing pin assemblies 130 and 131, in accordance with the perforation patterns in master and detail cards, is effective to determine the position of certain comparing slides 133 (Fig. 1), one of which is provided for each pair of compared columns of the record cards. Abutting each slide 133 is the well known manually settable interponent, not shown, which, when that column is to be used for comparing purposes, is set in its upper or effective position. The construction and arrangement of the comparing mechanism is such that in the event the compared perforation patterns are identical, the slides 133 are free to move to the left to permit counterclockwise movement of a comparing slide sensing bail rod, not shown. However, if either pattern contains a perforation for which there is no counterpart in the other, one or more of the slides 133 are blocked and, together with its associated interponent, serves to prevent the counterclockwise movement of said sensing bail rod.

As is fully described in the said Patent 2,211,094, a change of comparing condition from a match to a non-match condition or from a non-match to a match condition effects, through a ratchet mechanism a 45° rotation of a function control shaft 135. Said control shaft 135, see Fig. 4, is provided with a plurality of cams which are selectively employed for controlling the punching function of the machine, the segregating function of the machine, and also the feeding function of the machine. Each of said function control cams are provided with a plurality of dwells defining two effective control positions. Said dwells are arranged alternately at 45° intervals so that a dwell defining one control position will be effective in cycles when a non-match condition is sensed and a dwell defining the other control position of each cam will be effective in all cycles of a matched condition. The feed control cams 136, one shown in Fig. 4, are of two different designs, i. e., one wherein the dwells of the cam determine low and intermediate control positions, the other wherein the dwells of the cam determine low and high control positions. The two feeding control cams defining a low and intermediate control position are offset 45° on the shaft 135 so as to enable the intermediate control position to be effective in both the match and the non-match positions of the control shaft. The two feed control cams defining a low and high control position are likewise offset 45° so as to permit a high control position to be effected in both the match and non-match positions of the control shaft 135. All of said feed control cams 136 operate in the usual manner through follower levers 138 pivoted to the rearward end of an associated selecting lever 141 (see also Fig. 9), each selecting lever being loosely supported by a rod 142 about which the levers 141 may pivot to carry its associated follower 138 into cooperative engagement with its associated cam 136. Each of the follower levers 138 are connected by a link 143 with a bail 144 carried between a pair of rock arms 145 secured fast to a comparing feed control shaft 150. The feed control shaft 150 is suitably journalled to the side frame casting 1 and, as seen in Fig. 4, carries at its outer end a rock arm 128 heretofore mentioned in connection with the master card reading retaining retract mechanism. The inner end of said shaft 150, as can be seen in Figures 9 and 13, carries a rock arm 146 having a stud 147 engaged between the two arms of a scissors clamp mechanism. Said scissors mechanism is comprised of an arm 148 loosely mounted on the shaft 150 and an arm comprising the forward end of the hook lever 94 which is also loosely mounted on the shaft 150. A spring 151 suitably maintains said scissors arms in engagement with stud 147 and also with a stud 152 on the feed control link 62 heretofore described. The spring 147 is substantially stronger than the spring 95 so as to cause the hook lever 94 and the feed control link 62 to follow the movement of the comparing control feed shaft 150. The various feed control cams 136 are selectively rendered effective by means of the usual function selecting control dial 155. Said dial in the instant machine is settable to select only the desired feeding function and carries a hub in which may be inserted, at proper locations, cam lobes 156, said lobes cooperating with rollers carried on the forward extremity of the selecting levers 141 associated with the feed control cams 136. Said lobes, when effective, cause the associated selecting lever 141 to rock clockwise about the supporting rod 142 so as to present its associated follower lever 138 into cooperative engagement with its associated feed control cam 136. The dial 155 is settable in 8 different positions, in each of which positions a different control cam or combination of cams becomes effective so as to achieve 8 different types of feeding operations.

As more fully described in the copending application S. N. 152,728, three settings of said function-selecting dial may be employed when the machine is operated under control of sequence detecting mechanism, the five other settings being employed when the machine is feeding solely under control of the comparing mechanism. The three settings of the dial 155 which are reserved for sequence control operations result in providing three different sequence controlled feeding functions, the differences in function occurring when the sequence detecting means determines conditions of equality. For example, in feeding operation No. 1 two cam lobes 156 are effective so as to enable the two feed control cams 136 which have dwells defining a low and intermediate control position. Since the two cams are offset on the function control shaft 135 by 45°, it will be seen that the feed control shaft 150 will be maintained in intermediate position regardless of the match or non-match position of the function control shaft 135. Accordingly, in the event of a condition of equally in the sequence detecting means, the feed control links 62 and the card stop hooks 94, 101 will be maintained in their intermediate position so as to enable the simultaneous feeding of both master and detail cards.

In the second setting of the function selecting dial 155, for feeding operation No. 2, there are no cam lobes 156 positioned so as to be effective with the result that none of the feeding function control cams 136 are effective in this control setting. Accordingly, the spring 95, see Fig. 13, is effective for rocking hook lever 94 counter-clockwise and for lowering the feed control link 62 to its lowermost position. With this setting, in the event of an equal condition in the sequence detecting means, the master card picker mechanism is disabled and the master card stops are held closed so as to prevent master card feeding, permitting only the feed of detail cards. It should be noted that in this setting, shaft 150 is rocked clockwise from the position shown in Fig. 4 to a position where the stud 127 bears against pawl 122 to disengage the pawl from the rock arm 123. This results in disabling the retract for the master card reading retaining mechanism 22 so as to retain the sensing of the previous cycle in the reading retaining mechanism.

In the third sequence control position of the function selecting dial 155 for feeding operation No. 3, two other cam lobes 156 are effective for rocking into effective position the two selecting levers 141 associated with the two feed control cams 136 whose dwells define a high and low control position. When these cams, which are offset relative to each other 45° on function control shaft 135, are effective, it will be seen that regardless of a match or non-match position of the shaft 135, one or the other of said cams will operate through its respective follower linkage to maintain the comparing feed control shaft 150 in its most counter-clockwise rocked position as viewed in Fig. 4. In this position of the feed control shaft 150 the feed control link 62 will be raised to its uppermost position and the card stop disabling hooks 94, 101 will be rocked clockwise, as viewed in Fig. 13, to their lower position so that in the event there is an equal condition in the sequence detecting means, the detail picker mechanism and card stops will be disabled permitting the feed of only master cards.

The function control shaft 135 also carries a plurality of cams 161 for controlling the segregating functions and also the punching functions of the machine. These cams are of identical construction and are arranged in pairs, one pair for controlling segregating functions and the other pair for controlling punching functions. The cams of each pair are offset 45° relative to each other in order that the desired function may be achieved on either a match condition or a non-match condition as desired.

The punch control cams 161 operate through the usual follower mechanism which includes a bell crank 162 pivoted at the rear end of an associated selecting lever 141. The depending arm of said bell cranks are each connected through a series of rearwardly extending yieldably joined links 163, the rearward end of which, see Fig. 3, has a stud 164 cooperating with a pair of spring urged latches 165, 166 respectively. The latches 165, 166 are pivotally mounted on a rock arm 167 which is fastened on a retract shaft 168 associated with the punch set bar box. As fully described in said Patent 2,211,094, punching is controlled by means of said retract mechanism, disabling of said retract mechanism operating to render the punch elements ineffective. Said retract shaft 168 is operated from a cam 170 fast on the rear main drive shaft 140 (Fig. 4). Said cam operates through a link 171 pivotally connected to the rock arm 167. The high dwell of cam 170 operating through the linkage is effective for retracting the locking slides of said set bar box. Cooperating with the latches 165, 166 is a stud 172 mounted on the frame of the machine (Fig. 4). The stud 172 when engaged by the shoulder of one or the other latches 165, 166 is effective for holding the retract shaft in a fully retracted position. The arrangement is such that a high dwell of a punch control cam 161, when the cam is effective, operates through said linkage to rock the latch 166 clear of stud 172 so as to permit punching of a detail card.

Also cooperating with said latches is the usual punch control means which includes a control lever 175 pivoted on the frame support rod 142, said control lever being manually settable in one of three positions. Pivotally connected with said lever is a rearwardly extending link 176 having a stud 177 disposed between the latches 165, 166. When the lever 175 is in its uppermost or first control setting, the stud 177 operates to disable the latch 166 and to enable the latch 165. Accordingly, in this control setting, punching is prevented regardless of the match or non match condition in the comparing mechanism. When the lever is in its second or intermediate position, stud 177 is in position to hold both the latch 165 and 166 clear of stud 172. Accordingly, in this second position, both latches 165 and 166 are disabled so as to effect punching every machine cycle regardless of the match or non match condition in the comparing mechanism. When the punch control mechanism is moved to its third or lower control position, the position shown in Figs. 3 and and 4, the stud 177 is in position to disable the latch 165 and enable the latch 166. Accordingly, in this third control position, the latch 166 is positioned in accordance with the stud 164 so that punching is controlled selectively in accordance with the match or non-match condition of the comparing mechanism.

Also mounted on the function control shaft 135 are a pair of cams for controlling the segregating functions of the machine. Said cams are similar in design to the punch control cams 161 and are similarly offset on the shaft 45° with respect to each other. Associated with each of said segregating control cams is a follower bell crank 162 mounted at rearward end of a selecting lever 141. Each of the bell cranks 162 associated with a segregating control cam has a pin and slot connection with an associated link 181. The rearward end of said links 181 carry a common stud 182 which is disposed in working relation to a pair of rock arms 183, 184 mounted on a short rock shaft 185. The arrangement is similar to that fully shown in the aforesaid Patent 2,496,124, the stud 182 herein having the same function and operating in the same manner as the stud 85 of said patent. The rock arm 183 is loosely mounted on shaft 185 but is integral with an upright rock arm 186 connected to a rearwardly extending link 187. The link 187 when actuated, operates through the mechanism which is fully described in said patent to control a deflector mechanism 190 associated with the detail card eject pocket 23.

The rock arm 184 is fast on the shaft 185, said shaft 185 also carrying a rock arm 191 pivotally connected to an upwardly extending link 192. Said link 192, when actuated, operates to control a deflector mechanism 195 associated with the master card eject pocket 26, see Fig. 1, in a manner fully described in said Patent 2,496,124.

Associated with said segregating mechanism is the usual manually settable control means for dissociating one or the other deflector mechanisms from the control of the comparing means. Said control means includes a manually settable segregation control lever 200 corresponding to the control lever 130 of said Patent 2,496,124. Said control lever is pivoted to the machine frame at 198 and has a rearwardly extending arm which is connected by a link 199 with the heretofore described stud 182. The setting of the control lever 200 operates through the link 199 to position the stud in relation to the different working faces on the rock arms 183, 184, all as described in aforesaid Patent 2,496,124. In its first or uppermost control position of lever 200, the stud 182 is positioned for engaging a working face on rock arm 183 and to be clear of any working face on rock arm 184. In such position, actuation of the stud 182 by one of the other segregating control cams will operate to control the detail card deflector 190 but will have no effect on the master card deflector 195. In the intermediate or second position of lever 200, stud 182 is in position to engage a working face on the arm 184 and to be clear of any working face on the arm 183. In this position, actuation of the stud 182 by one or the other segregating control cams will cause control of the master card deflector 195 but will have no effect on the detail card deflector 190. In the low or third position of lever 200, the control lever is effective for raising the stud 182 to a point where it can engage working faces on both rock arms 183, 184. When set in this position, actuation of a link 181 and stud 182 by one or the other of the segregating control cams will cause operation of both the master card deflector 195 and the detail card deflector 190.

It should, of course, be understood that the deflector mechanisms 190 and 195 may be operated in either of two ways, i. e., moved from closed to open position or moved from open to closed position depending upon the setting of interfiling control means as fully described in the aforesaid Patent 2,496,124. Said interfiling control means includes an interfiling control dial 205, corresponding to the control dial 259 of said patent, said control dial being manually rotatable to place the interfiling control mechanism in one of four control positions. The interfile control dial 205 in addition to pre-conditioning the operation of the deflector 190 for the detail card pocket 23 and deflector 195 for the master card pocket 26, also actuates linkage for setting a deflector 210 associated with a detail receiver pocket 24 and also a deflector 215 associated with the master card receiver pocket 27, see Fig. 1. In describing briefly the operation of the interfile control dial, it will be assumed that the machine is operating under the control of a segregation control cam wherein the high dwell of the cam is effective on conditions of non-match. In the first or inoperative setting of the interfile control dial 205 the deflectors 210, 215 are maintained in an open position so that neither the master or detail card may feed to the interfile pocket 25. In this position of the interfile control dial 205, a high dwell on a segregating control cam operates through the segregating linkage to move the deflectors 190, 195 from a closed to an open position. Since it is assumed that the machine is operating under the control of a cam wherein the high dwell is effective on non-match condition, it will be seen that all cards which feed as non-matching cards will be deflected into a respective eject pocket 23 or 26. Likewise all cards which are fed as matching cards will be deflected into their respective receiver pockets 24 or 27. In the second or "match" setting of the interfile control dial 205 the respective eject pocket deflectors 190, 195 are operated in the same manner and under the same comparing conditions. However, in this setting, the deflectors 210, 215 for the receiver pockets are cammed from an open to a closed position. Accordingly, any card feeding on a matching comparing condition will be fed to the interfile pocket 25. It will be understood, as pointed out in said patent, that when employing a feeding operation wherein both master and detail cards feed simultaneously on a match condition, the master card will reach the interfile pocket at a time in advance of the detail card.

In the third or "all" setting of the interfile control dial 205, the deflectors 210, 215 for the receiver pockets respectively are maintained in a closed position and the deflectors 190, 195 are dissociated from the control of the segregating controlling cam. Accordingly, said deflectors 190, 195 are maintained in a closed position regardless of the condition of comparison. Accordingly, all master and detail records fed when the interfile control dial is set at its third position are fed to the interfile pocket 25.

In the fourth or "non-match" position of the interfile control dial 205, the deflectors 210, 215 for the respective receiver pockets are maintained in closed position and the deflectors 190, 195 are shifted from the normally closed position to a normally open position. In this fourth setting, the high dwell of the segregating control cam operates in a manner substantially reverse to the operation under the second setting so as to rock the deflectors 190, 195 from an open position to a closed position. Accordingly, in this fourth setting of the control dial 205, cards feeding as matching cards will be deflected into the respective eject pockets 23 or 26. The cards feeding as non-matching cards will be fed to the interfile pocket 25.

The two punch control cams 161 and the two segregating control cams 161 are selectively brought into operation by novel and improved means which permit a much greater flexibility of operation than is possible in the machine disclosed in the copending application S. N. 152,728, which novel mechanism also permits of a joint control by the comparing and the sequence detecting means in a manner which will be hereinafter more fully set forth. As can be seen in Figs. 4 and 9, the four selecting levers 141 associated with the two punch control cams and the two segregating control cams are provided at their forward end with individual bell cranks 220, one arm of which is in the form of a hook 221, the other arm of which carries a roller 222. The rollers 222 are disposed for engagement by cam lobes 223, similar to cam lobes 156, which are selectively inserted at appropriate locations in the hub of a punching and segregating control dial 225. Said dial is mounted in the frame casting of the machine in a manner similar to the feeding function selecting dial 155 and is manually settable in one of eight different positions. The cam lobes 223 are effective for positioning the hook portions 221 of the bell cranks 220 into and out of engageable relation with a bail rod 227, said bail rod being carried between a pair of rock arms 228 fast on a rock shaft 230. The shaft 230 is rocked under control of a sequence detecting mechanism, as hereinafter more fully described, and when rocked clockwise from the position shown in Fig. 4, will cause any bell crank 220 which may be in engageable relation therewith to rock its associated selecting lever 141 clockwise so as to bring its associated follower bell crank 162 into engageable relation with its associated function control cam 161. It will be noted that the cam lobes 223 when in effective position, maintain the hook portion 221 of the bell cranks out of engageable relation with the bail 227. The absence of a cam lobe 223 permits bell cranks 220 to assume position where the hook portion 221 is directly below and in engageable relation with the bail rod 227.

The eight set positions of the punching and segregating control dial 225 are as follows, it being understood that the abbreviation M indicates a match condition and the abbreviation N indicates a non-matched condition, said abbreviations when appearing on the left of the diagonal line indicate that punching is effected at the designated comparing condition and when appearing at the right of the diagonal line, indicates that segregation is effected for the designated comparing condition.

M/M—Punch Match, Segregate Match
M/—Punch Match, No Segregation
M–N/M—Punch Match and Non-Match, Segregate Match
N/N—Punch Non-Match, Segregate Non-Match
N/—Punch Non-Match, No Segregation
M–N/N—Punch Match and Non-Match, Segregate Non-Match
M/N—Punch Match, Segregate Non-Match
N/M—Punch Non-Match, Segregate Match The provision of a separate segregating and punching control dial 225 permits any one of said eight punching and segregating functions to be employed in combination with any one of the eight feeding functions which may be selected by the feeding function selecting dial 155. Thus, it will be seen, that a much wider range of combined functions is possible with the present machine than in the machine as heretofore known wherein the feeding, punching and segregating functions were selected through the setting of a single control dial.

As seen in Figs. 5 through 8, an improved sequence detecting mechanism is provided and is comprised of opposed rows or banks of pins 235, 236. As viewed in Fig. 8, the left hand or front group of rows of pins 235 are adapted in a two file operation to receive impulses from the lower or detail card sensing chamber. Similarly, the right hand or rear group of pins 236 are adapted to receive signals from the upper or master card sensing chamber. An alternate use of these rows or banks, in association with single file operations employing the detail card sensing chamber alone or the master card sensing chamber alone, will be fully described hereinafter.

Supporting the rows of pins 235, 236, is a framework, joined together by a plurality of upright frame bars 238 forming a box-like pin supporting structure, including an upper frame plate 240 and a lower frame plate 241. Mounted on bars 238 are comb plates 242 and spacer bars 243 for supporting in lateral alignment columns of pins 235, 236 respectively.

On the left hand group of pins 235 are extrusions 244 which reside within windows on slides 245, hereinafter referred to as locking slides. The extrusions 244 are adapted to move over nose portions 246 of slides 235 and to be held therebeneath upon the depression of pins 235. Provided on the right hand group of pins 236 are extrusions 247 which reside within windows on slides 248, hereinafter referred to as change of designation slides. The extrusions 247 are adapted to oscillate the change of designation slides by riding over camming nose portions 249 in the windows of each slide 248.

Each of the slides 245 and 248 are supported by combs and are associated with a respective column of pins 235, 236, there being six pins in each column corresponding to the powers 90 column code, said code being well known in the art. For the purpose of illustration in this application, 15 columns of pins are shown, although a lesser or greater number could be employed, as desired.

Flags 251 on the zero pin of each column cooperate with extrusions 252 on the other pins of the same column to provide an automatic zero mechanism substantially of the character described in the above application S. N. 152,728. As disclosed in the said application, legs 253 on each of the zero pins depend from the pins proper and normally reside in notches 254 provided in sequence sensing slides 255.

Figure 6:
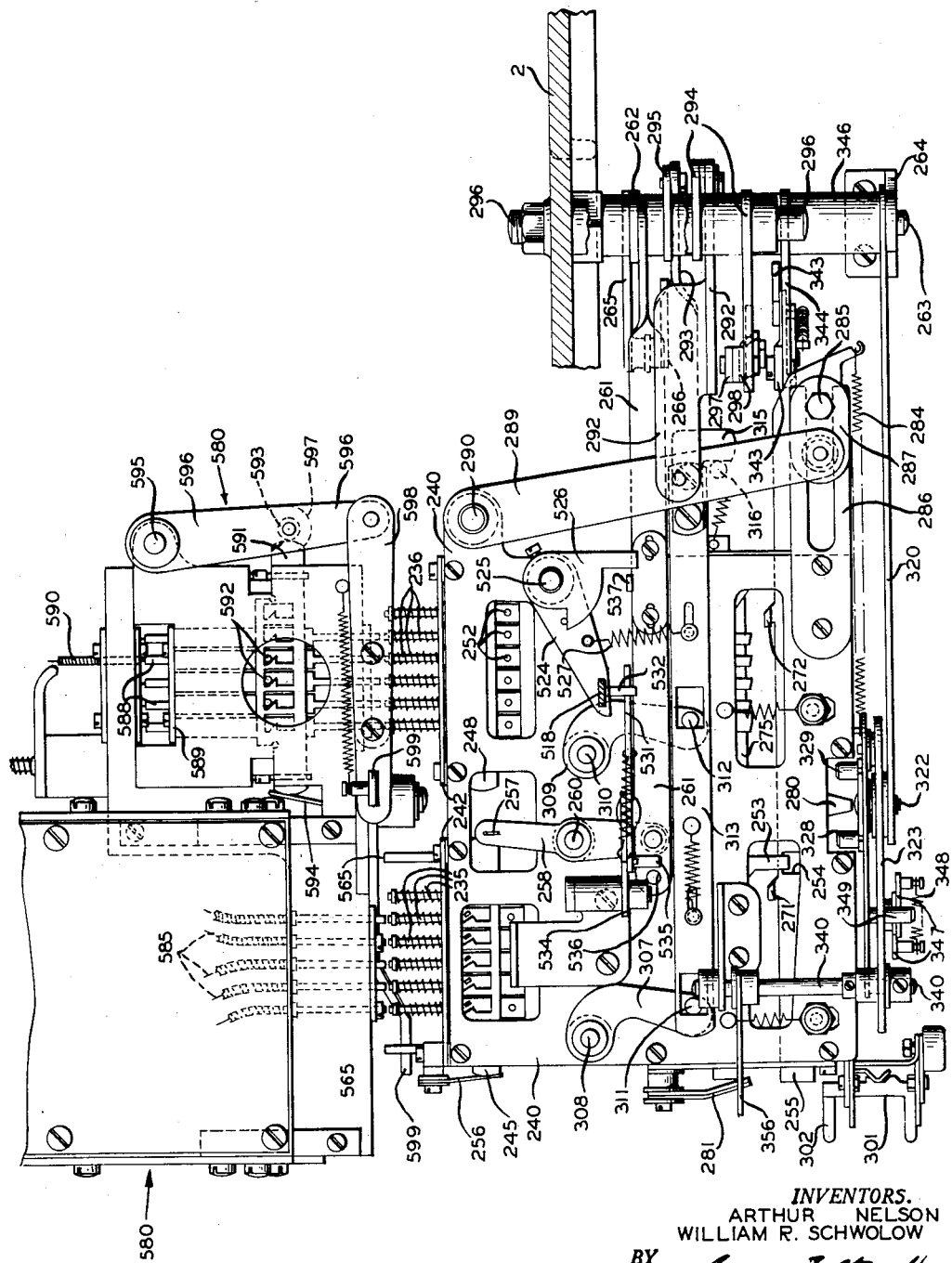
Fig. 6 is a plan view of the sequence detecting unit in conjunction with the wiring unit employed in single file self-sequencing operations.
Figure 8:
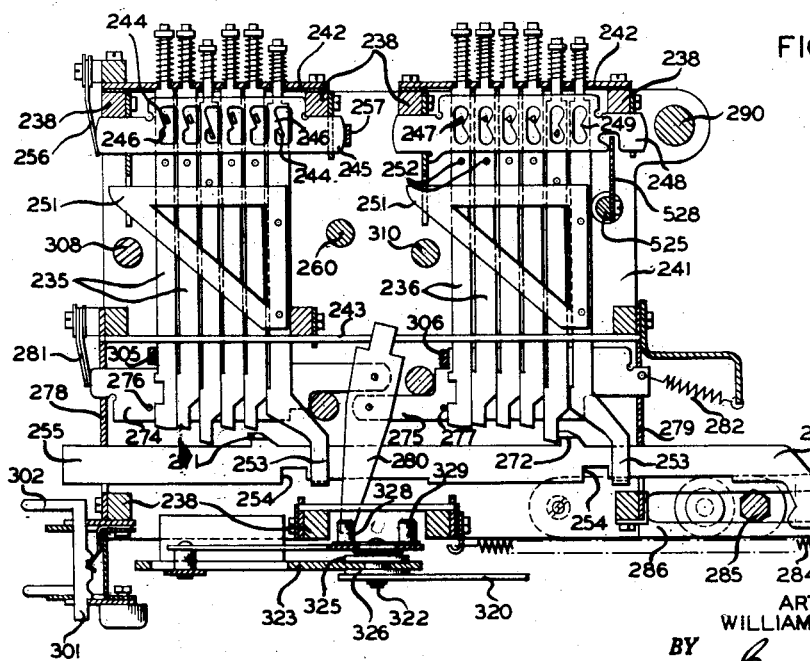
Fig. 8 is a plan view in section of the sequence detecting unit, illustrating the position of the parts upon detection of an unequal sequence relationship.

The locking slides 245 are urged toward the right as viewed in Fig. 8 under the action of springs 256 to maintain the locking slides 245 in cooperable relation with a bail 257. The bail 257 is part of a retract mechanism which, as shown in Fig. 6 comprises rocker arms 258, one shown, carrying the bail and mounted on a shaft 260 passing through and journalled in frame plates 240, 241 of the sequence detecting unit. A retract link 261 pivotally connects the upper rocker arm 258 with a rock lever 262 mounted on a stud shaft 263.

The stud shaft 263 is supported at one end thereof by the right hand machine frame casting 2 and at its other end by a supporting bracket 264. As can be seen also in Figs. 5 and 10 the rock lever 262 is joined at its lower extremity with a bell crank 265 suitably pivoted to the machine frame casting 2, the horizontal arm of said bell crank being connected by a link 266 with a follower arm 267, see Fig. 10, carried by a pivot stud 268. Said follower arm is provided with a roller 269 disposed for bearing engagement with a locking slide retract cam 270 mounted on the rear main drive shaft 140. Said cam is effective for momentarily, at the completion of each cycle, pulling the retract link 261 rearwardly so as to rock the shaft 260 and thereby urge the locking slides 245 forwardly to release all pins 235 which had been held in locking engagement with the slide during the previous cycle.

Each of the pins 235, see Fig. 8, except the zero pin, are provided with shoulders engageable, when the pin is actuated, by an ear 271 formed on the associated sequence sensing slide 255. Each of the pins 236 similarly have shoulders engageable with an ear 272 formed on the sequence sensing slide 255.

As more fully described in said application 152,728 a link 274 cooperates with each column of pins 235 and a link 275 cooperates with each column of pins 236. Each of said links has a pin 276, 277 respectively disposed for bearing engagement with the side of the end or "9" pin of the respective column of pins 235, 236. Said links are suitably supported in combs 278, 279 and are pivoted to an indicating finger 280. The lateral compacting action of one or the other columns of pins 235, 236, acting through said links 274, 275 respectively operates to swing the indicating finger 280 in one or another direction so as to indicate the sequential relationship between the respective compared columns. Springs 281, 282 respectively urge the links 274, 275 to their normal position, in which position the finger 280 is in an intermediate position which indicates a condition of equality.

The sequence sensing slides 255 are adapted to operate individually under the action of springs 284 in cooperation with a bail 285 provided for releasing and restoring each sensing slide. The bail is constrained to move within the path defined by the bifurcate extension 286 extending laterally from the frame of the sequence detecting unit. The bail (Fig. 5) is connected at its upper and lower extremity to short links 287 and 288 which are in turn pivoted on rock arms 289 and 291 which are attached to a shaft 290 journalled in the frame of the sequence detecting unit. The rock arms 289 and 291 are pivotally joined by links 292, 293 to bell-cranks 294 and 295 respectively. Bell crank 294 is carried by a stud shaft 296 secured to the frame of the machine and bell crank 295 by shaft 263. Said bell cranks are connected to each other by a link 297. A link 298 connects said bell cranks to an arm 299, Fig. 10, journalled on pivot stud 268, said arm having a roller thereon adapted to follow the low and high dwells of slide restoring cam 300 secured to the drive shaft 140.

Upon the receipt of signals from the appropriate wiring unit inserted in place in the machine, the pins 235, 236 are depressed into the path of ears 271, 272 provided on the sensing slide 255 for each opposed column of the pins. As the cam actuated linkage operates the bail 285, the sensing slides are released individually under the action of their respective springs 284. As is described in the above cited application, S. N. 152,728, should an unequal condition exist between the left and right hand groups of columns of pins 235, 236, the fingers 280 will be rotated about their pivotal connections with links 274 and 275, respectively, in the following manner.

Should, for example, as is shown in Fig. 8, the right hand column of pins 236 represent the value of "1" and should the left hand column of pins 235 represent the value of "5," the sequence sensing slide 255 will first engage the "1" pin of the right hand group of pins 236 through ear 272. As the slide 255 continues to release further under the action of its respective spring 284, it will be seen that the "9" pin for the right hand group of pins 236 will engage the pin 277 and thereby move link 275 to the left against the action of spring 282. Accordingly, it will be seen that the finger 280 will rotate in a clockwise direction as viewed in Fig. 8 about its pivotal connection with the inner extremity of link 274, indicating that the value represented by pins 236 is lower than that represented by pins 235. It will be noted that each "9" pin for the right and left hand pins of each column of pins 235, 236 has a recess therein which cooperates with the pins 276 and 277 on links 274, 275 respectively. Should either column of pins 235, 236 have an even digital value represented therein, said recesses permit distinction to be made between even and odd values involving the same pin, as disclosed in application S. N. 152,728.

Manually operable lockout slides 301 are provided for each of the fifteen columns of the sequence detecting unit as is also disclosed in the above cited copending application. Thus, by the manual manipulation of protruding handles 302, a blocking shoulder of a lockout slide may be brought into engagement with the edge of a sensing slide 255. When a slide is locked out, the associated finger 280 is held in its intermediate position, indication a condition of equality.

Means are also provided for positively restoring the pins 235, 236 to their normal position, said means including a restoring bail 305 cooperating with the pins 235 and a bail 306 cooperating with the pins 236. The bail 305 is carried by a pair of rock arms 307, one shown in Fig. 6, said rock arms being fast on a rock shaft 308 journalled in the upper and lower frame plates 240, 241 of the sequence detecting unit. The bail 306 is similarly carried by a pair of rock arms 309 secured to opposite ends of a rock shaft 310 also journalled in the frame plate 240, 241. The uppermost arms 307, 309 respectively of each pair are provided with studs 311, 312, respectively, residing in windows of a restoring slide 313 slideably mounted on the top frame plate 240. Said slide is tensioned by a spring 314 to the left, as viewed in Fig. 6, and is provided with an ear 315 disposed for bearing engagement with a stud 316 carried by the rock arm 289 which, as heretofore described, operates to restore the sequence sensing slides 255. It will be seen that as the arm 289 is rocked counterclockwise to restore all the sensing slides 255, the slide 313 will, at the same time, be pulled from left to right causing a counterclockwise rotation of the rock shafts 308, 310 and thereby rocking the bails 305, 306 against the columns of pins 235, 236 to restore said columns of pins to their normal position.

The cross reading mechanism operates to read and interpret the position of the indicating fingers 280 and to transmit impulses to the sequence control means which controls the machine functions in the manner to be hereinafter described. The cross reading mechanism of the instant application is designed to sense the position of each finger 280 so as to determine whether a condition of equality or unequality exists in the respective denominational orders.

The cross reading mechanism comprises an elongated reading arm 320 which is operated from a cam in a manner to be described, so that the arm 320 traverses the setups of fingers 280 downwardly and upwardly during each machine cycle.

Figure 7:
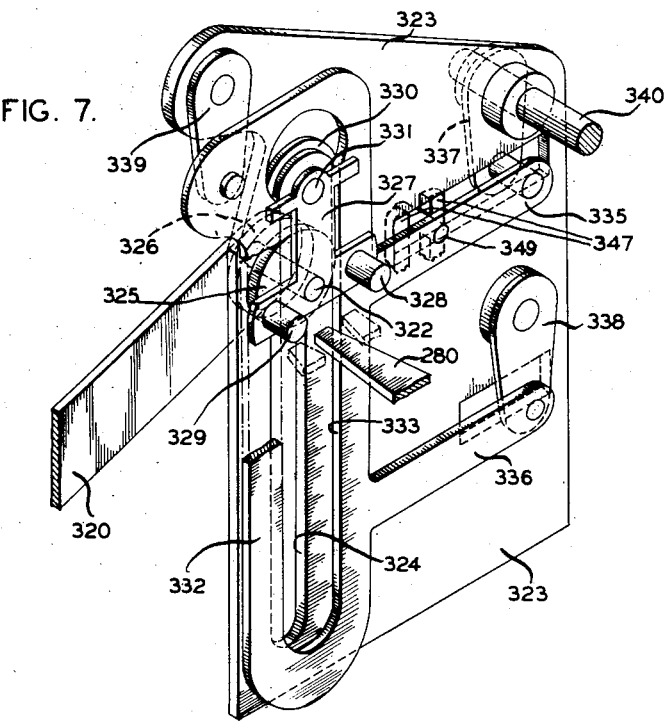
Fig. 7 is a detail view in perspective of the cross reading mechanism associated with the sequence detecting unit.

As viewed in Figs. 5 through 8, the arm 320 is slotted to receive a pin 322. Attached to the frame of the sequence detecting unit is a guide plate 323 having an elongated slot 324 opposite the normal position of fingers 280 and coextensive therewith. The pin 322 is constrained to ride in slot 324, in track-like manner, by washers 325 and 326 mounted on pin 322 on either side of plate 323. Carried by the inner end of pin 322, as viewed in Fig. 7, is an inverted T-shaped rocker 327. The rocker comprises a substantially vertical portion with laterally extending legs at the lower end thereof. The legs have respective studs 328, 329, adapted to engage the extremities of fingers 280 that happen to be displaced from normal position. Shoulders extend laterally from the upper end of the vertical portion of the rocker and cooperate with a flanged roller 330 journalled on a pin 331 which is carried by the rocker so as to embrace a floating follower member 332 between the rocker 327 and the roller 330.

The follower member 332 has an elongated slot 333 wherein the smaller circumference of roller 330 may ride in track-like manner. Arms 335 and 336 extend laterally from the follower member 332 and are loosely connected by pins to rock arms 337 and 338, respectively. The follower is also connected by a pin to a rock arm 339. The arms 338, 339 are pivoted on the guide plate 323, as best seen in Fig. 7, and act to support the floating follower member 332 as it is displaced laterally upon the reading of unequal relationships in the sequence detecting unit. The arm 337 is attached to rock shaft 340 journalled in plate 323, which shaft operates to transmit signals from the cross reading means to the sequence control means.

The cross reading means is operated to scan the sequence detecting unit in the following manner. The pivot stud 268, see Fig. 10, has a follower arm 341 journalled thereon. A roller 342 carried by arm 341 follows a cam 345 secured to rear drive shaft 140. A yieldable two piece link 343 is pivoted to the end of arm 341. The upper extremity of link 343 is pivoted to an arm 344, see also Fig. 5, which is in turn fast on a sleeve 346 journalled on stud shaft 263. Said sleeve also carries the cross reading arm 320.

As shaft 140 rotates, the cam 345 actuates arm 341 to displace link 343 downwardly and to rock arm 344. In this way, the cross reading arm 320 which is integral with arm 344 is moved downwardly to bring one of the studs 328, 329 of the rocker 327 into engagement with the extremities of the uppermost fingers 280, which has been displaced out of normal position. With the continued downward movement of the arm 320 along slot 324, the roller 330 will be displaced to cam the floating member 332 in one or another direction, depending upon the set-ups of fingers 280.

Figs. 11 and 12 illustrate the respective positions of the rocker 327 and the floating follower member 332 upon detecting the two conditions of unequality in the sequence detecting unit. Fig. 12 illustrates the position of the parts when the uppermost indicating finger 280, which registers an unequal condition, has been rocked clockwise to the position shown in Fig. 8, which position gives an indication, as heretofore described, that the value represented by the pins 236 is lower than the value represented in the pins 235 of the same denominational order. As the cross reading arm 320 is lowered the finger 280 is in position to engage the stud 328 on rocker 327 so as to tilt the rocker clockwise as shown in Fig. 12, thereby camming the floating follower 332 to the right. Accordingly, with this sequential relationship, the rock shaft 340 is rocked in a counterclockwise direction.

Fig. 11 shows the position of the parts when the uppermost indicating finger 280, indicating unequality, has been rocked counter-clockwise to give an indication that the value represented by the pins 235 is lower than the value represented by the pins 236. With this sequential condition the indicating finger 280 is in position to block the stud 329 of the rocker 327. Accordingly, in this instance the rocker 327 is tilted counter-clockwise thereby camming the floating follower 332 to the left so as to impart a clockwise rotation to the rock shaft 340. It should, of course, be understood that it is the uppermost indicating finger 280 of the bank of fingers which determines the position of the above described cross reading mechanism, the position of all fingers 280, below the first finger rocked to an unequal position, having no effect on the rocker 327. The wiring units of the machine, hereinafter described, between the sensing units and the sequence detecting units, are such as to associate the highest denominational order of the sequentially compared card fields with the uppermost indicating finger 280, the lower denominational orders in said sequentially compared card fields being associated with the progressively lower indicating fingers 280.

In the event that none of the indicating fingers 280 have been rocked in one or another direction to indicate a condition of unequality, the rocker 327 will maintain its normal untilted position throughout the whole cross reading cycle and the follower 332 will not be rocked in either dircetion so as to maintain the rock shaft 340 in its normal unrocked position which results from conditions of equality in the sequence detecting unit.

As can be best seen in Fig. 5 a centering mechanism is provided for maintaining the follower 332 in its normal or equal position. Said centering mechanism comprises a pair of spring urged arms 347 having a common pivot on the supporting plate 323 and yieldably engaging a pair of studs 348, 349. Stud 348 is a centering stud on the supporting plate 323, and stud 349 is formed on the arm 335 of the floating follower 332. The arms 347 yieldably maintain said studs in vertical alignment in which position the follower 332 is in its normal intermediate position indicative of a condition of equality.

A sequence control mechanism of improved form is provided to selectively control the transmission of equal and unequal impulses interpreted by the hereinabove described cross reading mechanism for effecting control of the machine functions, according to the impulses transmitted. As will be described hereinafter, these functions may be controlled through the receipt of impulses from either the sequence detecting unit or the comparing unit, or the machine may be conditioned to execute these functions under the joint control of both the sequence detecting unit and comparing unit acting in combination.

The means for receiving the impulses from the shaft 340 (Figs. 11 and 12) are comprised of a vertical T shaped link 355, which is connected by a transverse connecting link 356, to a rock arm 357 secured to the rock shaft 340. The T shaped link 355 is connected at its lower extremity to an operating link 358. The link 358 is guided by a stud 359 secured to the frame of the machine. The link 358 is reciprocated once in each machine cycle by a cam 360 fast on the front main drive shaft 60, operating through a follower roller 361 secured to arm 362, pivoted at one end to a pivot stud 363 on the side frame of the machine and at its other end to the link 358.

The upper extremity of the T shaped link 355 is guided for transverse movement within a slotted bracket (Fig. 5) fastened to the machine side frame. A sequence control member 364 is provided and has a knob 365 secured thereon, said knob constituting the head of a stud which is slideably mounted in a perforate area of the link 355 and passes therethrough to be adjustably retained thereon by suitable spring detent means. Depending from one side of the control member 364 are legs 366 and 367 adapted to engage studs 368 and 369 respectively, provided on a bell crank 370. Extending from the other side of member 364 is a third leg 371, which is shorter than legs 366, 367 and is adapted to engage stud 368 when the knob 365 is manipulated to rotate the control member 364 180° from the position shown in Fig. 11 to that shown in Fig. 12. A tail 372 also extends from the control member 364 so that when the knob 365 is rotated 180° to the position shown in Fig. 12, the tail 372 may engage with segregating control means hereinafter described.

The bell crank 370 is pivoted on a stud 375 suitably secured to the machine frame and, as more fully described in the copending application S. N. 152,728 may be rocked in one or another direction by the legs 366, 367 of the sequence control member 364, when in the position shown in Fig. 11, so as to control the feed of master and detail cards accordingly. A link 376, best seen in Fig. 10, connects the bell crank stud 369 with a rock arm 377 secured fast to the right hand end of a rock shaft 380. Said shaft, hereinafter referred to as a sequence feed control shaft, is suitably journalled in the left and right hand frame castings of the machine and corresponds to the feed control shaft 332 of said copending application S. N. 152,728. Near the left hand end of said sequence feed control shaft, as best seen in Figs. 9 and 13, is a rock arm 381 which operates through a yieldable scissors connection to control the feed control link 62, heretofore described. Said rock arm 381 carries a stud 382 yieldably engaged by the two arms 383 of a scissors clamp, said arms 383 being loosely mounted on the shaft 380. Also engaged by said scissors arms is a stud 384 carried by an actuating arm 385 also loosely mounted on the shaft 380. Said actuating arm 385 is provided with a second stud 386 bearing in a slot formed in the upper extremity of the feed control link 62. The arrangement is such that a rocking of the shaft 380 in one or another direction from a normal position may operate through the rock arm 381 and stud 386 to raise or lower the feed control link 62.

As heretofore mentioned, the position of the feed control link 62 is also under control of the comparing control feed shaft 150. In sequence control feeding operations, the comparing control feed shaft 150 is conditioned in one of three positions through the comparing control mechanism depending upon the feeding operation selected by the selector dial 155, as heretofore described. Figs. 4 and 13 show the respective positions of the parts when the machine is conditioned for feeding operation number 2 and with the sequence feed control shaft in its normal intermediate position indicative of equality in the sequence detecting unit. In this feeding operation, the comparing control feed shaft 150 has been rocked to its most counterclockwise position so as to lower the feed control link 62 to its lowermost position wherein the master card feed mechanism is disabled. Accordingly, when conditioned for feeding operation number 2, the counterclockwise rocking of the sequence control feed shaft 380 will not affect the position of the feed control link 62 since in such an event the stud 386 will merely ride idly in the slot of the feed control link 62. However, clockwise rocking of the sequence control feed shaft 380, from the position indicative of equality and shown in Fig. 13, will be effective for raising the feed control link 62 to its uppermost control position so as to disable the detail card feed mechanism and enable only the master card feed mechanism as heretofore described.

When the machine is conditioned for feeding operation number 1 by the selector dial 155, the comparing control feed shaft 150 is normally maintained in its intermediate position so as to hold the feed control link 62 in its intermediate control position in which position the stud 386 is intermediate the extremities of the slot when the sequence feed control link shaft 380 is in its normal unactuated or equal position. In feeding operation number 1, therefore, master cards and detail cards are permitted to feed as long as the sequence feed control shaft 380 maintains its normal position. However, a rocking of the sequence feed control shaft 380 in one or another direction as a result of unequal sequence conditions detected by the sequence detecting unit will operate to either lower or raise the feed control link 62 to its lowermost or uppermost control position so as to disable one or the other feed mechanism in the manner heretofore described.

In feeding operation number 3 the comparing control feed shaft 150 is conditioned to its most clockwise rocked position elevating the feed control link 62 to its uppermost control position wherein the stud 386 engages the lowermost extremity of the slot when the sequence control shaft 380 is in its intermediate or equal position. Accordingly, in feeding operation number 3 clockwise rocking of the sequence feed control shaft 380 is ineffective for changing the position of the link 62 since the stud 386 will merely ride idly in the slot of the link. However, counterclockwise rocking of the sequence feed control shaft 380 will be effective to lower the feed control link 62 to its lowermost control position so as to disable the master card feed mechanism and to enable only the detail card feed mechanism.

Fig. 11 illustrates the position of the sequence control mechanism in which a counterclockwise rotation is imparted to the sequence feed control shaft 380. As seen therein, the sequence control member 364 has been swung to the right in a position where the leg 366 overlies the stud 368. This position is effected by the cross reading mechanism heretofore described whenever the value represented by the pins 235 of the sequence detecting unit represent a lower value than the pins 236 of said sequence detecting unit. As hereinafter more fully described, in two file operations, the wiring units employed in such two file operations operatively interconnect the detail card sensing means with the pins 235 and the master card sensing means with the pins 236. Accordingly, Fig. 11 represents a condition where the sensed controlling field of a detail card is of lower value than the sensed controlling field of the master card. Under these conditions as the T link 355 is lowered by cam 360 the stud 368 is engaged causing a counterclockwise rocking of bell crank 370 and also through the link 376 a counter-clockwise rocking of the sequence feed control shaft 380. Accordingly, regardless of whether feeding operation 1, 2 or 3 is employed, under such a sequence relationship the feed control link 62 will be maintained in its lowermost control position so as to prevent the feed of the higher valued master card from the master card sensing chamber.

In the event that the sensed controlling field of the master card were lower in value than the sensed controlling field of the detail card, the sequence controlling member 364 would be swung to the left to a position where the leg 367 overlies the stud 369. Under this sequence condition, as the sequence control member 364 is lowered by cam 360, the bell crank 370 will be rocked in a clockwise direction to thereby impart a clockwise rotation to the sequence feed control shaft 380. Accordingly, under this sequence relationship, regardless of whether feeding operation 1, 2 or 3 is employed, the feed control link 62 will be maintained in its uppermost control position so as to prevent the feed of the higher valued detail card from the detail sensing chamber.

Figs. 5 and 10 illustrate the position of the sequence control member 364 when a sensed controlling field of the master card is equal to the sensed controlling field of the detail card. In this equal position, the legs 366, 367 are clear on their respective studs 368 and 369 so that as the sequence control member is lowered, there is no movement imparted to the bell crank 370 or sequence feed control shaft 380. When this equal sequence condition occurs, the position of the feed control link 62 is determined solely by the conditioning of the comparing control feed shaft 150 depending upon whether feeding operation 1, 2 or 3 is employed. In feeding operation 1, the comparing control feed shaft 150 positions the feed control link 62 in its intermediate control position, thereby enabling the simultaneous feeding of the equal master and detail cards. When feeding operation 2 is employed, the comparing control feed shaft 150 maintains the feed control link 62 in its lowermost control position so that the equal master card is held and only the equal detail card is permitted to feed. When feeding operation 3 is employed, the comparing control feed shaft 150 maintains the feed control link 62 in its uppermost control position so that the equal detail card is held in its sensing chamber and only the equal master card is permitted to feed.

Master or upper card holding control means are provided to condition the operation of the master card sensing chamber stops in a manner to modify feeding operation 2 to the extent of permitting the release, from the master card sensing chamber, of an equal master card although the feed of master cards from the master card magazine is disabled. Said modified feeding operation will be hereinafter referred to as feeding operation 2A. Said means include a master card holding control lever 390, best seen in Fig. 13, fast on a short shaft 391 suitably journalled in the left hand frame casting 1, said holding control lever being manually settable in one of three positions. Also fast on said rock shaft 391, see also Fig. 9, is a depending rock arm 392 carrying a stud 393 yieldably engaging a slot in a rearwardly extending cam link 394 under tension of a spring 395. The rearward end of said link 394 is formed with a slot engaging the supporting stud 103 for the master card stop disabling hook lever 101, heretofore described. Said master card stop hook lever 101 is formed with a forwardly extending arm carrying a stud 396 cooperating with one of three camming surfaces 397, 398, 399 formed on the link 394. The intermediate camming surface 398 represents a low dwell in relation to the stud 396 while the two oppositely disposed surfaces 397, 399 represent a high dwell position. Fig. 13 illustrates the intermediate or middle position of the holding control lever 390 wherein it will be seen the camming link 394 is yieldably maintained in position wherein the low dwell 398 aligns with stud 396 to permit the master card stop hook lever 101 to engage stud 102 under control of the feed control link 62 in the manner heretofore described. This intermediate setting of the holding control lever 390 is the normal setting employed in feeding operation 2 which permits the hook lever 101 to hold the master card stops closed whenever the master card feeding mechanism is disabled. Setting the holding control lever 390 in its uppermost position operates to slide the camming link 394 forwardly to a position where the camming surface 399 bears on stud 396 rocking the hook lever 101 clockwise out of engagement with its stud 102 regardless of the position of the feed control link 62 so as to permit the opening of the master sensing chamber card stops to release the master card from the sensing chamber even though the master card feed mechanism is disabled. When set in this position, a flag plate 401 secured to the camming link 394 is brought into engageable relation with a stud 402 secured to a rock arm 403 depending from and fast on the sequence feed control shaft 380. As heretofore described, the sequence feed control shaft 380 is rocked in a counterclockwise direction when the sensed value in the controlling field of the master card is lower than that of the detail card and maintains its normal intermediate position, as shown in Fig. 13, when the values of the respective master and detail cards are equal. Accordingly, with the machine conditioned for feeding operation 2A, the holding control lever being set in its uppermost position, upon the occurrence of an equal sequence relationship between the master and detail cards, the master card stop hook lever 101 is disabled so as to permit the release of the master card from the master card sensing chamber even though the master card feed mechanism is disabled. However, should the value of the master card be higher than the value of the detail card, the sequence feed control shaft 380 will be rocked counterclockwise whereby the stud 402 bearing on flag plate 401 will act to shift the camming link 394 rearwardly to its intermediate position permitting hook lever 101 to become effective for holding the master sensing chamber card stops closed to retain the higher valued master card in the master card sensing chamber.

When the holding control lever 390 is set in its lowermost position the camming link 394 is moved to its rearmost position wherein the camming surface 397 becomes effective to rock the hook lever 101 to its ineffective or disabled position. Since, in this third setting of the holding control lever 390, the flag plate 401 is removed from engageable relation with the stud 402 on rock arm 403, it will be apparent that the master card stops will be permitted to open each cycle so as to release any master card from the master card sensing chamber regardless of the sequence relationships that may be involved.

The sequence control mechanism is also adapted to deliver equal and unequal impulses to the segregating and punching control means in order that the segregating function and punching function of the machine may be selectively controlled in accordance with sequence relationships detected by the sequence detecting unit. As can be seen in Figs. 5 and 10 through 12, the means for transmitting unequal impulses include a link 405 slotted at its upper extremity to engage stud 368 and pivoted at its lower extremity to a stud 406 secured to an unequal control lever 407. A second unequal link 408 is pivotally connected at its upper extremity to the stud 369 and has a slot at its lower extremity also engaging the stud 406 on the unequal control lever, 407. Said unequal control lever 407 is loosely mounted on a sequence segregating and punching control shaft 410 which is suitably journalled in the left and right hand frame castings of the machine and which corresponds to the segregating control shaft 335 of the copending application S. N. 152,728. A spring 411 tensions the unequal control lever 407 in a counterclockwise direction so that the stud 368 normally rests at the bottom of the slot of link 405 and the stud 406 normally resides at the top of the slot of link 408. The arrangement is such that whenever the bell crank 370 is rocked in one or another direction as a result of an unequal sequence condition, one or the other unequal links 405, 408 will be effective for rocking the unequal control lever 407 in a clockwise direction. The unequal link 405 is also provided with a stud 409 which is disposed for engagement by the tail portion 372 of the sequence control lever 364 when said lever is rotated 180° and set for a single file operation, the position thereof which is shown in Fig. 12. Provision of this additional means for actuating the link 405 in single file operation results from the fact that the leg 371 of the sequence control member is shorter than legs 366 and 367 in order that in single file operations, as also described in said application, S. N. 152,728, only a half step rocking is given to the sequence feed control shaft 380. Provision of the stud 409 cooperating with the tail 372 permits a full rocking movement to be imparted to the unequal control lever 407 under such circumstances.

The means for imparting an equal impulse to the punching and segregating control shaft includes an equal link 412 slotted at its upper extremity to engage the pivot stud 375 for bell crank 370, and pivoted at its lower extremity to a stud 413 carried by an equal control lever 414 loosely mounted on the sequence punching and segregating control shaft 410. Said equal link 412 functions in a manner different from that of the equal link 289 of pending application S. N. 152,728, since the instant arrangement permits equal impulses to be transmitted in both single file and two file operations. The upper extremity of said link 412 is formed with a shoulder 415 disposed for engagement by the mounting stub integral with the control knob 365 of the sequence control member 364 when maintained in an equal indicating position. A spring 416, connected to the equal control lever 414 yieldably maintains the equal link 412 in its uppermost position. The arrangement is such that whenever the sequence control lever 364 is maintained in its normal intermediate position, that shown in Figs. 5 and 10, which position indicates a condition of equality, regardless of whether it is set for a single file operation or a two file operation, depression of the T link 355 by cam 360 will operate to depress the equal link 412 to rock the equal control lever 414 clockwise so as to give an impulse indicative of the condition of equality.

The respective equal and unequal impulses resulting from the actuation of said links may be selectively employed to actuate the sequence punching and segregating control shaft 410, through manually settable control means, which include an unequal control button 420 and an equal control button 425 carried by a crank arm 421 fast on the sequence punching and segregating control shaft 410. Each of said control buttons 425 is of the plunger type so as to be manually set in an effective or ineffective position. The unequal sequence control button 420 when set to its in or effective position engages a hole in the unequal control lever 407 so as to interconnect said control lever with the crank arm 421. The equal sequence control button 425 when set to its in position engages a hole in the equal control lever 414 so os to connect said equal control lever with the crank arm 421. Said control buttons 420, 425 when set to their out or ineffective position disconnect the respective control levers 407, 414 from the crank arm 421.

Accordingly, from the foregoing it will be seen that depending upon the manual setting of the control buttons 420, 425, the sequence punching and segregating control shaft 410 may be rocked in a clockwise direction upon the occurrence of either an unequal sequence condition or of an equal sequence condition in the sequence detecting unit. When both sequence control buttons 420, 425 are set to their in or effective positions, the control shaft 410 will be rocked under all sequence conditions. When both buttons are set in their out or ineffective settings the control shaft 410 is not actuated under any sequence condition. It should be here pointed out that in some operations it is desired that the punching and segregating control be effected solely from the comparing means of the machine and completely dissociated from control by the sequence control means. For such operations, the sequence control means may be disabled either by removal of the appropriate wiring unit or by disabling of the sequence sensing slides 255, see Fig. 8, by means of the lock-out slides 301. When thus disabled the sequence detecting unit will always register a condition of equality. Accordingly, if under these circumstances, the equal control button 425 is set to an effective position, the sequence punching and segregating control shaft 410 will be rocked each operating cycle regardless of the sequential relationships in the sequence controlling fields of the respective master and detail cards. Rocking of the shaft 410 each operating cycle permits the punching and controlling functions of the machine to be controlled solely by the comparing mechanism through the function control shaft 135 and cams mounted thereon in accordance with the setting of the punching and segregating contral dial 225 as will become hereinafter more fully apparent.

Near the left hand end of the sequence punching and segregating control shaft 410, as best seen in Fig. 9, is a rock arm 426 bifurcated to engage a stud 427 on a rock arm 428. The arm 428 is secured fast to the punching and segregating control shaft 230, see also Figs. 2 and 4, which as heretofore described, carries a bail 227 cooperating with the four bell cranks 220 which may be selectably enabled for effecting the desired punching and segregating functions in accordance with the setting of the punching and segregating control dial 225. The rocking of the sequence punching and segregating control shaft 410 is a result of an equal or unequal sequence condition as desired, operates to rock the shaft 230 clockwise as viewed in Fig. 4, lowering the bail 227 so that any one or combination of the bell cranks 220 which may be selected in the particular operation will operate to swing the associated selecting lever 141 to a position where the associated bell crank follower 162 may be placed under control of the respective punching and segregating comparing control cam 161.

Through the aforementioned means it will be seen that a joint control may be exercised over the punching and the segregating functions of the machine. The joint control is derived on the one hand from the comparing mechanism through the comparing function control shaft 135 and associated punching and segregating control cams 161 and on the other hand from the sequence control means through the punching and segregating control shafts 410, 230. It will, of course, be understood that in such a jointly controlled operation the wiring units employed operate to connect the comparing mechanism and the sequence detecting mechanism with different controlling fields of the respective master and detail cards. As heretofore described the punching and segregating control dial 225 is settable to one of eight different positions so as to achieve any one of eight different combinations of punching and segregating functions as a result of the match or non-match condition determined by the comparing means. However, none of said combinations of said punching and segregating functions can be effected in the absence of an impulse or rocking of the sequence punching and segregating control shaft 410, 230. By proper setting of the sequence control buttons 420, 425 the sequence punching and segregating control shafts 410, 230 may be rocked only on an unequal condition, only as a result of an equal condition, or, when both buttons are effective, the shaft will be rocked on either an equal or unequal sequence condition. When the unequal sequence control button 420 is alone set to effective position, the selected one of the eight punching and segregating functions through dial 225 can be effected only when the sequentially compared fields of the respective master and detail records are unequal. When the equal sequence control button 425 is alone set to its effective position, the selected one of the eight punching and segregating comparing control functions can be effected only when the sequentially compared card fields of the respective records are equal. When both the equal and unequal sequence control buttons 425, 420 respectively are rendered effective, the selected one of the eight punching and segregating functions may be effected upon the occurence of the proper match or non match relationship in the compared card fields regardless of whether the sequentially compared card fields are equal or unequal.

For some operations, it is desired that the punching and segregating functions of the machine be controlled solely by the sequence control means without the exercise of joint control by the comparing means. For effecting this type of operation, the comparing slides 133, see Fig. 1, of the comparing unit are disabled by manually settable means well known in the art and fully disclosed in the patent to Braun 2,211,094. When so disabled, the function control shaft 135 operated by the comparing unit, together with the punching and segregating control cams 161 thereon, are maintained in a position indicative of a matched condition. The punching and segregating control dial 225 is set in a position wherein the desired punching or segregating control function will be effected as a result of a matched condition. When preconditioned in this manner, the selected punching and segregating function can be effected by either an unequal sequence relationship in the sequentially compared card fields or by an equal relationship in said sequentially compared card fields depending upon the setting of the sequence control buttons 420, 425. When only the unequal sequence control button 420 is effective the function selected by the punching and selecting control dial 225 to result from a match condition will result upon the occurrence of an unequal condition in the sequence controlling unit. When only the equal sequence button 425 is rendered effective, the punching and segregating function selected by the punching and segregating control dial 225 to result from a match condition in the comparing unit, will result upon the occurrence of an equal condition in the sequence detecting unit. Since, in this type of operation, the comparing unit, being disabled, always registers a match condition, the effect is to place the punching and segregating functions of the machine solely under the control of the sequence detecting unit.

In other types of operations, it is desired to control the punching and segregating functions solely from the comparing unit without the exercise of joint control by the sequence controlling means. For this type of operation, the comparing means are rendered effective and the sequence controlling means are conditioned in one of two ways depending on whether it is desired to control the feeding functions by the sequence controlling means. When it is desired that only the feeding functions be under sequence control, both the unequal and equal sequence control buttons 420, 425 are are set in their effective position. The punching and segregating control dial 225 is set to select the desired punching or segregating function in accordance with match or non-match conditions of the comparing control means. When conditioned in this manner, it will be seen that the sequence punching and segregating control shafts 410, 230 will be operated each cycle regardless of equal or unequal sequence relationships with the result that the desired punching and segregating function is selectively controlled solely by the comparing unit through the control cams 161 and function control shaft 135. In the event it is desired to place both the feeding functions together with the punching and segregating functions under comparing control alone, the sequence detecting unit is disabled in the manner heretofore described, by means of the lock out slides 301, see Fig. 8. When thus disabled, the sequence detecting unit will always register a condition of equality. The equal sequence control button 425 is set to its effective position so as to actuate the sequence segregation control shafts 410, 230 each operating cycle. The feeding function selector dial 135 is set in one of its five positions 4 through 8, wherein the feeding functions are selectively controlled by the feeding control cam 136 on the comparing function control shaft 135. The desired punching and segregating function is selected by the setting of the punching and segregating control dial 225. When conditioned in this manner, the punching and segregating function together with the feeding functions of the machine are solely under the selective control of the comparing unit.

Figs. 14 and 15 illustrate the wiring units which are employed for a two file operation. Fig. 1 also shows the manner in which the machine is wired for a two file operation. Said wiring units include a sequencing and comparing unit 16 and a sequencing and punching unit 29, said units being of the usual box like frame construction and supported in the machine on rails 431, 432 suitably secured to and between the machine side frame castings 1 and 2 respectively. The sequencing and comparing unit 16 includes the usual field of upper pins 433 operatively associated with the comparing pins 132 of the detail side of the comparing pin assembly 130 and a field of lower pins 434 operatively associated with the pins of the set pin assembly associated with the detail sensing pin box 14. Bowden wires 435 interconnect the pins 433, 434 so as to interconnect all fields of the detail sensing mechanism with the detail side of the comparing pin assembly. Mounted on the side of the unit is an outlet plate 436 in which are mounted pins 437 which are disposed to engage the pins 235 of the detail side of the sequence detecting unit. Bowden wires 438 interconnect the pins 437 with selected ones of the pins 434. In this manner it will be seen that all fields of the detail card are operatively associated with the comparing means and a predetermined field of the detail card, hereinafter referred to as the detail card sequence control field, is also operatively associated with the sequence detecting unit.

The sequencing and punching wiring unit 29 is provided with upper and lower pins 441, 442, respectively, interconnected by Bowden wire 443. Said unit also is provided with a side outlet plate 444 in which are mounted pins 445 disposed to engage the pins 236 of the master card side of the sequence detecting unit. Bowden wires 446 interconnect the pins 445 with predetermined ones of the pins 441. In this manner, the sequencing and punching unit is effective for operatively associating all fields of the master card, through the comparing pins 132 of the master side of the comparing pin assembly 131, with the punch set bar mechanism 28. At the same time, a predetermined field of the master card, hereinafter referred to as the master card sequence control field, is also operatively associated with the master side of the sequence detecting unit. Although said wiring units operatively associate all fields of the respective master and detail cards with the comparing mechanism, it should be understood that, through well known disabling means associated with the comparing means, only selected fields of the respective cards are ordinarily employed for comparing control purposes, in a combined sequence and comparing control operation. Any field of the respective cards other than the predetermined field wired to the sequence detecting unit may be employed for comparing control purposes, said fields to be hereinafter referred to as the comparing control fields of the respective master and detail cards.

Figures 27 and 28 illustrate schematically two different forms of two-file operations, Fig. 27 illustrating an operation wherein the segregating function is solely under sequence control, Fig. 28 illustrating an operation where the segregating and punching functions are under the combined sequence and comparing control. The example illustrated in Fig. 27 is one employing feeding operation 1 which, as heretofore mentioned, operates to feed both cards simultaneously when the sequentially compared cards are equal and to feed the low order card from either the master or detail magazine when the sequentially compared cards are unequal. In this operation, it is not desired to punch any detail card but only to segregate both master and detail cards which feed as unequals and to interfile both master and detail cards which feed as equals. The various settings of the controls are as indicated, the sequence control knob 365 being set in position for a two file operation. The equal signal control button 425 is set out or ineffective and the unequal signal control button 420 is set in or effective so as to provide the necessary impulse for the segregating function as a result of unequal sequence relationships. The upper card holding control lever 390 is set in its center position so as to hold the master cards in the sensing chamber in all instances except when the master card feed mechanism is operating. The punching control lever 175 is set in its "up" position so as to disable the punching mechanism under all conditions. The segregation control lever 200 is set to enable operation of both the deflector 195 for the upper segregating pocket 26 and the deflector 190 for the lower segregating pocket 23 as a result of a segregating impulse, since in this operation it is desired to segregate both master and detail cards. The punching and segregating control dial 225 is set to punch on match and to segregate on match. However, as heretofore explained, in a sequence controlled operation, the comparing mechanism is disabled, and when disabled, always registers a matched condition. Accordingly, this setting of the dial 225 enables the impulse from the sequence controlled mechanism to be transmitted to the segregating and punching mechanism. The fact that this setting also calls for a punching on match condition is immaterial since the punch control lever 175 has been set to disable punching under all conditions. The interfiling control dial 205 has been set at its No. 2 match setting in order that the segregating impulse will operate the deflectors 195, 190 respectively from a closed to open position rather than vice versa.

In the first sequentially comparing cycle, the first detail card "D1" will be sequentially compared with the first master card "M1" to result in a condition of equality. Both cards will feed simultaneously, and since the equal signal control button 425 is ineffective, there will be no impulse to the segregating mechanism and both cards will feed to the interfile pocket 25, the master card reaching the pocket in advance of the detail card.

In the second sequentially comparing cycle, cards "D2" and "M2" will also result in a condition of equality so as to feed simultaneously in the same manner to the interfile pocket 25.

In the third cycle, cards "D4" and "M3" will result in a condition of inequality with the master card being of the lower order. As a result only card "M3" will feed and since the unequal signal control button 420 is effective, the sequence segregating control shaft 410 will be rocked rendering the segregating mechanism effective to open deflectors 195 so as to segregate the master card "M3" into the upper or master eject pocket 26.

In the fourth cycle, card "D4" will be sequentially compared with card "M5" to result in a condition of unequality with the detail card being of the lower order. Accordingly, only card "D4" will feed and since the segregating mechanism is actuated in the same manner as in the preceding cycle, the card "D4" will be segregated in the lower or detail eject pocket 23.

In the fifth cycle, cards "D5" and "M5" will result in a condition of equality so as to feed simultaneously to the interfile pocket 25 as in the first two cycles herein above described.

In the sixth cycle, cards "D6" and "M7" will result in a condition of inequality with the detail card of lower order. Accordingly, only the detail card will feed and will be segregated in the detail eject pocket 23.

In the seventh cycle, cards "D9" and "M7" will result in an unequal condition with the master card being of the lower order so as to permit feed of only the master card to the master card eject pocket 26.

Likewise the next master card "M8" will also be unequal and of low order with regard to detail card "D9" so as to cause feed of only card "M8" to the master card eject pocket 26.

In the ninth cycle, cards "D9" and "M9" will be sequentially compared as equals so as to feed simultaneously to the interfile pocket 25.

The designations "U" and "E" appearing in the lower left hand corner of the cards in the respective pockets, indicate the sequential condition under which the respective cards were fed. It will be seen that all cards in the interfile pocket 25 were fed as a result of an equal sequential relationship. All segregated cards in the pockets 23, 26 respectively were fed to said pockets as a result of an unequal sequential relationship.

It should be understood that the operation shown in Fig. 27 is illustrative only of one of many different variations of operations which may be performed under sequence control. For example, if the punch control lever 175 were set instead in its down (selective) setting, all unequal detail cards in addition to being segregated would also be punched in accordance with any selected field of the master card. In the event that the equal signal control button 425 were rendered effective and the unequal button 420 ineffective, all the cards feeding as equals, shown in interfile pocket 25, would instead be segregated in the respective pockets 26, 23, and all the unequal cards, shown as segregated, would be fed to the interfile pocket 25.

In the example shown in Fig. 28, feeding operation No. 2 is employed in conjunction with combined sequence and comparing control of the punching and segregating functions, wherein it is desired to punch the detail equal-match and equal-nonmatch cards, to segregate only detail equal-nonmatch cards and to interfile all master and detail cards except detail equal-nonmatch cards. In this illustration "S" designates, in conjunction with the respective numerals, the value punched in the sequence controlling fields of the respective cards, while the designation "C" in conjunction with the associated numeral indicates the value punched in the comparing control fields of the respective cards. The letters "E," "U," "M" and "N" when appearing in the lower left hand corner of the respective cards in the pockets indicate the respective equal or unequal, match or non-match, relationship under which the cards were fed. The letter "M" also designates a master card, but when so used it is employed in conjunction with the value indicating designations in the respective controlling fields and appears in the lower right hand corner of the respective cards. The letter "P" when appearing in the lower left hand corner of the respective cards indicates that that card has been punched.

In this operation, it will be noted that the equal sequence signal control button 425 is effective while the unequal button 420 is ineffective. The punching control lever 175 is at its down (selective) setting and the segregation control lever 200 is set so as to segregate only the lower or detail cards. The punching and segregating control dial 225 is set so as to punch on a match or non-match condition in the comparing control card fields and to segregate only as a result of a non-match condition in the comparing control card fields.

In the first operating cycle, the first detail card "D (S1–C1)" will be compared with the first master card "M (S1–C1)" to result in an equal condition in the sequence controlling fields and a match condition in the comparing controlling fields. Since feeding operation No. 2 is employed, only the detail card will feed as an equal. Since the equal sequence signal control button 425 is effective and the punching and segregating control dial 225 is set to punch on a match or non-match condition, said first detail card will be punched. Since the punching and segregating control dial 225 is set to segregate only non-match cards, said first detail card will not be segregated but will feed to the interfile pocket 25.

In the second cycle, the second detail card "D (S1–C2)" will be compared with the first master card to result in an equal-non-match condition. As a result, only said second detail card will feed as an equal and will also be punched because of the equal sequential relationship. However, as a result of the non-match relationship in the comparing control fields, said second detail card will be segregated into the detail eject pocket 23.

In the third comparing cycle, the third detail card will be compared with the first master card and in this case the respective fields will produce an unequal-match relationship with the master card being of the lower order. In this case, only the first master card will be fed as an unequal, and since the unequal signal control button 420 is ineffective and also because the segregating control lever is set to segregate only the lower or detail cards, said first master card will feed to the interfile pocket 25.

In the fourth cycle, the third detail card and second master card will result in an equal non-match relationship. Accordingly, only the third detail card will feed as an equal and because of the equality, will also be punched, said third detail card will also be segregated into pocket 23 because of the non-match relationship in the comparing control card fields.

In the fifth cycle, the fourth detail card "D (S3–C2)" and second master card "M (S2–C2)" will result in an unequal match relationship with the master card being of the lower order in the sequential controlling fields. Only the second master card will feed as an unequal and will be interfiled in the interfile pocket 25.

In the sixth cycle, the fourth detail card and third master card will result in an equal non-match relationship. Accordingly, only the fourth detail card will feed as an equal and will be punched and segregated into pocket 23.

It will be seen that the remaining cards in the respective magazines 18 and 10 will be selectively fed, punched and segregated in the same manner. The master cards will feed only when they are equal in the sequential controlling field, and every master card feeds to the interfile pocket 25. Detail cards will feed either when equal or when of lower order in the sequence controlling field. All detail cards fed as equals will also be punched regardless of the relationship in the comparing control fields. Equal detail cards which also match in the comparing control fields will be fed to the interfile pocket 25 while equal detail cards non-matching in the comparing control fields will be segregated into pocket 23. All detail cards feeding as unequals, of which there is none shown in the illustrated example, would, because the unequal signal control button 420 is ineffective, not be punched and would not be segregated and so would feed through the interfile pocket 25. Accordingly, it will be seen that in this type of operation, the segregating and punching functions of the machine may be placed under the combined control of the sequence relationships and the compared relationships between the respective cards. This is specifically illustrated with regard to the detail segregating function of the illustrated example. In this example, although the setting of the punching and segregating control dial 225 and equal signal control button 425 results in punching all equal detail cards regardless of the relationship in the comparing control fields, which in effect puts the punching function under the sole control of the sequence controlling mechanism, the segregation of detail cards is, however, under joint sequence and comparing control since detail segregation will occur only when the selected equal relationship exists in the sequence controlling fields and only when the selected non-match relationship exists in the comparing control fields.

It will, of course, be understood that by different control settings many variations of the operation illustrated in Fig. 28 may be effected under combined sequence and comparing control. For example, if the unequal sequence signal control button 420 were made effective, with the equal button 425 ineffective, and with all other controls in the same setting, all detail cards feeding as unequals will be punched, and all unequal detail cards which also do not match in the comparing control fields would be segregated into pocket 23. All detail cards feeding as equals would not be punched and would be fed to the interfile pocket 25. With this latter setting of the controls, and if the segregation control lever 200 were set in position to segregate both master and detail records, all master cards feeding as unequals which did not match in the comparing control field would likewise be segregated in the respective master card pocket 26.

From the foregoing, it will be apparent that should there be a plurality of detail cards in succession with identical punching so as to constitute an equal detail card group, the punching and segregating functions of the machine would be the same with regard to each card of any such group. Similarly, should there be a succession of detail cards which, although not punched identically, when compared with the same master card result in the same relationship in both the sequence and comparing control fields, the punching and segregating functions of the machine will also be the same for each card of any such group. Such a succession of cards will be hereinafter referred to as an unequal card group. The former mentioned group will be hereinafter referred to as an equal card group. In some operations, it is desired that the punching and segregating functions be modified with regard to the cards within any one such group, and for this reason, means are provided in the instant machine which permit the punching and/or interfiling of only the first card of any such detail card group, the remaining cards of any such group not being punched or interfiled as desired.

The mechanism for achieving this function can best be seen in Figs. 3, 4, 21 and 22 and is operatively associated with the comparing control feed shaft 150. As heretofore described, said shaft 150 is rocked to one of three positions depending upon whether the master or detail feed mechanism or both feed mechanisms are to be effective and carries on its outer end a rock arm 128 which operates in conjunction with a pawl 122 to disable the retract for the master card reading retaining mechanism whenever the shaft 150 is rocked to its most clockwise position, which is the position wherein the master card feeding mechanism is disabled. The position illustrated is the intermediate position wherein both feed mechanisms are permitted to operate simultaneously. The lower extremity of said rock arm 128 is provided with a pivotally mounted guide 451 through which is carried a loosely fitted pull rod 452, said rod being threaded at its forward end and provided with suitable locking nuts for adjustment purposes. The rearward end of said rod is secured to a rock arm 453 mounted on a bracket 454 secured to the side frame casting 1 of the machine. Said arm 453 carries a stud 456 disposed for engagement behind one arm of a substantially T shaped punch disabling slide 455 suitably mounted on a pair of bearing studs 457. A spring 458 urges the slide rearwardly, when permitted by the arm 453, to a position where, at the proper time, a rearwardly projecting shoulder 459 will underlie a disabling stud 460 carried by the retract link 171 associated with the locking sides of the punch set pin box 28 as heretofore described. Also carried by the link 171 on studs 461 is a hold out or blocking slide 462 yieldably urged upward by a spring 463, said blocking slide cooperating with a blocking face 464 formed by the cutting away of a portion of the disabling slide 455. It will be seen that when the comparing control feed shaft 150 is rocked counterclockwise from the position shown, in which position detail feed mechanism is disabled, the punch disabling slide 455 will be pulled forwardly from the position shown to a position where the blocking face 464 is out of engagement with the hold out slide 462. However, when the comparing control feed shaft 150 rocks clockwise to either its intermediate or most clockwise position, in either of which positions the detail feed mechanism is permitted to operate, the punch disabling slide 455 will be released to the initial release position, shown in Fig. 21, wherein the blocking face 464 abuts against the side of the hold out slide 462. Fig. 21 illustrates the position of the parts in the first detail feeding cycle following a master card feeding cycle, and Fig. 22 illustrates the position of the parts in a second detail feeding cycle following a master card feeding cycle. Fig. 4 illustrates the position of the parts at a time between that shown in Figs. 21 and 22. It will be noted that the machine controls have been set so as to condition the punch mechanism to punch the detail cards which are being fed in this particular instance since neither of the punch disabling hooks 165, 166 are in position to engage the disabling stud 172 so as to hold the retract link 171 in its upper retracted or disabling position. As seen in Fig. 21, the high dwell of the punch mechanism retract cam 170 is effective. When the link 171 is in its corresponding raised position the hold out slide 462 prevents the punch disabling slide 455 from releasing fully into engagement with the disabling stud 460. As the cycle progresses and the low dwell of the cam becomes effective, the hold out slide 462 is lowered permitting further release of the punch disabling slide 455 to the position shown in Fig. 4, wherein the shoulder 459 abuts against the side of the disabling stud 460. As the first detail reading cycle is completed and the high dwell of cam 170 again becomes effective, the position shown in Fig. 22, the bottom edge of the disabling slide 455 bearing on the upper edge of the hold out slide 462 prevents the upward movement of the hold out slide 462 which acts to spread the distance between said hold out slide 462 and stud 460 thereby permitting the disabling slide 455 to assume its fully released position wherein the shoulder 459 underlies stud 460 so as to hold the link 171 in its upper punch disabling position. Accordingly, it will be seen that the disabling slide 455 will not prevent punching of the first detail card fed following a cycle in which the detail card feeding mechanism is disabled, but will prevent the punching of the second and all subsequent detail cards fed in successive cycles and until the disabling slide is restored as the result of the occurrence of a cycle in which the detail feed mechanism is disabled. Such first card punching mechanism may be disabled, when desired, by means of a first card punching control button 465. Said control button is of the plunger type and is adjustably mounted on the supporting bracket 454. The plunger portion of said button cooperates with a raised shoulder 466 formed on the slide 455 so that when the button is pushed inwardly to its disabling position the plunger portion will engage behind said shoulder 466 to hold the slide 455 in its most forward or restored and ineffective position. It will be noted that in the event the machine is conditioned by the controls so as to prevent punching of any succession of detail cards which may constitute a detail equal card group or a detail unequal card group, the first card punch disabling slide 455 will not be able to assume its fully released punch disabling position. It is only when the machine is conditioned so as to punch all cards of a detail equal card group or of a detailed unequal card group, that the slide 455 is able to assume its fully released punch disabling position, which position is attained only after one reciprocation of the retract link 171 which permits the punching of only the first card of any such detail card group.

The mechanism for similarly controlling the detail segregating mechanism so as to enable the interfiling of only the first card of any such detail card group includes a bell crank 471 mounted on the bracket 454. The horizontal rearwardly extending arm of said bell crank carries a first card interfile control button 470. Said button is of the manually settable plunger type, the plunger portion thereof being disposed, when the button is effective, for bearing engagement with the upper extremity of the punch mechanism retract link 171. Accordingly, it will be seen that bell crank 471 will rock in accordance with each reciprocation of the link 171. The upright arm of said crank pivotally connects with a link 472 which is also joined by a pin-in-slot connection with the rock arm 186 which, as heretofore described, constitutes part of the detail card segregating mechanism and when rocked clockwise is effective for operating the detail card deflector 190 associated with the detail card eject pocket 23. It will be seen that clockwise rocking of bell crank 471 from the position shown in Fig. 4 to that shown in Figs. 21 and 22, resulting from the raising of link 171 by the punch mechanism retract cam 170, will result in a segregating impulse to the detail card segregating mechanism with the same result as though the segregating impulse were effected through one of the segregating control cams 161 and associated linkage. Accordingly, assuming that the machine controls have been set to condition the machine to interfile (non-segregate) all successive detail cards of either a detail equal card group or a detail unequal card group, with the first card punch control and first card interfile control buttons 465, 470 set to render their respective mechanisms effective, the first detail card fed following a cycle in which detail card feed was disabled, will be interfiled (not segregated) since the punch disabling slide 455 will be ineffective in said first cycle for maintaining the bell crank 471 in its clockwise rocked position. However, in the following cycle the punch disabling slide 455 will be effective through link 171 for maintaining the bell crank 471 in its clockwise rocked position, to maintain a segregating impulse so that the second detail card of any such group, and all subsequent detail cards fed in succession before disabling of the detail card feed, will be segregated as a result of said segregation impulse into the detail eject pocket 23. It is, of course, understood that the above illustration presupposes that the interfile control dial 205 is set at its 2 (match) setting so that the segregating impulse imparted to the detail card segregating mechanism will operate to open the detail card deflector 190. It should be understood that the above description of the first card interfile mechanism presupposes that it is also desired in the same operation to punch only the first card of the detail card group and to prevent punching of all subsequent cards of the group. Accordingly, in such an operation, the first card of the group will be punched and will feed to interfile pocket 25, all subsequent cards of the group not being punched and being segregated into pocket 23.

While the above example describes the operation of the first card interfiling mechanism in conjunction with the first card punching control, the first card interfiling may be achieved independently of first card punch control in operations where it is not desired to punch any detail cards. To achieve this result, both the first card punch control button 465 and the first card interfile control button 470 must be set to their effective positions. The other machine controls must be set so as to condition the machine to punch all detail cards of the same card group. This may be effected by the proper setting of the punching and segregating control dial 225 or by setting the punch control lever 175 in its intermediate (all) setting which is heretofore described and which results in disabling both of the hooks 165, 166. Under this setting, punching may be prevented either by removal of the punch wiring unit 29 or by the proper setting of the selective punch controls, not shown herein, but directly associated with the punch set bar box 28 and of a type well known to the art. Accordingly, when the machine is conditioned in this manner, first card interfiling will be effective without and independently of the corresponding function of first card punching.

It will be noted that the above description of a first card interfiling operation is predicated upon the placing of the interfile control dial 205 in its No. 2 (match) setting whereby the segregating impulse is effective for operating the detail card deflector 190 from a closed to open position. In the event that the interfile control dial 205 was placed instead at its No. 4 (non-match) setting a first card segregating function reverse to that described would be effected in view of the fact that the segregating impulse would then be effective for operating the detail card deflector 190 from an open to a closed position. In this latter mentioned setting of the interfile control dial 205, the first of any selected detail card group will be segregated into the detail eject pocket 23 and all remaining cards of the group will be interfiled in the interfile pocket 25.

It will be apparent that first card interfiling and/or first card punching may be achieved regardless of whether the machine is operating solely under comparing control, solely under sequence control, or under combined comparing and sequence control. However, whenever first card interfile control is employed, the machine controls must be set in such a manner as to prevent any segregating impulse to the detail segregating mechanism from or through either one of the segregating control cams 161 on the comparing function control shaft 135. Such a segregating impulse can be prevented either by setting the punching and segregating dial 225 in either position "M/" or "N/" settings wherein, as heretofore described, none of the segregating control cams 161 are effective. In the event that selective punching is not required in the same operation, the segregating impulse from cams 161 can also be prevented by setting the segregating control lever 200 in its "upper" setting which as heretofore described dissociates the detail or lower card segregating mechanism from control by the segregating control cams 161.

Fig. 29 illustrates the operation of the first card punching mechanism. In the illustrated example, punching and segregating functions are under combined comparing and sequence control. The machine is conditioned for feeding operation No. 2 with the control set so as to interfile all master cards with all detail cards except the detail cards which are equal in the sequence controlling fields and non-matched in the comparing controlling fields. The controls are also set to punch equal-nonmatch detail cards. However, in the event that there should be more than one equal-non-match detail card in succession so as to constitute an equal-non-match detail card group, it is desired that only the first card of said equal-non-match group be punched. For this operation, it will be noted that sequence equal signal control button 425 is effective so as to provide a necessary impulse to the punching and segregating control shaft 410 as a result of equality in the sequence controlling card fields. The punching and segregating control dial 225 is set at its "N/N" setting so that an equal impulse from the sequence control means can be carried to the segregating and punching mechanism whenever there is a non-match relationship in the comparing control fields. The interfile control dial 205 is set at its "2" setting so that the segregating impulse will operate to segregate detail cards into the detail eject pocket 23. The first card punch control button 465 is set to render the first card punching mechanism effective and the first card interfile control button 470 is set to render said first card interfile mechanism ineffective in this operation.

In this particular illustration, the master cards, it will be noted, also have been numbered from 1 to 9 and the detail cards from 1 to 14 in succession from bottom to top of the stacks in order to facilitate an understanding of this type of operation.

The first detail card when compared with the first master card will result in an unequal-non-match relationship with the detail card being of the lower order. Accordingly, only the first detail card will feed and, because of the unequal relationship in the sequence controlling field, it will not be punched or segregated but will feed to the interfile pocket 25.

In the next cycle the second detail card when compared with the first master card will also result in an unequal-non-match relationship with the detail card of lower order. Accordingly, the second detail card will not be punched or segregated and will feed to the interfile pocket 25.

In the third cycle the third detail card when compared with the first master card will result in an unequal-non-match relationship with the detail card of the lower order. Said third detail card will similarly not be punched or segregated and will feed to the interfile pocket 25.

The fourth detail card when compared with the first master card will result in an equal-match relationship and since feeding operation No. 2 is employed, only the fourth detail card will feed. Since there is a match relationship in the comparing control fields said fourth detail card will not be punched or segregated and will feed to the interfile pocket 25.

In the fifth circle, the fifth detail card when compared with the first master card will result in an unequal-match relationship with the master card of lower order. As a result, said first master card will feed to the interfile pocket 25.

In the sixth cycle, the fifth detail card when compared with the second master card will result in an equal-match relationship causing said fifth detail card to feed to the interfile pocket 25 without being punched.

In the seventh and also the eighth cycle, the sixth and seventh detail cards when compared with the second master card will also result in an equal-match relationship resulting in said sixth and seventh detail cards feeding to the interfile pocket 25 without being punched. It will be noted that the fifth, sixth and seventh detail cards bear identical value designations (S4–C1) thereby constituting an equal-match detail card group in relation to the second master card with which each card of said detail group is compared.

In the ninth cycle, the eighth detail card when compared with the second master card results in an unequal-match relationship with the second master card of lower order to result in the feed of the second master card to the interfile pocket 25.

In the tenth comparing cycle, the eighth detail card when compared with the third master card results in an equal-non-match relationship. This is the relationship for which the machine controls are set to punch and segregate such detail cards. Accordingly, when said eighth detail card is fed, the detail punching and segregating mechanism becomes effective so as to punch said card and to segregate it in the detail eject pocket 23.

In the eleventh cycle, the ninth detail card when compared with the third master card results in an unequal-non-match relationship with the third master card of lower order. Accordingly, said third master card will feed to the interfile pocket 25.

In the twelfth comparing cycle, the ninth detail card when compared with the fourth master card results in an equal-non-match relationship. Accordingly, similarly to the eighth detail card, the ninth detail card will be punched and segregated into detail eject pocket 23.

In the thirteenth cycle, the tenth detail card, when compared with the fourth master card will also result in an equal-non-match relationship. It will be noted that the ninth and tenth detail cards are punched identically so as to constitute an equal-non-match detail card group in relation to the fourth master card, detail card 9 constituting the first card of said equal-non-match group. In this instance, the first card punch control mechanism becomes effective for preventing the punching of the tenth detail card with constitutes the second card of the equal-non-match group. Accordingly, said tenth detail card will be segregated into detail pocket 23 but will not be punched as a result of the operation of the first card punch control mechanism as heretofore described. In the event that there are subsequent detail cards similarly punched so as to constitute a larger equal-non-match detail card group, punching of all such subsequent cards of the same group would similarly be prevented by operation of the first card punch control mechanism.

In the fourteenth cycle, the eleventh detail card, when compared with the fourth master card will result in an unequal-non-match relationship with the master card of lower order, resulting in the feeding of said fourth master card to the interfile pocket 25. It should be noted that at this cycle, since the detail card feeding mechanism is disabled, the corresponding position of the comparing control feed shaft 150 operating through lock arm 128 and pull rod 452 results in the restoration of the punch disabling slide 455 to its forward ineffective position, thereby permitting punching of the first card of any equal-non-match detail card group which may subsequently occur.

In the fifteenth cycle, the eleventh detail card when compared with the fifth master card results in an unequal-non-match relationship with the master card of lower order to result in the feed of the fifth master card to the interfile pocket 25.

In the sixteenth cycle, the eleventh detail card, when compared with the sixth master card results in an equal-non-match relationship causing said eleventh detail card to be punched and segregated in the eject pocket 23.

In the seventeenth cycle, the twelfth detail card when compared with the sixth master card results also in an equal-non-match relationship resulting again in the feeding of the twelfth detail card to the segregating detail pocket 23. It will be noted that the twelfth detail card is the second detail card of an equal-non-match detail card group. Accordingly, in this instance, the first card punch control mechanism is again effective to prevent the punching of said twelfth detail card.

In the eighteenth cycle, the thirteenth detail card, when compared with the sixth master card results in an unequal-non-match relationship with the master card of lower order, thereby resulting in the feed of the sixth master card to the interfile pocket 25. In this cycle, the punch disabling slide 455 of the first card punch control mechanism will be restored to its ineffective position.

In the nineteenth cycle, the thirteenth detail card, when compared with the seventh master card results in an equal-non-match relationship. Accordingly, said thirteenth detail card will be segregated into detail pocket 23. Since this is the first equal-non-match detail card which occurs following the cycle in which the detail feeding mechanism was disabled, said thirteenth detail card will also be punched.

In the twentieth comparing cycle, the fourteenth detail card when compared with the seventh master card will result in an unequal-non-match relationship with the master card of lower order causing said seventh master card to feed to the interfile pocket 25.

In the next two cycles, the fourteenth detail card when compared with the eighth and ninth master cards, in succession, will result in unequal-match and unequal-non-match relationships respectively with the master card in both instances being of lower order. Accordingly, both the eighth and ninth master cards will feed in succession to the interfile pocket 25.

For the purposes of this illustration it will be assumed that the subsequent or following master card, not shown, is a card of higher order in the sequence controlling field than the last detail card shown, detail card 14, with the result that said fourteenth detail card will feed as a low order unequal card to the interfile pocket 25.

If, in the operation shown in Fig. 29, the set up of the machine controls were modified so as to render first card interfile control mechanism also effective, through control button 470, it would also be necessary to set the punching and segregating control dial to its "N/" setting so as to eliminate any segregation impulse as a result of comparing or sequence control. With this set up, the segregating impulse for the detail card segregating mechanism is derived solely from the punch set bar retract cam 170 through link 171 and bell crank 471, as heretofore described. Under these conditions, any detail card feeding cycle in which punching is disabled will also result in the segregation of such detail cards. Any detail feeding cycle in which punching is effected will result in the interfiling of such detail card. Accordingly, with the arrangement of cards as illustrated in Fig. 29, with the machine conditioned for first card interfiling, as above mentioned, each single detail equal-non-match card, i. e., the eighth and thirteenth detail cards together with the first detail card of equal-non-match detail card groups, i. e., the ninth and eleventh detail cards would, instead of being segregated, be fed and interfiled with master cards in the interfile pocket 25. All subsequent detail cards in equal-non-match detail groups, other than the first card of such groups, would be segregated in the eject pocket 23, i. e., detail cards ten and twelve in the illustrated example. However, in this operation, it should be pointed out that all detail cards feeding as unequals and all equal-match detail cards will also be segregated into the pocket 23, since the punching mechanism is disabled through comparing and sequence control when these latter mentioned types of detail cards are being fed.

From the foregoing, without provision of auxiliary segregating control mechanism, about to be described, it will be apparent that, in a two file sequence control operation, the segregation of records feeding as equals, from a predetermined one of the master or detail files of cards, from cards feeding as unequals from the same predetermined file, can occur only in conjunction with feeding operations wherein that predetermined master or detail file feeds both as equal and as low order unequals. For example, in sequence control feeding operation No. 2, detail cards feeding as equals may be segregated from detail cards feeding as unequals, since in feeding operation No. 2, detail cards also feed as equals. However, in feeding operation No. 2, the corresponding segregation of master cards would not be achieved since master cards do not feed as equals and any segregating impulse to the master card segregating mechanism as a result of equality would have no effect. It will be seen that in this type of operation, in the event that the master file of cards contained at least one card bearing equality relationship to detail cards in each multiple group of equal detail cards, each of said detail equal card groups will be segregated from the detail card file. Likewise in feeding operation No. 3, the corresponding segregation of master cards from the file of master cards including the segregation of master multiple card groups, may be achieved but without the similar segregation of detail cards. In feeding operation No. 1, segregation within both the master and detail card files could be achieved since both files in this feeding operation feed as equals. However, in feeding operation No. 1, in the event that equal card groups in the respective master and detail files contained different numbers of cards only the group containing the lesser number of cards would be properly segregated as a multiple card group. The group containing the greater number of cards would, in this instance, be split. A plurality of cards in such larger group corresponding to the number of cards in the lesser card group would be segregated since they would be feeding as equals with the cards of such lesser card group. However, the balance or excess of cards of such larger card group would not feed as equals but rather as unequals and, therefore, would not be segregated as part of such larger equal card group.

The auxiliary segregation control means about to be described is operated solely from the sequence detecting means and is associated with only the master card segregating mechanism. When employed in sequence control feeding operations 2 or 2A, it permits the segregation of master card groups from the master file in conjunction with the similar segregation of detail card group from the detail card file. When employed in conjunction with sequence control feeding operation No. 1 it permits the true segregation of a complete master card group even though said master card group may contain a larger number of cards than the corresponding detail card group. Said auxiliary segregation control, as will be hereinafter more fully described, also permits, in the same operation, the segregation of cards from one of said files as a result of a different sequence condition from that employed for controlling the segregation of the card from the other of said files. For example, segregation of equal master cards may be performed in conjunction with segregation of unequal detail cards and vice versa.

Said auxiliary segregating control mechanism, as can be best seen in Figs. 2, 5, 23, 24 is operated from a short ratchet driven control shaft 475 suitably journaled in a frame plate 474 secured to the upper portion of the left hand side frame casting 2 of the machine. Said control shaft is rotated through complementary ratchet means similar to that employed for rotating the comparing function control shaft 135 which means are fully shown and described in the aforesaid Patent 2,211,094. Mounted on said shaft is an inner ratchet wheel 476 and an outer ratchet wheel 477, each of said ratchet wheels having four equal spaced ratchet teeth and each being offset on the shaft 45° in relation to the other. Adjustably secured to the outer end of said shaft is an auxiliary segregating control cam 480 formed with four equal spaced high dwells about its camming periphery. It will be seen that each rotation of the shaft through a 45° arc will render the high and low dwells of said cam alternately effective. Co-operating with said cam is a follower arm 481, see Figs. 2 and 5, carrying the usual follower roller 482 and secured to a short rock shaft 483 also journaled in the plate 474. Also secured to said rock shaft is an upright rock arm 484 pivotally joined to a link 485, the upper extremity of said link is slotted to engage a stud 486 carried by a rock arm 487. Said arm 487 is fast on a rock shaft 488 which shaft also carries the master card deflector 195, heretofore described, associated with the master card eject pocket 26, as can also be seen in Fig. 1. It will be seen that each high dwell of the control cam 480 will be effective through the aforementioned linkage for rocking said master card deflector 195 clockwise, as viewed in Fig. 5, from a closed to open position.

Co-operating with the inner ratchet 476 is a ratchet pawl 491 pivotally secured to the extremity of an inner pawl actuating arm 492. Similarly co-operating with the outer ratchet wheel 477 is an outer pawl 493 pivotally secured to an outer pawl actuating arm 494. Said outer actuating arm 494, as distinguished from the inner arm 492, is formed with an extended tail portion 495. The inner pawl is clockwise tensioned into ratchet engaging position by a spring 496, the outer pawl being similarly tensioned by a spring 497. A stud 498 carried by the tail portion 495 of the outer arm 494 is disposed to overlie the tail of the inner pawl 491 so as to hold the inner pawl in a clockwise rocked disabled position whenever the outer arm 494 is released by means hereinafter described. Each of said pawl actuating arms 492, 494 are loosely mounted on a fixed shaft 500 secured to the frame plate 474. Each of said actuating arms is also formed with a lower shoulder portion 501 disposed for engagement by an actuating stud 502. Said stud 502 is carried by a rock arm 503 secured to a sleeve 504 mounted on the shaft 500, which sleeve also carries a rock arm 505 thereby rendering arms 503 and 505 integral. As best seen in Fig. 5, rock arm 505 is connected by a link 506 with rock arm 294 which as heretofore described rocks each cycle to actuate the sequence sensing slide restoring bail 235 of the sequence detecting unit. It will be seen that at each operating cycle both pawl actuating arms 492, 494 will through stud 502 be rocked counter-clockwise permitting one or the other pawl 491 or 493 to be effective for rotating the shaft 475 through a 45° arc. Springs 507 tension each of said actuating arms clockwise so as to follow the rocking movement of the stud 502. It should be understood that only one of said pawls 491, 493 may be effective for rotating the shaft 475 in any one cycle, and may be effective only when the last previous 45° rotation of the shaft in a preceding cycle was accomplished through the other one of said pawls. One of said pawls, through its associated ratchet, rotates the shaft only to the point where the other pawl may effectively engage its associated ratchet in a subsequent cycle. The same pawl can never be effective for imparting successive rotations to the shaft. Whether or not the pawl, which may effectively engage its associated ratchet in a particular cycle, is permitted to thus engage its ratchet depends upon sequence conditions detected in that cycle operating through pawl release mechanism now to be described.

The outer pawl actuating arm 494 is formed with a short downwardly projecting portion to which is pivotally secured a release link 510. The bottom edge of said link is cut away to provide a shoulder 511 disposed for engagement with a comb plate 512. A spring 513 urges the link 510 forwardly to its released position. Fig. 24 shows said link when blocked by the comb 512 Fig. 23 illustrating the link when released. Pivoted to an ear of said comb plate is a camming arm 514 carrying a roller 515 engaging the bottom edge of the link 510. As best seen in Figs. 5 and 10, a link 516 interconnects said camming arm 514 with the equal signal control lever 414. As heretofore described said equal signal control lever is loosely mounted on the sequence punching and segregating control shaft 410 and is rocked clockwise about said shaft upon the occurrence of each equal sequence relationship detected in the sequence controlling fields of the respective master and detail cards. In the absence of an equal impulse through said equal sequence control lever 414, the release link 510 will maintain a blocking engagement with the comb 512, the position shown in Fig. 24, preventing the outer pawl actuating arm 494 from dropping fully to a position wherein the outer pawl 493 may engage behind a tooth of its associated outer ratchet 477. Upon the occurrence of an equal impulse through lever 414 and link 516, the camming arm 514 will elevate the forward edge of the release link 510 releasing the link from the comb 512 to the position shown in Fig. 23, whereupon the outer pawl actuating arm 494 is permitted to drop fully, in accordance with the rocking of stud 502, to a position where the outer pawl 493 may engage behind a tooth of its associated outer ratchet 477. It will, of course, be remembered that a tooth of the outer ratchet 477, may not be in position for engagement by its associated outer pawl 493 such as shown in Fig. 23, if the last previous actuation of the shaft 475 was effected by the operation of the outer pawl 493.

The inner pawl actuating arm 492 is also formed with a downwardly extending projection, shorter than that of the outer arm 494, and which carries a limit stud 519. Said stud co-operates with a limit face 517 formed in a cut away portion of an upright release slide 518 suitably guided for vertical movement by brackets 521, 522 and yieldably tensioned downwardly by a spring 523. The bottom edge of said slide, when in restored position, the position shown in Fig. 5, is supported by a horizontal arm 524 loosely mounted on a rock shaft 525, hereinafter referred to as the change of designation shaft, journalled in the upper and lower frame plates 240, 241 respectively of the sequence detecting unit. As best seen in Fig. 6, an arm 526, fast on shaft 525, is formed with a limit shoulder co-operating with a limit stud on the arm 524 under tension of a spring 527 in such a manner as to provide yieldable conection between the arms 524, 526. As best seen in Fig. 8, the shaft 525 carries a bail 528 co-operating with each of the change of designation slides 248, heretofore described, associated with the sequence detecting unit pins 236. It will be seen that the movement of any one of said pins in either direction as a result of a change in the sequence controlling field of a master card, will operate through the camming nose 249 of an associated slide 248 to rock the bail 528 and shaft 525 clockwise, said rocking movement causing the arm 524 to rock clear of the release slide 518, the position shown in Figs. 23 and 24, permitting said slide to drop to its release position wherein the limit face 517 is clear of the limit stud 519. It will be seen that when in released position, said slide 518 permits the inner actuating arm 492 to drop to its lowermost position in co-operation with the stud 502, the position shown in Figs. 23 and 24, in which position the inner pawl 491 may engage its associated inner ratchet 476. Said release slide 518 is raised to its restored position cycle through a restoring finger 531 engaging a stud 532 on said slide. Said finger is yieldably associated, by a spring 533 and suitable limit stud, with a restoring arm 534 pivotably mounted on the sequence detecting unit frame plate 240. Said arm is provided with a stud 535 engageable by an upright stud 536 on the heretofore mentioned locking slide retract link 261, best seen in Fig. 6. It will be seen that as the locking slides, associated with the sequence detecting unit pins 235, are retracted each cycle, the restoring finger 531 will at the same time be yieldably rocked by the stud 536 to raise the release link 518 to its restored position. Said retract link 261 also is formed with an upturned ear 537 engaging a shoulder of the rock arm 526 so as to also positively restore the change of designation shaft 525 each machine cycle. From the foregoing, it will be seen that each change of designation impulse which results when the sensed sequence controlling field of a master card differs in any respect (is unequal) with releation to the master card sensed in the previous cycle, will operate to release the slide 519 so that the inner pawl 491 through its associated inner ratchet may be effective for rotating the auxiliary sequence control shaft 475.

Fig. 23 illustrates the positions of the respective pawls at the start of their stroke as a result of a change of designation impulse caused by successive master cards, and also as a result of an equal impulse caused by the relationship between the sensed master and detail cards. Fig. 24 illustrates the respective positions of the pawls resulting from only a change of designation impulse and without the equal impulse. In Fig. 24 it has been assumed that the last previous rotation of the control shaft 475 has been accomplished through the outer pawl 493 as a result of an equal impulse, since the outer ratchet 477 is shown as having been advanced and therefore, out of effective relation to the outer pawl 493, thereby bringing the inner ratchet 476 into engageable relation with the inner pawl 491. Accordingly, under these conditions, upon the actuating stroke of the arm 503, said inner pawl 491 will be effective for rotating the shaft 475 as a result of the change of designation impulse.

Fig. 23 also shows the respective positions wherein the last previous rotation of the shaft 475 is accomplished through the outer pawl 493. However, in this instance, the concurrent equal impulse releasing the slide 510 permits the outer actuating arm 494 to also drop to its lowermost position, in which position the stud 498 carried by said outer arm bears on the tail portion of the inner pawl 491 thereby rocking said inner pawl 491 clockwise to a disabled position. In this instance, on the up stroke of the arm 503, although the inner ratchet 476 is positioned for engagement by the inner pawl and a change of designation impulse has occurred, the shaft 475 will not be rotated because an equal impulse has also occurred. Accordingly, it will be seen that a change of designation impulse may cause rotation of the auxiliary sequence control shaft 475 only when such change of designation impulse occurs without the concurrent equal impulse. An equal impulse, however, may result in rotation of the shaft 475, assuming that the proper conditions existed in the preceding cycle, regardless of whether there is a concurrent change of designation impulse.

As heretofore mentioned, the auxiliary segregating control cam 480 may be adjustably secured to the shaft 475, said adjustment being effected through a segregation control knob 540, see Figs. 2 and 5. The two effective adjustable positions of the cam are offset 45° so that in one setting a high dwell of the cam will be effective for opening the deflector 195 while in the other setting a low dwell of the cam will enable closing of said deflector, assuming that the shaft 475 is in the same position in both instances. Said auxiliary segregating control knob may also be set at an ineffective setting which dissociates the cam from its follower arm 481 so as to completely disable the auxiliary segregation control of the master card deflector 195. In one of the two effective settings of the cam, hereinafter referred to as equal "E" setting, the cam is positioned on the shaft so that the high dwell thereof will be effective whenever the shaft has been rotated by the outer pawl 493 as a result of an equal impulse as heretofore described. The other effective setting of the cam, hereinafter referred to as the unequal "U" setting is such as to render the high dwell of the cam effective whenever the shaft has been rotated as a result of change of designation (unequal) impulse through the inner pawl 491. It should be remembered that, with respect to this control, an equal impulse relates to the sequential relationship between a master and a detail card, and that an unequal impulse relates to the comparison of two successive master cards. Accordingly, it will be seen that when set at the equal "E" setting, an equal impulse resulting from equality between a master and detail card will position the cam so as to open master card deflector 195. All master cards which are subsequently fed will, therefore, be segregated into the master card eject pocket 26 until the occurrence of a change of designation impulse resulting from the relationship between successive master cards repositions the cam so as to close the deflector 195. Accordingly, with this equal "E" setting, all equal cards of a master equal card group, in feeding operations No. 1 and No. 2, will be segregated even though one or more of said master cards will be feeding as low order unequals in relation to sequentially compared detail cards.

With the control knob 540 set at its unequal "U" setting, the equal impulse resulting from the sequential relationship between the master and detail card, will position the cam so as to close the deflector 195. All master cards which are subsequently fed will, therefore, not be segregated into master pocket 26 until the occurrence of a change of designation impulse resulting from relation between successive master cards. Accordingly, in this setting each card of a master equal card group will not be segregated. The first master card differing with its preceding card to cause a change of designation impulse will result in positioning the cam 480 to open the deflector 195 so that the first card following the master equal card group will be segregated together with all subsequently fed master cards until the next occurrence of an equal impulse resulting from the relationship between the sequentially compared master and detail cards. It will be noted that with the "U" (unequal) setting of the control knob, master equal card groups may, in some instances, be also segregated with the master unequal cards in the absence of a card in the detail file corresponding to such a master equal card, since the absence of such a detail card prevents the equal impulse required for positioning the cam to a non-segregating control position.

It should also be understood that when the auxiliary segregating control means is employed the segregating control lever 200, heretofore described, must be set to its "lower" setting in order to prevent any segregating impulse to the upper or master card deflector 195 resulting from the sequence and comparing control means as previously described. The effective controlling position of the auxiliary segregating control shaft 475 is maintained by suitable detent means, see Fig. 5, including a pair of spring urged detent arms 538 co-operating with a star detent wheel 539 mounted on said shaft.

The auxiliary segregating control mechanism will operate in the manner just described in conjunction with any of the first three settings of the interfile control dial 205. In the event that it should be desired to employ the auxiliary segregating control means in conjunction with the fourth (non-match) setting of the interfile control dial 205, in which the deflector 195 is held open in the absence of a a segregating impulse, an additional control member, not shown, may be provided and settable to dissociate said deflector from control by the control dial 205. Accordingly, with such control, the auxiliary segregating control means may also be employed in conjunction with operations utilizing the fourth (non-match) setting of said interfile control dial 205.

Fig. 30 illustrates a typical operation employing auxiliary segregating control. In this operation, feeding and punching functions are solely under sequence control, feeding operation 2A being utilized, which feeding operation, as heretofore described, differs from feeding operation No. 2 in that equal master or upper cards are released from the master card sensing chamber for segregation or interfiling, even though the master card feed mechanism is disabled. In this operation it is desired to punch all equal detail cards, to segregate unequal master cards and equal detail cards, and to interfile the equal master cards and the unequal detail cards. In this operation, it will be noted that the equal sequence signal control button 425 has been set in so as to provide an equal impulse for the detail punching and segregating mechanism. The upper card holding control lever has been set at its "up" position so as to transform feeding operation No. 2 to feeding operation No. 2A. The segregating control lever 200 has been set at its "lower" setting so as to eliminate segregating impulses through the comparing control mechanism to the master card segregating mechanism. The punching and segregating control dial 225 has been set at its "M/M" setting so that the equal impulse from the sequence control means may operate to achieve both punching and segregation of the detail cards. The auxiliary segregating control knob 540 has been set at its unequal "U" setting so as to cause segregation of unequal master cards.

In the first comparing cycle, the first detail card "D1" when sequentially compared with the first master card "M1" will result in a condition of equality. Said first detail card will feed as an equal and, therefore, will be punched and segregated in the detail eject pocket 23. In the same cycle, the first master card will be released from the master card sensing chamber as an equal since feeding operation No. 2A is being employed. The equal impulse to the auxiliary segregating control mechanism positions the segregating control cam 480 to close master card deflector 195 so that said first master card will be released to the interfile pocket 25 as an equal. It should be here mentioned that in feeding operation No. 2A, whenever an equal master card is released from the master card sensing chamber, there is no card in the master sensing chamber on the following sensing cycle. However, in this feeding operation, an equal sequence relationship operates to maintain the retract for the master card reading retaining mechanism disabled so as to retain the data sensed from such released card in the reading retaining mechanism for a subsequent cycle. Accordingly, in the following cycle, although the master sensing chamber may be empty, the following detail card will, in effect, be sequentially compared with the master card released in the preceding cycle.

In the second sequence comparing cycle the second detail card will be sequentially compared with the held over reading of the first master card so as to again result in an equal condition. Said second detail card will, therefore, be punched and segregated in pocket 23.

In the third sequence comparing cycle, the third detail card "D4" will be sequentially compared with held over reading of the first master card to result in an unequal condition with the master card reading of lower order. The detail card feed will be disabled and the second master card will feed to the master card sensing chamber.

In the fourth cycle, the third detail card will be sequentially compared with the second master card causing an unequal sequence condition with the master card of lower order. Said second master card being unequal to the first master card, will also cause a change of designation impulse to the auxiliary segregating control mechanism. Accordingly, in the fourth cycle, the second master card will feed as a low order unequal and by reason of the change of designation impulse following an equal impulse, and without a concurrent equal impulse, the auxiliary segregating control cam will operate to open the master card deflector 195 so as to segregate the second master card.

In the fifth cycle, the third detail card will be sequentially compared with the third master card to result in an unequal condition with the master card of lower order. Said third master card will feed as a low order unequal. The change of designation impulse in this cycle will not alter the position of the auxiliary segregating control cam since the last actuation on the cam was caused by a change of designation impulse in the preceding cycle. Accordingly, said third master card will also be segregated into the master eject pocket 26.

In the sixth cycle the third detail card and fourth master card will result in the same sequence relationship, the master card feeding as a low order unequal. In this cycle, there will be no change of designation impulse since said fourth master card is equal to the third master card. Since there also is no equal impulse to the auxiliary segregating control means, the auxiliary control cam is not actuated so that the fourth master card will also be segregated into the master pocket 26. It will be noted that although the third and fourth master cards are equal, so as to constitute a master equal card group, in this operation they are segregated as unequals since the detail file is lacking a corresponding equal detail card.

In the seventh cycle, the third detail card when sequentially compared with the fifth master card results in an unequal condition with the detail card of lower order. Said third detail card will feed as an unequal to the interfile pocket 25 and will not be punched.

In the eighth cycle, the fourth detail card when sequentially compared with the fifth master card will be fed as a low order unequal to the interfile pocket 25.

In the ninth cycle, the fifth detail card "D5" when sequentially compared with the fifth master card "M5" results in a condition of equality. Said fifth detail card will feed as an equal to be punched and segregated in the detail pocket 23. At the same time, the fifth master card will be released as an equal and as a result of the equal impulse to the auxiliary segregating control mechanism, it will proceed to the interfile pocket 25. It will be noted that in this cycle the auxiliary segregating control mechanism receives both an equal impulse and a change of designation impulse. However, as hereinbefore described, when both impulses occur simultaneously, the equal impulse operates to disable the effect of the change of designation impulse.

In the tenth cycle, the sixth detail card is sequentially compared with the held over reading of the fifth master card to result in an unequal relationship with the master card reading of lower order. In this cycle there is no master card in the master card sensing chamber so that the master card feed mechanism operates only to deliver the sixth master card to the sensing chamber. It should also be noted that in this tenth cycle there is neither an equal nor a change of designation impulse to the auxiliary segregating control mechanism.

In the eleventh cycle, the sixth detail card is sequentially compared with the sixth master card to result in an unequal condition with the master card reading of lower order. Only the sixth master card will feed and since it does not produce a change of designation it will not be segregated and will proceed to the interfile pocket 25.

In the twelfth cycle, the sixth detail card when compared with the seventh master card will result in an unequal condition with the master card of lower order. Consequently, said seventh master card will feed and since there is no change in designation impulse to the auxiliary segregating control mechanism, it will proceed to the interfile pocket 25. It will be noted that the fifth, sixth and seventh master cards are identically punched so as to constitute a master equal card group. The first card in the group, the fifth master card, was released to the interfile pocket 25 as an equal. The second and third master cards of the equal card group feed, however, only as low order unequal cards with respect to the sixth detail card. However, since there is no change in designation impulse, the second and third master card in the master equal group were not segregated as unequals but were interfiled as equals in the interfile pocket 25. It will be seen that the disposition of this master equal card group differs from that of the first master equal card group comprising the third and fourth master cards, since the detail file contained a card, the fifth detail card, corresponding to the cards of the second master equal card group.

In the thirteenth cycle, the sixth detail card when compared with the eighth master card will result in a condition of equality. Consequently, the sixth detail card will feed as an equal to be punched and segregated in pocket 23. The eighth master card will be released as an equal and interfiled in pocket 25. Here again, it will be noted that a change of designation impulse will be ineffective for actuating the auxiliary segregating control cam since the change of designation impulse results concurrently with an equal impulse.

In the fourteenth cycle, the seventh detail card when compared with the retained reading of the eighth master card results in an unequal relationship with the master reading of lower order. Consequently, only the ninth master card feeds to the master card sensing chamber.

In the fifteenth cycle, the seventh or last shown detail card, when compared with the ninth or last shown master card results in an unequal relationship with the master card of lower order. Consequently, said ninth master card will feed as an unequal, and since it introduced a change of designation impulse without there being a concurrent equal impulse to the auxiliary segregating control mechanism, the auxiliary segregating control cam 439 will be actuated so as to segregate said ninth master card in the master card pocket 26.

The disposition of the seventh detail card will depend upon the subsequent master cards. In this example, it has been assumed that the next subsequent master card, not shown, when compared with the last detail card shown results in an unequal condition with the detail card of lower order causing said detail card to feed as an unequal to the interfile pocket 25.

It will be apparent that with the cards arranged in the same respective order as in the above illustrated example, if the auxiliary segregating control knob was set to segregate equals instead of unequals, the reverse segregating function with respect to master cards would result. With this setting, the respective master and detail cards would be fed or released in the same order and the punching and segregating of detail cards would remain unchanged. However, in this latter "E" setting, the segregation of the master cards would be reversed, all master cards which are shown in the illustrated example as being segregated in pocket 26 would instead be interfiled in pocket 25, and all master cards shown interfiled as equals would instead be segregated as equals in the master card eject pocket 26.

It will be noted that the auxiliary segregating control mechanism, when it is employed in the manner just described, operates to control segregation of the master cards solely under sequence control and entirely independent of detail card segregation control. It also removes the master card segregating function from dependence on the master card feeding function, enabling segregation of master cards according to their true relationships to detail cards, so that in feeding operations, wherein master cards, which are in fact equal to one or more detail cards, do not feed except as unequals, they may, nevertheless, be segregated according to their true nature as equals. The independent functioning of the auxiliary segregating control also permits concurrent equal and unequal segregation in the respective master and detail cards as heretofore mentioned and as shown in the illustrated example, Fig. 30.

The machine may also be conditioned to perform two different types of single file operations, one of which, hereinafter referred to as a sequence checking operation, employs the master card feeding mechanism, the other of which, hereinafter referred to as a self sequencing operation, employs the detail card feeding mechanism. In a sequence checking operation, successive cards of a single file are sequentially compared to determine whether the succeeding card is in correct, equal, or wrong sequence relation to the card which preceded it so as to segregate from the file all wrong sequence cards, or all equal cards except the first card of equal groups, or both wrong sequence cards and equal cards excepting the first cards of equal card groups. If desired, signal cards may be placed in the detail feeding mechanism so as to be interfiled and thereby indicate each wrong sequence condition. The aforementioned co-pending application S. N. 152,728 discloses means for performing a sequence checking operation wherein the mechanism, however, is unable to segregate wrong sequence cards without disturbing the order of equal cards. The novel and improved sequence control means, herein disclosed, permits, in this type of operation, segregation of wrong sequence cards only, without disturbing the order of any equal cards that may also be in the file. In a self sequencing operation, two related fields of the same card are sequentially compared to determine whether said two fields are equal and if unequal, which of the two fields is of the higher order. In this type of operation a file may be separated throughout three different pockets in accordance with three different sequential relationships with the sequentially compared card fields. The improved sequence checking means will first be described.

For a sequence checking operation, a sequence checking wiring unit 545, see Figs. 16 and 17, substantially similar to that disclosed in said co-pending application S. N. 152,728 is employed. Said wiring unit includes a base support plate 546 upon which is mounted a stationary open box-like framework similar to that of the sequencing and punching wiring unit 29 heretofore described, and in which is suitably supported a field of upper wiring unit pins 547. Secured to said framework is a side outlet plate 548 in which are mounted a field of outlet pins 549. When the unit is properly positioned in the machine on the guide rails 431 and 432, the upper wiring unit pins 547 are disposed for engagement by the pins 132, see Fig. 1, of the master card side 131 of the comparing pin assembly, and the side outlet pins 549 are disposed to engage the pins 236 of the master card side of the sequence detecting unit. Bowden wires 551 operatively interconnect a preselected field of the upper wiring unit pins 547 with the side outlet pins 549 so that in each sensing cycle the data in the preselected field of a card in the master card sensing chamber 20 will be entered through the master card reading retaining means 22, the master card side of the comparing mechanism 131 and said Bowden wires 551 into the rearmost or master card bank of pins 236 of the sequence detecting unit.

Also mounted on the base support plate 546 are a pair of upright support plates 555 between which is supported a reciprocating carriage comprised of side plates 556 and in which carriage are mounted side outlet pins 557. The frame plates 556 of the pin supporting carriage are provided with bearing studs 558 slide fitted in slots formed in the supporting plates 555. The pins 557 mounted in said carriage are disposed to engage the pins 235 in the front or detail side of the sequence detecting unit and are operatively connected by Bowden wires 561 with the same field of upper wiring unit pins 547 as are operatively connected to the slide outlet pins 549 by the Bowden wires 551. Each of the upper wiring unit pins 547 actuates a Bowden wire 551 and a Bowden wire 561, the arrangement of the wiring being such that the data sensed in the preselected card field may be entered in both the pins 235 and the pins 236 of the sequence detecting unit. However, reciprocation of the pins 557 is timed to delay the actuation of the sequence detecting unit pins 235 until the completion of a sequence detecting cycle, and since the locking slides 245 retain the pins 235 in their set position according to the data sensed in the previous card, it will be seen that each sequence detecting cycle operates to sequentially compare the data of the card in the sensing chamber as represented by the pins 236, with the data of the card which preceded it in the sensing chamber as represented by the pins 235.

The carriage for the pins 557 is reciprocated through a pair of bell cranks 562 each being pivoted to one of the carriage supporting plates 555 the upright arm of each having a roller 563 engaging in a slot formed in each of the carriage frame plates 556. The horizontal arm of each bell crank 562 carries a roller 564 underlying camming arms 565 secured to a rock shaft 566. Said shaft is journaled in a post 567 secured to the machine side frame casting 2. One of said camming arms 565, as can be seen also in Fig. 5, is connected by a twisted link 568 with rock arm 569 carried by a rock shaft 570 also journaled in the post 567. Secured to the outer end of the shaft 570 is an arm 571 which, as best seen in Fig. 10, is connected by a link 572 with a follower arm 573 mounted on the pivot stud 363. Said follower arm carries a roller 574 cooperatively engaging a pin carriage actuating cam 575 mounted on the front main drive shaft 69. Each rotation of said cam operates through the aforementioned linkage to positively rock the camming fingers 565 counter-clockwise as viewed in Fig. 17, against the tension of a spring 576 to rock the bell cranks 562 clockwise moving the wiring unit carriage supporting pins 557 into engageable relation with the sequence detecting unit pins 235. It will be understood that the sequence detecting unit pins 235 will be engaged by only those carriage supported pins 557 which are held actuated by their associated Bowden wires 561 in accordance with the sensed data. The carriage is restored under the influence of springs 577 stretched between the carriage bearing studs 558 and the supporting plates 555. From the foregoing, it will be seen that the sequence checking wiring unit 545 operates to enter the data sensed from a preselected field of a single card into both sides of the sequence detecting unit but, however, at different times with respect to the same sequence detecting cycle with the result that each sequence detecting cycle operates to sequentially compare the data sensed from a card in the master card sensing chamber with the data sensed in the preceding card sensed in said sensing chamber.

In a sequence checking operation the feeding function selecting dial 155 is set to condition the machine for feeding operation No. 3 wherein, as heretofore described, the comparing feed control shaft 150, see Fig. 13, is rocked to its most clockwise rocked position to raise the feed control link 62 to its uppermost control position whereby, in the absence of an impulse to the sequence control feed shaft 380, only the master card feed mechanism will operate. Fig. 12 shows the setting of the sequence control knob 365 for a single file operation wherein the sequence control member 364 has rotated 180° from its setting for a two file operation, and wherein the leg 371 may engage stud 368 to provide a feed controlling impulse to the sequence feed control shaft 380 and wherein the tail 372 may engage stud 409 to provide through the unequal link 403 an unequal impulse to the sequence punching and segregating control shaft 410. Fig. 12 shows the T link 355 tilted to the left of its intermediate equal position which results when the value represented by the pins 235 of the sequence detecting unit is higher than the value represented by the sequence detecting unit pins 236. Since, as heretofore described, the pins 235 represent the value sensed from the preceding card while the pins 236 represent the value of the card currently in the sensing chamber, the position of the parts in Fig. 12 indicates a wrong sequence condition, it being understood, of course, that the normal ascending order between successive cards of the file is the correct sequential relationship. As heretofore mentioned, the leg 371 of the sequence control member 364 is shorter than either of the legs 366, 367 thereby creating a predetermined amount of lost motion between said leg and the stud 368 so that as the T link 355 is pulled downwardly by the cam 360 the bell crank 370 is rocked only ½ the extent it is rocked by the leg 366 thereby providing a half step impulse to the sequence feed control shaft 380. Said half step counter-clockwise rocking of the control shaft 380, when the machine is conditioned for feeding operation No. 3, will result in lowering the feed control link 62 only to its intermediate control position thereby enabling concurrent operation of the master and detail card feeding mechanisms. Accordingly, with signal cards placed in the detail feed magazine 10, the occurrence of the wrong sequence condition will result in the concurrent feeding of a signal card to the interfile pocket 25 thereby marking the location of the wrong sequence condition.

If the unequal sequence control button 420 is set in its effective position a wrong sequence (unequal) impulse will be imparted to the sequence punching and segregation control shaft 410 through the engagement of the tail portion 372 with stud 409, so as to enable segregation of the card causing the wrong sequence relationship.

In the event of an equal sequence relationship between successive cards the T link 355 will assume its intermediate position so as to actuate the equal link 412. Accordingly, if the equal sequence control button 425 is set to its effective position the card which creates the equal sequence relationship may also be segregated.

In the event of a correct sequence relationship between successive cards, the T link 355 will be swung to the right in which position there can be no impulse to the sequence feed control shaft 380 or to the sequence punching and segregating control shaft 410. Accordingly, only the card creating the correct sequence relationship will feed and will not be segregated regardless of the effective settings of the equal and the unequal sequence control buttons 425, 420 respectively. It will be noted that in a sequence checking operation employing feeding operation No. 3, the master card feeding mechanism will operate to feed a card each cycle and is never disabled, and the detail card feeding mechanism operates only as a result of a wrong sequence condition to feed a signal card concurrently with the card creating the wrong sequence condition. Since, as heretofore described, in cycles when both feeding mechanisms operate, the master card reaches the interfile pocket in advance of the card fed by the detail feeding mechanism, the signal card will appear in the sequence checked file, in the event the wrong sequence card is not segregated, in a position immediately following said wrong sequence card. In the event that said wrong sequence card is segregated, the signal card will take the place of the segregated wrong sequence card in the checked file.

Fig. 31 illustrates a typical single file sequence checking operation wherein the machine is conditioned to segregate only wrong sequence cards and to interfile signal cards with the correct sequence and equal cards. It will be noted that the sequence control knob 365 is set in position for a single file operation so as to render the short leg 371 of the control member 364 effective as a result of wrong sequence conditions. The equal sequence signal control button 425 is ineffective and the unequal sequence signal control button 420 is set to its effective position so as to provide a segregation impulse only as a result of a wrong sequence condition. Segregation control lever 200 is set so that any segregation impulse will be carried to only the upper or master card segregating mechanism. The punching and segregating control dial 225 is set in one of the settings which calls for segregation as a result of a match condition in the comparing unit. In this operation, the comparing unit is disabled, and as heretofore described, when disabled, registers a match condition, so that setting of the dial 225 for segregation of matched cards enables the segregation impulse through the sequence punching and segregation control shaft 410 to be carried to the master card segregating mechanism. In this operation, the punching mechanism is also disabled since the sequence checking wiring unit 545 does not provide a wiring between the comparing unit and the punch mechanism. Accordingly, the fact that the setting of the punching and segregating control dial 225 also calls for punching of matched cards is immaterial, and any other setting of the dial 225 which calls for segregation of matched cards could be employed in this operation with the same results.

It will also be noted that by reason of the setting of the sequence control knob 365 for a single file operation, the feeding function of feeding operation No. 3 is modified so that the upper or master card feeding mechanism operates each cycle regardless of the sequence relationships, while the lower or detail feeding mechanism will concurrently operate only as a result of a wrong sequence condition.

In the first sequence detecting cycle, the first master card "1" will be sequentially compared with a blank or 0 setup resulting from the absence of a card in the sensing chamber in the previous cycle, and since the sequence relationship is correct said first master card will feed to the interfile pocket 25.

In the second cycle the master card "2" will be sequentially compared with master card "1" to result in a correct sequence relationship so as to feed to the interfile pocket 25.

In the third cycle, master card "3" will be sequentially compared with master card "2" to result in a correct sequence condition causing the feed of master card "3" to the interfile pocket 25.

In the fourth cycle, master card "5" will be sequentially compared with master card "3" to again result in a correct sequence relationship causing master card "5" to feed to the interfile pocket 25.

In the fifth cycle, master card "4" will be sequentially compared with master card "5" to result in a wrong seqential relationship. In this instance the sequence feed control shaft 380 will be rocked a half step so as to enable concurrent feeding of a signal card by the detail feeding mechanism. An unequal (wrong sequence) impulse will also be transmitted to the sequence punching and segregating control shaft 410 to result in card "4" being segregated into the eject pocket 26. The signal card will feed to the interfile pocket 25 to take the place of the segregated master card.

In the sixth cycle, card "6" will be sequentially compared with card "4" to result in a correct sequence relationship causing card "6" to feed to the interfile pocket 25.

In the seventh cycle, the second card "6" will be seqentially compared with the first card "6" to result in an equal sequence relationship. Since, in this operation the sequence equal signal control button 425 is not set in its effective position, there will be no segregation impulse and said second card "6" will be fed as an equal to the interfile pocket 25.

In the eighth cycle, card "7" will be sequentially compared with the second card "6" to result in a correct sequence relationship causing the feed of card "7" to the interfile pocket 25.

In the ninth cycle, card "8" will be sequentially compared with the card "7" to result in a correct sequence relationship causing card "8" to feed to the interfile pocket 25.

In the tenth cycle, card "10" will be sequentially compared with the card "8" to result in a correct sequence relationship causing said card "10" to feed to the interfile pocket 25.

In the eleventh cycle, the second card "10" will be sequentially compared with the first card "10" to result in an equal sequence relationship. Since the controls are not set to segregate the equals, said second card "10" will feed to the interfile pocket 25.

In the twelfth cycle, card "9" will be sequentially compared with card "10" to result in a wrong sequence relationship and accordingly, both feeding mechanisms will operate and the first card "9" will be segregated in pocket 26 while the signal card is fed to the interfile pocket 25.

In the thirteenth cycle, the second card "9" will be sequentially compared with the first card "9" to result in an equal sequence relationship thereby causing the second card "9" to feed to the interfile pocket 25.

In the fourteenth cycle, card "11" will be sequentially compared with the second card "9" to result in a correct sequence relationship causing card "11" to feed to the interfile pocket 25.

It will be noted that when the machine is conditioned for this operation, only the cards which creates the wrong sequence condition are segregated and without segregation of the cards which create an equal sequence relationship. If, in this example, the sequence equal signal control button 425 were also set to its effective position, all cards which created an equal sequence relationship would also be segregated in pocket 26. In the event only the sequence equal signal control button 425 is effective, with the unequal signal control button 420 ineffective, only the card which created an equal sequence relationship would be segregated, i. e., all but the first equal card of equal card groups, which in the illustrative example would be the second card "6," the second card "10" and the second card "9." The first card of such equal card groups would not be segregated since they would not create equal sequence relationships with the cards which preceded them respectively. When only the sequence equal signal control button 425 is effective, all cards creating wrong sequence relationships are interfiled in pocket 25 immediately preceding a signal card.

In the event that neither the sequence equal signal control button 425 nor unequal signal control button 420, respectively, are effective, no card of the file being checked will be segregated, and all will feed to the interfile pocket 25, the card creating the wrong sequence condition being immediately followed by a signal card.

In a single file self sequencing operation only the lower or detail card feed mechanism is employed, and the detail card sensing mechanism is wired to the sequence detecting unit in such a manner as to enable detection of sequence relationships between two related fields of the same card. One of said fields will be hereinafter referred to as the primary field, the other as the secondary field. A self sequencing wiring unit 580 is shown in the plan views, Figs. 2 and 6, and also in the detailed elevation views in Figs. 18 and 19. Said self-sequencing wiring unit comprises the usual box-like framework adapted for mounting on the wiring unit guide rails 431, 432. Said wiring unit frame supports a plurality of lower wiring unit pins 581, 582 arranged in two groups. The pins 581 are disposed for engagement by the pins of detail card set pin box 15, see Fig. 1, which are actuated each sensing cycle under control of the primary field of a card, while the wiring unit pins 582 are disposed for engagement by those pins of the detail card set pin box 15 associated with the secondary field of the card. Mounted on the side of the wiring unit framework is an outlet plate 583 on which is supported a field of outlet pins 584, said outlet pins 584 being disposed to engage the pins 235 of the sequence detecting unit. Bowden wires 585 are provided to interconnect operatively the lower wiring unit pins 582 with the side outlet pins 584. Data sensed in the secondary field of a card may thus be entered in one side of the sequence detecting unit each sensing cycle.

Also mounted on the framework of said wiring unit is a second outlet plate 587 supporting one end of each of a field of outlet pins 588, the other end of said pins 588 being suitably carried in a comb 589 see Fig. 6 secured to the frame of the wiring unit. Said side outlet pins 588 are disposed to engage the pins 236 of the sequence detecting unit and are operatively connected by Bowden wires 590 with the lower wiring unit pins 581 so that data sensed in the primary field of a card may be entered in the other side of a sequence detecting unit. Since there is no reading retaining mechanism associated with the detail card sensing means and no locking means associated with the sequence detecting unit pins 236, locking means are provided in the self sequencing wiring unit for the outlet pins 588 in order that the data sensed from the primary field of the card may be retained to hold the sequence detecting unit pins 236 actuated until the completion of a cross reading cycle. Said locking means include locking slides 591, similar in operation to the locking slides 245 associated with the sequence detecting unit pins 235. There being one slide 591 for each horizontal row of the outlet pins 588 which, it is understood, corresponds to one column in the primary field of a card. Said locking slides 591 are suitably supported in the frame of the wiring unit and provided with locking noses cooperating with extrusions 592 formed on each pin 588 so as to hold the associated pin actuated until the locking slide is retracted.

Cooperating with each locking slide 591 is a retract bail 593 which is rocked each cycle to retract all locking slides against the tension of their individual leaf springs 594 at the completion of each cross reading cycle. The retract bail 593 is carried by an upper and lower rock arms 596, 597 respectively secured to opposite ends of an upright rock shaft 595 which is suitably journaled in the framework of the wiring unit. Pivoted to the upper rock arm 596 is a link 598 formed with a slot embracing the upright arm of a bell crank 599. Said bell crank is pivoted to the framework of the wiring unit and has a forwardly extending arm which is bent so as to underlie, as best seen in Fig. 19, a camming arm 565. As heretofore mentioned in connection with a sequence checking operation, said camming arm 565 is rocked each cycle so as to reciprocate the pin supporting carriage of the sequence checking wiring unit 545.

In a self sequencing operation employing the self sequence wiring unit 580, said camming arm 565 cooperates with the bell crank 599 to rock the bell crank counter-clockwise, as viewed in Fig. 18, against the tension of a spring 601 so as to rock the locking slide retract bail 593 and retract all locking slides 591 thereby releasing the set up of the sequence detecting unit pins 236.

From the foregoing, it will be seen that the self sequencing wiring unit 580 is effective in each sensing cycle for entering data sensed from the secondary field of a card in the sequence detecting unit pins 235 and the data sensed from the primary field of the same card in the sequence detecting unit pins 236 and for retaining the set up of the pins 236 until the completion of a cross reading cycle so that the sequential relationship between the primary and secondary fields of the card can be detected.

Mounted on the opposite side frame is a bell crank 605, of the self sequencing wiring unit 580, as seen in Figs. 19 and 20. Said bell crank, as can be seen also in Figs. 9 and 13, carries on one arm thereof a stud 606 disposed to bear against a rock arm 607 which is mounted fast on the sequence feed control shaft 380. The other arm of said bell crank carries a stud 608 engaging the upturned end of a link 610. A spring 609 tensions the bell crank 605 in a counter-clockwise direction as viewed in Figs. 9 and 13.

The link 610, slidably supported on bearing studs 611 secured to the machine frame, extends rearwardly to transmit a segregation impulse under the influence of the sequence feed control shaft 380 to the detail card deflector 210, see Figs. 2 and 3 associated with the receiving pocket 24. The bell crank 605 serves to operatively associate through rock arm 607, said link 610 with the sequence feed control shaft 380 in a self sequencing operation. It will be seen that a counter-clockwise rocking of the sequence feed control shaft 380, which will result whenever the primary field of a sensed card is found to be of lower order than the secondary field of such card, will operate through the rock arm 607 and bell crank 605 to pull the link 610 forwardly, against the tension of a spring 612, see Fig. 2, to cause operation of the deflector 210 through the mechanism now to be described.

The deflector 210 associated with the detail card receiving pocket 24 is carried fast on a rock shaft 615 suitably journaled in the framework on the machine, see Figs. 3, 25 and 26. As fully described in the aforementioned patent to Ferry 2,496,124, said deflector may be manually set in an open or closed position as a result of the setting of the interfile control dial 205 operating through the camming arm of a bell crank 616 engaging a camming roller 617 carried by a rock arm 618. In the present machine, as distinguished from that of said patent, the arm 618 is loosely mounted on the deflector shaft 615. A spring 619 tensions the arm 618 counter-clockwise causing a stud 621 carried by the arm 618 to bear against one arm of a bell crank 622. Bell crank 622 is fast on the deflector operating shaft 615, one arm of said bell crank being yieldably connected by a spring 623 to the rock arm 618, so as to yieldably follow the clockwise rocking of the arm 618. From the aforegoing, it will be seen that when the interfile control dial 205 is set in its "1" control position, as shown in Fig. 3, the deflector 210 will be maintained in open position and interfiling of cards fed by the detail feeding mechanism will be inoperative. When the interfile control dial is set in any one of its three operative positions, the deflector 210 will be yieldably maintained in its closed position rendering interfiling operative but, however, said deflector may be opened upon receipt of a segregation impulse through the additional segregating control linkage now being described.

The other arm of bell crank 622 is slotted to engage a stud 624 carried at the lower end of a camming arm 625 suitably pivoted to the frame of the machine. Secured to the camming arm 625 is an angle bracket 626 supporting an adjustably mounted stud 627, in the form of a set screw, in engageable relation to the bent over rearward end of a push rod 628. Said push rod is slidably supported at one end by a stud 629 on the machine frame, the rearward end of said push rod 628 having a pin 631 engaging a slot in an upright actuating link 632 in cooperation with a spring 633. The upper end of link 632 is operatively connected with the rearward end of the heretofore mentioned link 610 through a bell crank 634 pivoted to the machine frame so that each segregation impulse to said link 610 will operate through links 632 to yieldably lower the rearward end of the push rod 628 from the position shown in Fig. 3 into horizontal alignment with the adjustable stud 627. The push rod 628 is cyclically actuated through an actuating lever 635, said lever having a pin in slot connection with said push rod 628 and with a link 636. Said link corresponds to the link 96 of said patent to Ferry 2,496,124 and, as fully described therein, is cam actuated at a proper time in the cycle so as to delay the operation of deflector 190, corresponding to deflector 93 of said patent, as a result of a segregation impulse until the card creating such impulse arrives at said deflector from the detail sensing chamber. As best seen in Fig. 25, link 636 is pivotally joined to an upright rock arm 637 carried by a short rock shaft 638 suitably journaled in the frame of the machine. Said shaft also carries a follower arm 639 having a roller 641 cooperating with a deflector operating cam 640 mounted on the rear main drive shaft 140, under tension of a spring 642. It will be seen that the high dwell of the cam 640 operates through the actuating lever 635 to slide the push rod 628 rearwardly to its effective position wherein, if in alignment with the stud 627 as a result of a segregation impulse, the arm 625 will be rocked clockwise to cam the deflector 210 to its open position.

Figs. 25 and 26 show the position the parts assume upon receipt of a segregation impulse through the links 610, 632. Fig. 25 illustrating the position before the deflector actuating cam can be effective, Fig. 26 illustrating the position of the parts at a subsequent time in the cycle and after the cam 640 has been effective. It will be seen that since the segregation impulse occurs at a time when the high dwell of cam 640 is effective, the lowering of the push rod 628 is temporarily delayed since the rearward end of said push rod cannot clear the studs 627 and thereby takes the position bearing on the top of said stud 627 as shown in Fig. 25. As the cycle progresses and the low dwell of cam 640 becomes momentarily effective, the push rod 628 is restored forwardly permitting the rearward end thereof to drop fully into horizontal alignment with the stud 627. Subsequently, at a later point in the cycle, the high dwell of cam 640 again becomes effective to slide the push rod rearwardly at which time the stud 627, as shown in Fig. 26, is engaged to result in the opening of deflector 210 as heretofore described. From the foregoing, it will be seen that the additional segregating mechanism just described provides for selective segregation of cards to the detail card receiving pocket 27 in addition to the means for selectively segregating cards into the detail eject pocket 26. The additional segregating means is ineffective when the interfile control dial is set at its No. 1 (inoperative) setting, as shown in Fig. 3, since in this control setting the deflector 210 associated with pocket 24 is maintained in its open position by the spring 619 in conjunction with the camming arm of the bell crank 616. When the interfile control dial 205 is set at any one of its other three control settings, a segregation impulse through links 610, 625 from the sequence feed control shaft 380 will result in the opening of the deflector 210 at a time to segregate in pocket 24 the card, the sensing of which revealed that the value recorded in the primary field was lower than the value recorded in the secondary field so as to give rise to such a segregation impulse.

Fig. 32 illustrates the segregating possibilities of a single file self-sequencing operation. It will be noted that the feeding function selector dial 155 is set for feeding operation No. 2, and since the sequence control knob 365 is set for a single file operation, the result is to condition the machine for feeding lower or detail cards each machine cycle regardless of any sequence relationships that may be detected. The sequence equal signal control button 425 is set effective so as to provide a segregation impulse to the sequence punching and segregating control shaft 410 whenever the primary field of the card is found to be equal to the secondary field. The sequence unequal signal control button 420 is set ineffective. The punching control lever 175 may have any setting since the punching function in this type of operation is disabled by reason of there being no wiring to the punch set up mechanism in the self-sequencing wiring unit 580. The segregation control lever 200 may be set in either its "lower" or "both" setting so as not to dissociate the lower or detail segregating mechanism from control by the sequence punching and segregating control shaft 410. The punching and segregating control dial 225, since the punch mechanism is disabled as heretofore mentioned, may be at any setting calling for segregation as a result of a match relationship so that the matched condition of the disabled comparing mechanism may transmit an impulse from the sequence punching and segregating control shaft 410 to the segregating linkage for operating the detail card deflector 190. The interfiling control dial 205 is placed in its No. 2 (match) setting so that the respective segregation impulses will operate to open the deflector 210, 190 respectively.

In the first cycle of operation, upon sensing of the first card, sequential comparison of the primary field with the secondary field will result in an equal sequence relationship. Since the sequence equal signal control button 425 is effective, said first card will be segregated and will feed to the eject pocket 23.

The primary field of the second card when sequentially compared with the secondary field will result in an unequal sequence relationship with the primary field of lower order. Since the primary field is wired to the pins 236 of the sequence detecting unit, with the secondary field wired to the pins 235, the sequence control means will assume the position shown in Fig. 12 to result in a half step impulse to the sequence feed control shaft 380. However, this impulse, in feeding operation No. 2 will not effect the feeding function of the machine and will only provide a segregation impulse for the deflector 210. As a result, the second card will be segregated in receiving pocket 24.

The sequential comparison of the two fields of the third card will result in an unequal condition with the primary field of higher order. Since the sequence control knob is set for a single file operation there can be no segregation impulse to the punching and segregating control shaft 410. Neither will there be any impulse transmitted to the sequence feed control shaft 380. Accordingly, the third card will feed to the interfile pocket 25.

The sequential comparison of the two fields of the fourth card will result in an equal sequence relationship so that said fourth card will be segregated by deflector 190 into the eject pocket 23.

The sequential comparison of the two fields of the fifth card will result in an unequal sequence relationship with the primary field of lower order. Accordingly, a segregation impulse through the sequence feed control shaft 380 will cause operation of the deflector 210 to segregate said fifth card into the receiving pocket 24.

The sequential comparison of the two fields of the sixth card will result in an unequal sequence relationship with the primary field of higher order. Accordingly, there will be no segregation impulse either through the sequence punch and segregating control shaft 410 or the sequence feed control shaft 380 so that the sixth card will not be segregated but will feed to the interfile pocket 25.

Sequential comparison of the two fields of the seventh card will again result in an unequal relationship with the primary field of higher order. Said seventh card, will be fed to the interfile pocket 25.

The eighth card, being a duplicate of the seventh card, will produce the same sequence relationships so that said eighth card will likewise feed to the interfile pocket 25.

The sequential comparison of the two fields of the ninth card will result in an equal sequence relationship giving rise to a segregation impulse to the sequence punching and segregation control shaft 410. As a result, the ninth card will be segregated into eject pocket 23.

The sequential comparison of the two fields of the tenth card will result in an unequal sequence relationship with the primary field of lower order thereby transmitting a half step impulse to the sequence feed control shaft 380. Accordingly, the tenth card will be segregated by deflector 210 into the receiving pocket 24.

It will be noted that in a self-sequencing operation employing feeding operation No. 2, any impulse which may be transmitted to the sequence feed control shaft 380 is not utilized for feed controlling purposes and is utilized only for controlling the additional segregating mechanism associated with the pocket 24. The sequence feed control shaft 380 can be employed for this purpose only in a self-sequencing operation since only the self-sequencing wiring unit 580 is provided with the means, bell crank 605, for operatively associating said feed control shaft with the segregation impulse transmitting link 610.

From the foregoing, it will be seen that in a self-sequencing operation, the additional segregating mechanism associated with the receiving pocket 24 enables a file of cards to be separated into three different groups in accordance with the three different sequential relationships between the primary and secondary fields of each card. In the event it should be desired to separate from the file only the cards having a primary field of lower sequential order than the secondary field, this could be achieved by setting the sequence equal control button 425 to its ineffective setting. With the machine conditioned in this manner, all cards having equal primary and secondary fields, which are shown in Fig. 32 as being segregated in pocket 23, would instead not be segregated and would feed to be interfiled in pocket 25 with the cards having the high order primary field. Only the cards having a low order primary field would be separated from the file and segregated in the pocket 24. This same segregating function could also be achieved by setting the interfile control dial 205 to its No. 1 (inoperative) setting in conjunction with setting of the sequence equal signal control button 425 to be ineffective and the unequal signal control button 420 to be effective. When the machine controls are conditioned in this manner, the additional segregating mechanism associated with the pocket 24 is ineffective and since the unequal signal control button 420 is set to be effective, all cards having a low order primary field would be separated from the file and segregated into the eject pocket 23. Since the single file setting of the sequence control knob 365 prevents an unequal impulse resulting from the sensing of a high order primary field, and also since the sequence equal signal control button is ineffective, all cards having a high order primary field together with all cards having equal primary and secondary fields would feed to the receiving pocket 24.

In the event it would be desired to seperate from the file only the cards having equal primary and secondary fields, this could be accomplished by setting the sequence equal signal control button 425 effective, the unequal signal control button 420 ineffective with the interfiling control dial 225 at its No. 1 (inoperative) setting. In this instance, a segregation impulse results only when the compared fields are equal so that all cards having equal primary and secondary fields will be segregated into pocket 23 and all remaining cards having primary fields either of higher or lower order will feed to the receiving pocket 24.

In the event it would be desired to separate from the file only those cards having a primary field of higher order, this could be accomplished by setting both the sequence equal signal control button 425 and the unequal signal control button 420 in their effective settings with the interfiling control dial 225 at its No. 1 (inoperative) control position. When the machine controls are conditioned in this manner, a segregation impulse will result whenever the compared fields are equal or whenever the primary field is of lower order. Accordingly, cards having equal primary and secondary fields and cards having primary fields of lower order will be segregated into the pocket 23, and only the cards having a primary field of higher order will feed to the receiving pocket 24.

Accordingly, it will be seen that in a self-sequencing operation, the proper setting of the machine controls can result in a variety of segregating functions which functions include the separation of the file into three separate groups in accordance with the three possible sequence relationships between the primary and secondary fields of the respective cards.

While we have described what we consider to be a highly desirable embodiment of our invention, it is obvious that many changes in form could be made without departing from the spirit of our invention, and we, therefore, do not limit ourselves to the exact form herein shown and described, nor to anything less than the whole of our invention as hereinbefore set forth, and as hereinafter claimed.

What we claim as new and desire to secure by Letters Patent is:

1. In a machine of the class described, individual means for feeding and sensing seriatim records arranged in individual record groups, comparing means operated by the respective sensing means for determining match or non-match relationships between data recorded in corresponding first fields of the records of the respective groups, punching means operable for reproducing in a record of one group data sensed in a record of the other group, means for detecting sequential relationships between data recorded in corresponding second fields of the records of the respective groups, and means controlled jointly by said comparing means and said detecting means and settable for actuation in accordance with a selected combination of compared relationships for enabling the operation of said punching means.

2. In a machine of the class described, individual means for feeding and sensing seriatim records arranged in individual record groups, comparing means operated by the respective sensing means for determining match or non-match relationships between data recorded in corresponding first fields of the records of the respective groups, segregating means associated with each feeding means and operable for segregating records from each of the respective record groups, detecting means for determining sequential relationships between the data recorded in corresponding second fields of the records of the respective record groups, and means controlled jointly by said comparing means and said detecting means and settable for actuation in accordance with a selected combination of compared relationships concurrently determined by said comparing and detecting means for enabling the operation of said segregating means.

3. In a machine of the class described, individual means for feeding and sensing seriatim records arranged in individual record groups, comparing means operated by the respective sensing means for determining match or non-match relationships between the data recorded in corresponding first fields of the records of said respective groups, punching means operable for reproducing in a record of one group data sensed in a record of the other group, means associated with each feeding means for segregating records from each of the respective record groups, detecting means for determining sequential relationships between data recorded in corresponding second fields of the records of the respective record groups, and means controlled jointly by said comparing means and said detecting means and settable for actuation in accordance with a selected combination of compared relationships for enabling the operation of said punching means and said segregating means.

4. In a machine of the class described controlled by records prearranged in individual record groups, record sensing means associated with each of said record groups, individual feeding means for each record group operable for advancing the records of each group to and from the associated sensing means, comparing means operated by the respective sensing means for determining matching relationships between corresponding first fields of the records of the respective record groups, punching means operable for reproducing in a record of one group data sensed in a record of another group, detecting means for determining sequential relationships between corresponding second fields of the records of the respective groups, means controlled by said detecting means for selectively enabling said individual feeding means to advance records of both groups in accordance with a predetermined sequential order, and means controlled jointly by said comparing means and said detecting means and settable for actuation in accordance with a selected combination of compared relationships for enabling the operation of said punching means.

5. In a machine of the class described controlled by records prearranged in individual record groups, record sensing means associated with each of said record groups, record feeding means for advancing seriatim records to and from the associated sensing means, comparing means operated by the respective sensing means for determining matching relationships between corresponding first fields of the records of the respective groups, means associated with each feeding means for segregating records from each of said record groups, detecting means for determining sequential relationships between corresponding second fields of the records of the respective groups, means controlled by said detecting means for selectively enabling said individual feeding means to advance records of both groups in accordance with a predetermined sequential order, and means controlled jointly by said comparing means and said detecting means and settable for actuation in accordance with a selected combination of compared relationships concurrently determined by said comparing and detecting means for enabling the operation of said segregating means.

6. In a machine of the class described controlled by records prearranged in individual record groups, record sensing means associated with each of said record groups, individual feeding means for each record group and operable for advancing records seriatim to and from the associated sensing means, comparing means operated by the respective sensing means for determining matching relationships between corresponding first fields of the records of the respective groups, punching means operable for reproducing in a record of one group data sensed in a record of another group, means associated with each feeding means operable for segregating records from each of said record groups, detecting means for determining sequential relationships between corresponding second fields of the records of the respective groups, means controlled by said detecting means for selectively enabling the operation of said feeding means to advance records of both groups in accordance with a predetermined sequential order, and means controlled jointly by said comparing means and said detecting means and settable for actuation in accordance with a selected combination of compared relationships for enabling the operation of said punching means and said segregating means.

7. In a machine of the class described controlled by records prearranged in individual record groups, record sensing means associated with each record group, individual feeding means for each record group and operable for advancing seriatim records to and from the associated sensing means, means operated by the respective sensing means for comparing data recorded in a record of one group with the data recorded in a record of another group, punching means operable for reproducing in a record of one group data sensed in a record of another group, means controlled by said comparing means for selectively enabling the operation of the individual feeding means in accordance with a predetermined order, means controlled by said comparing means for enabling the operation of said punching means upon the occurrence of a predetermined compared condition, and presettable means operated by said feed control means for preventing the operation of said punching means after the first and during immediately successive occurrences of the same compared condition.

8. In a machine of the class described controlled by records prearranged in individual record groups, record sensing means associated with each record group, feeding means associated with each record group and operable for advancing the records of each group seriatim to and from the associated sensing means, means operatively interconnected with said sensing means for comparing the data recorded in a record of one group with the data recorded in a record of another group, punching means operable for reproducing in records of a predetermined one of said groups data sensed in records of another one of said groups, function selecting means under control of said comparing means and settable to enable the operation of the feeding means for said predetermined record group and the operation of said punching means upon the occurrence of each agreeing compared condition, and means operated by said feed enabling means and settable to prevent the operation of said punching means upon each successive occurrence after the first occurrence of said agreeing compared condition.

9. In a machine of the class described controlled by records prearranged in individual record groups, record sensing means associated with each record group, feeding means associated with each record group and operable for advancing the records of each group seriatim to and from the associated sensing means, means operatively interconnected with said sensing means for comparing the data recorded in a record of one group with the data recorded in a record of another group, punching means operable for reproducing in records of a predetermined one of said groups data sensed in records of another one of said groups, function selecting means under control of said comparing means and settable to enable the operation of the feeding means for said predetermined record group and the operation of said punching means upon the occurrence of each non-agreeing compared condition, and means operated by said feed enabling means and settable to prevent the operation of said punching means upon each successive occurrence after the first occurrence of said non-agreeing compared condition.

10. In a machine of the class described controlled by records prearranged in individual record groups, record sensing means associated with each of said record groups, individual record feeding means for each record group and operable for advancing records to and from the associated sensing means, means operated by the respective sensing means for comparing data recorded in a record of one group with the data recorded in a record of another group, record deflecting means associated with each feeding means and operable for segregating records from each of said record groups, means controlled by said comparing means for selectively enabling the operation of said feeding means in accordance with predetermined compared conditions, means controlled by said comparing means to prevent the operation of said deflecting means upon the occurrence of a predetermined compared condition, and means controlled by said feeding means and presettable to enable the operation of said deflecting means after the first occurrence and upon each immediately successive occurrence of said predetermined compared condition.

11. In a machine of the class described controlled by records prearranged in individual record groups, record sensing means associated with each record group, feeding means for each record group and operable for advancing records to and from the associated sensing means, means operated by the respective sensing means for comparing data recorded in a record of one group with the data recorded in a record of another group, deflecting means associated with each feeding means and operable for segregating records from each of said respective record groups, function selecting means under control of said comparing means and settable to enable the operation of a predetermined one of said feeding means and to prevent the operation of the deflecting means associated with said predetermined feeding means upon the occurrence of an agreeing compared condition, and means conditioned by said function selecting means and presettable to enable the operation of the deflecting means associated with said predetermined feeding means upon each immediately successive occurrence after the first occurrence of said agreeing compared condition.

12. In a machine of the class described controlled by records prearranged in individual record groups, record sensing means associated with each record group, feeding means for each record group and operable for advancing records to and from the associated sensing means, means operated by the respective sensing means for comparing data recorded in a record of one group with the date recorded in a record of another group; deflecting means associated with each feeding means and operable for segregating records from each of said respective record groups, function selecting means under control of said comparing means and settable to enable the operation of a predetermined one of said feeding means and to prevent the operation of the deflecting means associated with said predetermined feeding means upon the occurrence of a non-agreeing compared condition, and means conditioned by said function selecting means and presettable to enable the operation of the deflecting means associated with said predetermined feeding means upon each successive occurrence after the first occurrence of said non-agreeing compared condition.

13. In a machine of the class described controlled by records prearranged in individual record groups, record sensing means associated with each record group, individual feeding means for each record group operable for advancing records seriatim to and from the associated sensing means, means operated by the respective sensing means for comparing data recorded in a record of one group with the data recorded in a record of another group, punching means operable for reproducing in a record of one group data sensed in a record of another group, deflecting means associated with each feeding means and operable for segregating records from each of said record groups, means controlled by said comparing means for selectively enabling the operation of the individual feeding means in accordance with a predetermined order, means controlled by said comparing means for enabling the operation of said punching means and preventing operation of said deflecting means upon each occurrence of a predetermined compared condition, presettable means operated by said feed control means for preventing the operation of said punching means upon each immediately successive occurrence after the first occurrence of the same compared condition, and presettable means operated by said feed control means in conjunction with said first mentioned presettable means for enabling the operation of said deflecting means upon each immediately successive occurrence after the first occurrence of the said same predetermined compared condition.

14. In a machine of the class described controlled by records prearranged in individual record groups, record sensing means associated with each record group, individual feeding means associated with each record group and operable for advancing records of each group seriatim to and from the associated sensing means, means operatively interconnected with said sensing means for comparing the data recorded in a record of one group with the data recorded in a record of another group, punching means operable for reproducing in records of a predetermined one of said groups data sensed in the records in another one of said groups, deflecting means associated with each feeding means and operable for segregating records from each of said respective record groups, function selecting means under control of said comparing means and settable to enable the operation of said punching means and the feeding means for said predetermined record group and to prevent the operation of the deflecting means associated with said predetermined feeding means upon the occurrence of an agreeing compared condition, means conditioned by said function selecting means and presettable to prevent the operation of said punching means upon each immediately successive occurrence after the first occurrence of said agreeing compared condition, and means presettable and operable in conjunction with said first mentioned presettable means to enable the operation of said deflecting means upon each immediately successive occurrence after the first occurrence of said agreeing compared condition.

15. In a machine of the class described controlled by records prearranged in individual record groups, record sensing means associated with each record group, individual feeding means associated with each record group and operable for advancing records of each group seriatim to and from the associated sensing means, means operatively interconnected with said sensing means for comparing the data recorded in a record of one group with the data recorded in a record of another group, punching means operable for reproducing in records of a predetermined one of said groups data sensed in the records in another one of said groups, deflecting means associated with each feeding means and operable for segregating records from each of said respective record groups, function selecting means under control of said comparing means and settable to enable the operation of said punching means and the feeding means for said predetermined record group and to prevent the operation of the deflecting means associated with said predetermined feeding means upon the occurrence of a non-agreeing compared condition, means conditioned by said function selecting means and presettable to prevent the operation of said punching means upon each successive occurrence after the first occurrence of said non-agreeing compared condition, and means presettable and operable in conjunction with said first mentioned presettable means to enable the operation of said deflecting means upon each successive occurrence after the first occurrence of said non-agreeing compared condition.

16. In a machine of the class described, individual means for feeding and sensing seriatim records arranged in individual record groups, segregating means associated with each feeding means and including deflecting means operable for separating records from each of the respective record groups, means operated by the respective sensing means for detecting sequential relationships between a record of one group and a record of another group, means controlled by said sequence detecting means for selectively enabling said individual feeding means in accordance with a predetermined sequential order, presettable means under control of said sequence detecting means for enabling the operation of the segregating means associated with the feeding means for said one record group upon each occurrence of a predetermined sequential relationship between records from the respective record groups, and auxiliary segregating control means controlled by said sequence detecting means in accordance with comparisons between records from the respective groups and between successive records in the other of said record groups for enabling the operation of the segregating means associated with the means for feeding said other record group.

17. In a machine of the class described controlled by records prearranged in individual record groups, individual means for feeding and sensing seriatim records arranged in individual record groups, segregating means associated with each feeding means and each including deflecting means operable for separating records from each of said record groups, means operated by the respective sensing means for detecting sequential relationships between a record of a first record group and a record of a second record group, said sequence detecting means including an impulse actuating member operated on each occurrence of an equal sequence condition between records from the respective groups and a further impulse actuating member operated upon each occurrence of a change in data designation between successive records from a predetermined one of said groups, means controlled by said sequence detecting means for selectively enabling the operation of said individual feeding means in accordance with a predetermined sequential order, means controlled by said sequence detecting means for enabling the operation of the segregating means for the other record group, said controlled means being settable to operate the other group deflecting means upon each actuation of said first mentioned impulse actuating member, and auxiliary segregation control means associated with said sequence detecting means for enabling independent operation of the deflecting means associated with the means for feeding said predetermined record group, said auxiliary means being controlled jointly by both of said impulse actuating members and presettable to operate said latter mentioned deflecting means upon each occurrence of similarity between the data designations of successive records of said predetermined record group.

18. In a machine of the class described, individual means for feeding and sensing seriatim records arranged in individual record groups, segregating means associated with each feeding means and each including deflecting mechanism operable for separating a record from each of said record groups, means operated by the respective sensing means for detecting sequential relationships between a record of a first record group and a record of a second record group, said sequence detecting means including an impulse actuating member operated upon each occurrence of an equal sequence condition, an impulse actuating member operated upon each occurrence of an unequal sequence condition between records in the respective groups, and a further impulse actuating member operated upon each occurrence of a change in data designation between successive records of a predetermined one of said record groups, means controlled by said sequence detecting means for selectively enabling the operation of said individual feeding means in accordance with a predetermined sequential order, means controlled by said sequence detecting means for enabling the operation of the said segregating means for the other one of said record groups, said controlled means being settable to operate the other group deflecting means upon each operation of said unequal impulse actuating member, and auxiliary segregation control means associated with said sequence detecting means for enabling the operation of the deflecting mechanism associated with the means for feeding said predetermined record group, said auxiliary means being jointly controlled by said equal impulse actuating member and said change of designation impulse actuating member and presettable to operate said latter mentioned deflecting mechanism upon each occurrence of dissimilarity between the data designations of successive records of said predetermined record group.

19. In a machine of the class described, individual means for feeding and sensing seriatim records arranged in individual record groups, segregating means associated with each feeding means and including deflecting mechanism operable for separating records from each of said record groups, means operated by the respective sensing means for detecting sequential relationships between a record of a first record group and a record of a second record group, said sequence detecting means including impulse actuating members, one operated on each occurrence of an equal sequence condition and another operated on each occurrence of an unequal sequence condition between records of the respective groups and a further impulse actuating member operated upon each occurrence of a change in data designation between successive records of a predetermined one of said record groups, means controlled by said sequence detecting means for selectively enabling the operation of said individual feeding means in accordance with a predetermined sequential order, means controlled by said sequence detecting means for enabling the operation of the segregating means for the other one of said record groups, said controlled means being settable to operate said deflector means for said other group upon each operation of said unequal impulse actuating member, and auxiliary segregation control means associated with said sequence detecting means for enabling operation of the deflector mechanism associated with the means for feeding said predetermined record group, said auxiliary means being controlled jointly by said equal impulse actuating member and said change of designation impulse actuating member and presettable to operate said latter mentioned deflector mechanism upon each occurrence of similarity between the data designations of successive records of said predetermined record group.

20. In a machine of the class described, individual means for feeding and sensing seriatim records arranged in individual record groups, segregating means associated with each feeding means including deflecting mechanism operable for separating records from each of said record groups, means operated by the respective sensing means for detecting sequential relationships between a record of a first record group and a record of a second record group, said sequence detecting means including impulse actuating members, one operated on each occurrence of an equal sequence condition and another operated on each occurrence of an unequal sequence condition between records from the respective groups and a further impulse actuating member operated upon each occurrence of a change in data designation between successive records of a predetermined one of said record groups, means controlled by said sequence detecting means of or selectively enabling the operation of said individual feeding means in accordance with a predetermined sequential order, means controlled by said sequence detecting means for enabling the operation of the segregating means for the other record group, said controlled means being settable to operate the other group deflecting mechanism upon each operation of said equal impulse actuating member, and auxiliary segregation control means associated with said sequence detecting means for enabling operation of the deflecting mechanism associated with the means for feeding said predetermined record group, said auxiliary means being controlled jointly by said equal impulse actuating member and said change in designation impulse actuating member and presettable to operate said latter mentioned deflecting mechanism upon occurrences of dissimilarity between the data designation of successive records of said predetermined record group.

21. In a machine of the class described, means for feeding and sensing seriatim records arranged in individual record groups, segregating means associated with each feeding means each including deflecting mechanism operable for separating records from each of said record groups, means operated by the respective sensing means for detecting sequential relationships between a record of a first record group and a record of a second record group, said sequence detecting means including an impulse actuating member operated on each occurrence of an equal sequence condition between records from the respective groups and a further impulse actuating member operated upon each occurrence of a change in data designation between successive records of a predetermined one of said groups, feed control means operated by said sequence detecting means for selectively enabling the operation of said individual feeding means to feed the group having the sensed record of lower order and presettable to enable operation of all said feeding means for record groups having sensed records of equal order, presettable segregation control means operated by said sequence detecting means for operating the deflecting mechanism associated with the feeding means for the other one of said record groups upon each occurrence of a predetermined sequential relationship between records of the respective record groups, and auxiliary segregating control means jointly controlled by said impulse actuating members independently of said first mentioned segregating control means for enabling operation of the deflecting mechanism associated with the means for feeding said predetermined record group.

22. In a machine of the class described, individual means for feeding and sensing seriatim records arranged in individual record groups, segregating means associated with each feeding means each including deflecting mechanism operable for separating records from each of said record groups, means operated by the respective sensing means for detecting sequential relationships between a record of a first record group and a record of a second record group, said sequence detecting means including an impulse actuating member operated upon each occurrence of an equal sequence condition between records from the respective record groups and a further impulse actuating member operated upon each occurrence of a change in data designation between successive records of a predetermined one of said groups, feed control means operated by said sequence detecting means for enabling the means for feeding the group having the sensed record of lower sequential order, said feed control means being presettable to prevent operation of the means for feeding said predetermined record group when the compared records are of equal order, segregation control means operated by said sequencing detecting means and presettable to enable operation of the segregating means associated with the feeding means for the other one of said record groups upon each occurrence of a predetermined sequential relationship between records from the respective record groups, and auxiliary segregating control means jointly controlled by said impulse actuating members independently of said first mentioned segregating control means and presettable to enable the operation of the deflecting mechanism associated with the means for feeding said predetermined record group.

23. In a machine of the class described controlled by records prearranged in individual record groups, record sensing means associated with each record group, individual feeding means for each record group and operable for advancing seriatim records to and from the associated sensing means, means operated by the respective sensing means for comparing data recorded in a record of one group with the data recorded in a record of another group, said comparing means including means for determining matching relationships between preselected fields of the compared records and means for detecting sequential relationships between other preselected fields of the compared records, punching means operable for reproducing on a record of one group data sensed in a record of another group, means controlled by said sequence detecting mechanism for selectively enabling the operation of the individual feeding means in accordance with a predetermined order, means controlled jointly by said comparing means and said sequence detecting means for enabling the operation of said punching means upon the occurrence of a predetermined combination of compared relationships, and presettable means operated by said feed control means for preventing the operation of said punching means upon successive occurrences after the first occurrence of the same predetermined combination of compared relationships.

24. In a machine of the class described controlled by records prearranged in individual record groups, record sensing means associated with each record group, individual feeding means for each record group and operable for advancing seriatim records to and from the associated sensing means, means operated by the respective sensing means for comparing data recorded in a record of one group with the data recorded in a record of another group, said comparing means including means for determining matching relationships between preselected fields of the compared records and means for detecting sequential relationships between other preselected fields of the compared records, segregating means associated with each feeding means each including deflector mechanism operable for separating records from each of said record groups, means controlled by said sequence detecting means for selectively enabling the operation of the individual feeding means in accordance with a predetermined order, means controlled jointly by said comparing means and said sequence detecting means for preventing the operation of said deflector mechanisms upon the occurrence of a predetermined combination of compared relationships, and presettable means operated by said feed enabling means for causing the operation of the deflector mechanism associated with a predetermined one of said feeding means upon successive occurrences after the first occurrence of the same predetermined combination of compared relationships.

25. In a machine of the class described, individual means for feeding and sensing seriatim records arranged in individual record groups, segregating means associated with each feeding means including deflector mechanism operable for separating records from each of the respective record groups, means operated by the respective sensing means for comparing data recorded in a record of a first group with the data recorded in a record of a second group, said means including a comparing mechanism for determining matching relationships between preselected fields of the records from the respective groups and a detecting mechanism for determining sequential relationships between other preselected fields of records from the respective record groups, said detecting mechanism including means for determining matching relationships between said other preselected fields of successive records in a predetermined one of said record groups, means controlled by said sequence detecting mechanism for selectively enabling said individual feeding means in accordance with a predetermined sequential order, presettable means controlled jointly by said comparing mechanism and said sequence detecting mechanism for enabling operation of the deflector mechanism associated with the means for feeding the other record group upon each occurrence of a predetermined sequential relationship between records from the respective record groups, and auxiliary segregating control means controlled by said sequence detecting mechanism in accordance with comparisons between records from the respective record groups and between successive records in said predetermined one of said record groups for enabling the operation of the deflector mechanism associated with the means for feeding said predetermined record group.

26. In a machine of the class described controlled by records prearranged in individual record groups, record sensing means associated with each record group, individual feeding means for each record group and operable for advancing seriatim records to and from the associated sensing means, means operated by the respective sensing means for comparing data recorded in a record of a first group with the data recorded in a record of a second group, said means including a comparing mechanism for determining matching relationships between preselected fields of the compared records and a detecting mechanism for determining sequential relationships between other preselected fields of the compared records, said detecting mechanism including means for determining matching relationships between successive records of a predetermined one of said record groups, segregating means associated with each feeding means each including a deflector mechanism operable for separating records from each of the respective record groups, means controlled by said sequence detecting mechanism for selectively enabling the operation of the individual feeding means in accordance with a predetermined order, means controlled jointly by said comparing mechanism and said sequence detecting mechanism for preventing the operation of the deflector mechanism associated with the means for feeding the other record group upon the occurrence of a predetermined combination of compared relationships, presettable means operated by said feed enabling means for causing the operation of said deflector mechanism associated with the means for feeding said other record group upon successive occurrences after the first occurrence of the same predetermined combination of compared relationships, and auxiliary segregating control means controlled by said sequence detecting mechanism in accordance with comparisons between records from the respective groups and between successive records from said said predetermined group for enabling the operation of the deflector mechanism associated with the means for feeding said predetermined record group.

27. In a machine of the class described, individual means for feeding and sensing seriatim records arranged in individual record groups, segregating means associated with each feeding means and including deflector mechanism operable for separating records from each of the respective record groups, means operated by the respective sensing means for comparing data recorded in a record of a first group with the data recorded in a record of a second group, said means including a comparing mechanism for determining matching relationships between preselected fields of the records from the respective record groups and a detecting mechanism for determining sequential relationships between other preselected fields of the records from the respective groups, said detecting mechanism including means for determining matching relationships between successive records from a predetermined one of said record groups, means controlled by said sequence detecting mechanism for selectively enabling said individual feeding means in accordance with a predetermined sequential order, presettable means under control of said comparing means for preventing the operation of the deflector mechanism associated with the means for feeding the other record group upon the occurrence of a predetermined compared relationship between records from the respective record groups, presettable means operated by said feed enabling means for causing the operation of the deflector mechanism associated with the means for feeding said other record group upon successive occurrences after the first occurrence of the same predetermined compared relationship, and auxiliary segregating control means controlled by said sequence detecting means in accordance with comparisons between records from the respective groups and between successive records from said predetermined record group for selectively operating the deflector mechanism associated with the means for feeding said predetermined record group.

28. In a machine of the class described, record sensing means, record feeding means for advancing a group of records seriatim to and from said sensing means, segregating means associated with a portion of said feeding means extending beyond the sensing means and including a deflector mechanism actuable for separating records from the record group, sequence detecting means arranged to register in separate sections the data recorded in a record field and operable for determining sequential relationships between data registered in said separate sections, means for operatively connecting said sensing means with said separate sections of said sequence detecting means, said connecting means including means for delaying the registration of sensed data in one of said separate sections to enable determination of sequential relationships between record fields sensed in successive sensing operations, and control means operated by said sequence detecting means and including an impulse transmitting member actuated only upon each occurrence of a predetermined unequal relationship and settable to actuate said deflector mechanism in response to each actuation of said impulse transmitting member, causing only each record bearing said predetermined unequal relationship to a preceeding record to be segregated from said record group.

29. In a machine of the class described, a record sensing means, means for feeding records prearranged in a record group to and from said sensing means seriatim, record distributing means associated with a portion of said feeding means extending beyond the sensing means including successively disposed pockets each having an independently actuable deflector mechanism for separating a record from said group into the associated pocket, said distributing mechanism also including a pocket disposed to receive all records not segregated by said deflector mechanisms, sequence detecting means arranged in sections for determining sequential relationships between predetermined record fields of a single record sensed by said sensing means, means operatively interconnecting said sensing means with said sequence detecting means, said connecting means correlating said predetermined fields of a record sensed by such sensing means with corresponding sections of said sequence detecting means, and control means operated by said sequence detecting means and settable to actuate each of said deflector mechanisms in accordance with a corresponding sequential relationship determined by said sequence detecting means, said control means enabling the selective segregation of records into said successively disposed pockets in accordance with the sequential relationship between the predetermined fields of each of said records.

30. A machine according to claim 29, wherein said control means includes an impulse transmitting member and an element settable to interconnect said member with a predetermined one of said deflector mechanisms, said impulse transmitting member being actuated upon each occurrence of a sequence relationship wherein the data sensed in one of said predetermined record fields is of lower order than the data sensed in another one of said record fields, said element when set effective causing actuation of said predetermined deflector mechanism upon each actuation of said impulse transmitting member, whereby each record wherein said one field is of lower order than said other field will be segregated from said record group.

31. A machine according to claim 29, wherein said control means includes an impulse transmitting member and a settable element interconnecting said member with a predetermined one of said deflector mechanisms, said impulse transmitting member being actuated under control of said sequence detecting means upon each occurrence of an equal sequence relationship between said predetermined record fields, said element when set effective causing the actuation of said predetermined deflector mechanism upon each actuation of said impulse transmitting member, whereby each record having fields containing data of equal sequence relationship is segregated from said record group.

32. A machine according to claim 29, wherein said control means includes impulse transmitting members and an element associated with each member settable to interconnect the associated member with a predetermined one of said deflector mechanisms, one of said members being actuated under control of said sequence detecting means upon each occurrence of a sequential relationship wherein the data sensed in one of said record fields is of lower order than the data sensed in the other of said record fields, another one of said impulse transmitting members being actuated under control of said sequence detecting means upon each occurrence of equality between the data sensed in the respective record fields, each of said elements when set effective causing the operation of said predetermined deflector mechanism upon each actuation of the associated transmitting member, whereby all records wherein the data sensed in said one field is of lower order than the data sensed in said other field and wherein the data sensed in the respective fields is of equal sequential relationship will be segregated by said predetermined deflector mechanism from said record group.

33. A machine according to claim 29, wherein said control means includes impulse transmitting members and means operatively interconnecting each of said transmitting members with an associated one of said deflector mechanisms, one of said transmitting members being actuated under control of said sequence detecting means whenever the data sensed in one of said record fields is of lower order relationship to the data sensed in the other record field, another one of said transmitting members being actuated under control of such sequence detecting means upon each occurrence of an equal sequence relationship between the data sensed in the respective record fields, whereby each record wherein the data sensed in said one field is of lower order than data sensed from the other field is segregated by one of said deflector mechanisms and each record wherein the data sensed in the respective fields is of equal sequence relationship is segregated from said record group by another one of said deflector mechanisms.

34. In a machine of the class described operable under control of sequential comparisons between separately designated data representations, a sequence detecting mechanism including a plurality of data representing elements arranged in two sections, each section being operatively associated with a corresponding one of said separately designated data representations, the elements within each section being disposed columnarily, each column corresponding to a denominational order of the value represented by said elements and paired with a column of the same denominational order in the other section, an indicating member for each pair of corresponding columns of said elements in said separate sections respectively, each indicating member having one position when the values represented in the associated columns of said elements are of equal relationship and settable to one or another unequal position depending upon which of the associated columns of said elements represents a value of higher order, means for reading the position of said indicating members, said reading means including a pivotally mounted member engageable by said indicating members when in an unequal position and means including a stationary member having an elongated slot which forms a guide channel for guiding said pivotally mounted member progressively into engageable relation with said indicating members, said member being rockable in one or another direction by an indicating member in unequal position depending upon which of said unequal positions said indicating member is set, and follower means engaging a free swinging portion of said pivotally mounted member throughout the entire carry of said member, said follower means being shiftable in one or another direction determined by the direction of rocking of said pivotally mounted member for registering the sequential relationship between values represented within said separate sections of said sequence detecting mechanism.

35. In a machine of the class described operable under control of sequential comparisons between separately designated data representations, a detecting mechanism operatively associated with said data representations and having indicating means for registering the sequential relationship between said data representations, said detecting means including means for reading the relationship registered by said indicating means, said reading means including a follower settable in a separate position corresponding to each separate sequential relationship detected, and sequence control means conditioned by said follower for transmitting impulses selectively in accordance with said detected sequential relationships, said control means including a plurality of impulse transmitting members, one for each unequal sequential relationship and one actionable upon the occurrence of an equal sequential relationship, said control means also including a member presettable to selectively actuate said transmitting members in accordance with the sequential relationship detected, said presettable member being positionable in response to the movement of said follower and having means effective in one setting for selectably actuating each of said transmitting members in accordance with the sequential relationship detected, and effective in another setting for selectively actuating said equal impulse transmitting member and a predetermined one of said unequal impulse transmitting members and preventing the actuation of the other one of said unequal impulse transmitting members.

36. In a machine of the class described operable under the control of sequential comparisons between separately designated data representations and including a function controlling member actuable in accordance with sequential relationships for enabling a predetermined machine function, a sequence detecting mechanism operatively associated with said data representations, said detecting mechanism including indicating means for registering sequential relationships between said data representations and reading means positionable in accordance with each sequential relationship registered by said indicating means, and control means conditioned by said reading means for actuating said function controlling member in accordance with preselected sequential relationships determined by said detecting means, said control means including a plurality of impulse transmitting members including one actuated upon the occurrence of each unequal sequential relationship and one actuated upon the occurrence of an equal sequential relationship, said control means including elements presettable to operatively connect said transmitting members with said function controlling member, one of said elements when effective operatively connecting said unequal impulse transmitting member with said function controlling member, another of said elements when effective operatively connecting said equal impulse transmitting member with said function controlling member, whereby said function controlling member may be actuated in response to a selected one or both types of sequential relationships detected by said sequence detecting mechanism.

37. In a machine of the class described operable under control of compared relationships between data recorded in individual records prearranged in separate record groups and having record processing means including record punching and segregating mechanism for effecting preselected punching and segregating functions in accordance with predetermined compared relationships between a record of one group and a record of another group, means for comparing data recorded on corresponding first fields of said individual records from the separate record groups and including a plurality of comparing control members settable in accordance with matching and non-matching relationships determined by said comparing means, detecting means for determining sequential relationships between data recorded on corresponding second fields of the same records compared by said comparing means, sequence control means including a rockable function control member actuated in accordance with the relationship determined by said detecting means, said control means also including an element presettable to actuate said rockable function control member upon the occurrence of each equal relationship and an element presettable to actuate said function control member upon the occurrence of each unequal relationship, a follower for each of said comparing control members, each of said followers being movable into operative relation to its related comparing control member and effective when in said operative relation for actuating a corresponding processing means depending upon the setting of said related control member, independently actuable enabling means for each of said followers for moving an associated follower into operative relation to a comparing control member, each of said enabling means including a member settable to cooperate with said rockable function control member and when cooperatively set responsive to the actuation of said function control member for enabling the associated follower, and a function selector control member engageable with said settable members for dissociating predetermined ones of said settable members from said rockable function control member, said function selector member being presettable in one of a plurality of selecting positions and effective in each position for dissociating all but selected ones of said settable members, whereby the functions selected by the setting of said selector member will be effected upon the occurrence of the selected matching relationship determined by said comparing means when occurring concomitantly with the selected sequential relationship determined by said detecting means.

38. In a machine of the class described operable under control of compared relationships between data recorded in individual records prearranged in separate record groups and having record processing means including record punching and segregating mechanism for effecting preselected punching and segregating functions in accordance with predetermined compared relationships between a record of one group and a record of another group, means for comparing data recorded on corresponding first fields of said individual records from the separate record groups and including a plurality of comparing control members settable in accordance with matching and non-matching relationships determined by said comparing means, said control members including one settable in an effective position upon the occurrence of a matching relationship and one settable in an effective position upon the occurrence of a non-matching relationship, detecting means for determining sequential relationships between data recorded on corresponding second fields of the same records compared by said comparing means, sequence control means actuated in accordance with the relationship determined by said detecting means and including a rockable function control member actuated upon the occurrence of each equal relationship, a follower for each of said comparing control members each of said followers being movable into operative relation to its related comparing control member and effective when in said operative relation for actuating a corresponding processing means when the related comparing control member is in an effective setting, independently actuable enabling means for each of said followers for moving the associated follower into operative relation to a comparing control member, each of said enabling means including a member settable to cooperate with said rackable function control member and when cooperatively set responsive to the actuation of said function control member for enabling the associated follower, and a function selector control member engageable with said settable members for dissociating predetermined ones of said settable members from said rockable function control member, said function selector member being presettable in one of a plurality of selecting positions and effective in each position for dissociating all but selected ones of said settable members, whereby individual functions selected by the setting of said selector control member will be effective upon the individual occurrences of matching and non-matching relationships determined by said comparing means when occurring concomitantly with an equal sequential relationship determined by said detecting means.

39. In a machine of the class described operable under control of compared relationships between data recorded in individual records prearranged in separate record groups and having record processing means including record punching and segregating mechanism for effecting preselected punching and segregating functions in accordance with predetermined compared relationships between a record of one group and a record of another group, means for comparing data recorded on corresponding first fields of said individual records from the separate record groups and including a plurality of comparing control members settable in accordance with matching and non-matching relationships determined by said comparing means, said control members including one settable in an effective position upon the occurrence of a matching relationship and one settable in an effective position upon the occurrence of a non-matching relationship, detecting means for determining sequential relationships between data recorded on corresponding second fields of the same records compared by said comparing means, sequence control means actuated in accordance with the relationship determined by said detecting means and including a rockable function control member actuated upon the occurrence of each unequal relationship, a follower for each of said comparing control members each of said followers being movable into operative relation to its related comparing control member and effective when in said operative relation for actuating a corresponding processing means when the relating comparing control member is in an effective setting, independently actuable enabling means for each of said followers for moving the associated follower into operative relation to a comparing control member, each of said enabling means including a member settable to cooperate with said rockable function control member and when cooperatively set responsive to the actuation of said rockable function control member for enabling the associated follower, and a function selected control member engageable with said settable members for dissociating predetermined ones of said settable members from said function control member, said function selector member being presettable in one of a plurality of selecting positions and effective in each position for dissociating all but selected ones of said settable members, whereby individual functions selected by the setting of said selector control member will be effective upon the individual occurrences of matching and non-matching relationships determined by said comparing means when occurring concomitantly with an unequal sequential relationship determined by said detecting means.

40. In a machine of the class described operable under control of compared relationships between data recorded in individual records prearranged in separate record groups and having processing means including record punching and segregating mechanism for effecting preselected punching and segregating functions in accordance with predetermined compared relationships between a record of one group and a record of another group, means for comparing data recorded on corresponding first fields of said individual records from the separate record groups and including a plurality of comparing control members settable in accordance with matching and non-matching relationships determined by said comparing means, said control members including one settable in an effective position upon the occurrence of a matching relationship and one settable in an effective position upon the occurrence of a non-matching relationship, detecting means for determining sequential relationships between data recorded on corresponding second fields of the same records compared by said comparing means, sequence control means actuated in accordance with the relationship determined by said detecting means and including a rockable function control member actuated upon the occurrence of each equal and unequal relationship, a follower for each said comparing control members, each of said followers being movable into operative relation to its related comparing control member and effective when in said operative relation for actuating a corresponding processing means when the related comparing control member is in an effective setting, independently actuable enabling means for each of said followers for moving the associated follower into operative relation to a comparing control member, each of said enabling means including a member settable to cooperate with said rockable function control member and when cooperatively set responsive to the actuation of said function control member for enabling the associated follower, and a function selector control member engageable with said settable members for dissociating predetermined ones of said said settable members from said rockable function control member, said function selector member being presettable in one of a plurality of selecting positions and effective in each position for dissociating all but selected ones of said settable members, whereby individual functions selected by the setting of said selector control member will be effective upon the individual occurrences of macthing or non-matching relationships determined by said comparing means regardless of the sequential relationship determined by said detecting means.

41. In a machine of the class described controlled by records prearranged in individual record groups, record sensing means associated with each of said record groups, individual feeding means for each record group operable for advancing the records of each group to and from the associated sensing means, said feeding means including record stopping elements cyclically operable to a closed position for maintaining a record in sensing relation to said sensing means during a sensing operation and retractable to an open position for releasing a record from said sensing means upon completion of a sensing operation, means operated by said sensing means for comparing data recorded in a record of one group with data recorded in a record of another group, means controlled by said comparing means for selectively enabling said individual feeding means in accordance with compared relationships, said enabling means including a rockable feed control member having a control position for concurrently enabling said individual feeding means and control positions individually disabling one of said individual feeding means, a disabling member for each of said record stopping elements and operable for preventing the retraction of the associated stopping element, said disabling members being selectively operated by said feed control member to prevent retraction of the stopping element associated with the feeding means disabled by said feed control member, and presettable record holding control means for preventing the operation of a predetermined one of said disabling members, said holding control means including a holding control member settable in one control position for enabling the operation of said predetermined disabling member, said holding control member being settable in a plurality of other control positions for preventing the operation of said predetermined disabling member, said holding controlling member also cooperating with said feed control member and shiftable from one of said plurality of other control positions to said enabling control position upon the actuation of said feed control member to the position disabling the feeding means operable in conjunction with said predetermined disabling member, whereby in one of said plurality of other control positions for said holding control means the stopping element controlled by said predetermined disabling member will retract to release a record regardless of compared relationships and in another of said plurality of other control positions for said holding control means the stopping element controlled by said predetermined disabling member will retract to release a record upon the occurrence of all but the compared relationship effective for individually disabling the associated feeding means.

42. In a machine of the class described controlled by records prearranged in individual record groups, record sensing means associated with each record group, individual feeding means for each record group and operable for advancing seriatim records to and from the associated sensing means, means operated by said sensing means for comparing data recorded in a record of one group with data recorded in a record of another group, a feed control member positionable by said comparing means in accordance with compared relationships and having separate control positions selectively disabling said individual feeding means, record processing means associated with each feeding means for effecting preselected machine functions in accordance with predetermined compared relationships, the processing means operating on records fed by one of said feeding means including a cyclically releasable and retractable member effective when retracted for preventing the operation of the associated processing means, a disabling element engageable with said retractable member and releasable for engagement therewith under control of said feed control member, said disabling element being released upon the movement of said feed control member to a control position for enabling said one associated feeding means and when fully released being effective for maintaining said retractable member in retracted position, and a hold-out member cooperating with said disabling element and actuated by said retractable member, said hold-out member preventing the full release of said disabling element to engage said retractable member when said retractable member is in retracted position and until said retractable member is first moved to released position, whereby successive operation after the first operation of said processing means on records successively fed by said one feeding means is prevented.

43. In a machine of the class described controlled by records prearranged in individual record groups, record sensing means associated with each record group, individual feeding means for each record group each operable for advancing seriatim records to and from the associated sensing means, means operated by said sensing means for comparing data recorded in a record of one group with data recorded in a record of another group, a feed control member positionable by said comparing means in accordance with compared relationships and having separate control positions selectively disabling said individual feeding means, recording means associated with a predetermined one of said feeding means for reproducing in a record fed by said predetermined feeding means data sensed in a record fed by another one of said feeding means, said recording means being controlled by said comparing means and including a cyclically releasable and retractable member effective when retracted for preventing the operation of said recording means, a disabling element engageable with said retractable member and releasable for engagement therewith under control of said feed control member, said disabling element being released by the movement of said feed control member to a control position enabling said predetermined feeding means and when fully released being effective for maintaining said retractable member in retracted position, and a hold out member cooperating with said disabling element and actuated by said retractable member, said hold out member initially preventing release of said disabling element to engage said retractable member when said retractable member is in retracted position and until said retractable member is first moved to released position, whereby successive operation after the first operation of said recording means on records successively fed by said predetermined feeding means is prevented.

44. In a machine of the class described controlled by records prearranged in individual record groups, record sensing means associated with each record group, individual feeding means for each record group each operable for advancing seriatim records to and from the associated sensing means, means operated by said sensing means for comparing data recorded in a record of one group with data recorded in a record of another group, a feed control member positionable by said comparing means in accordance with compared relationships and having separate control positions selectively disabling said individual feeding means, a deflecting mechanism associated with each feeding means for segregating records in accordance with compared relationships, actuating means for each of said deflecting mechanisms, the actuating means for the deflection mechanism operable on records fed by one of said feeding means including a cyclically releasable and retractable member effective when retracted for operating the associated deflecting mechanism, a disabling element engageable with said retractable member and releasable for engagement therewith under control of said feed control member, said disabling element being released upon the movement of said feed control member to a control position enabling said one feeding means and when fully released being effective for maintaining said retractable member in retracted position, and a hold out member cooperating with said disabling element and actuated by said retractable member, said hold out member initially preventing release of said disabling element to engage said retractable member when said retractable member is in retracted position and until said retractable member is first moved to released position, whereby the deflector mechanism operated by said one actuating means is ineffective for segregating the first of a succession of records fed by said one feeding names and effective for segregating all subsequent records successively fed by said one feeding means.

45. In a machine of the class described controlled by records prearranged in individual record groups, individual means for feeding and sensing seriatim records of each group, segregating means associated with each feeding means each including deflecting means operable for segregating records from each of said record groups, means operated by the respective sensing means for detecting sequential relationships between records of the respective groups, said detecting means including an impulse actuating member operated on each occurrence of an equal sequence relation between records from the respective groups and a further impulse actuating member operated upon each occurrence of a change in data designation between successive records of a predetermined one of said record groups, means controlled by said sequence detecting means for selectively enabling the operation of said feeding means to feed records from said groups in accordance with a predetermined sequential order, means controlled by said sequence detecting means for enabling the operation of the segregating means for the other one of said record groups, said controlled means being settable to operate the other group deflector means upon each occurrence of a predetermined relationship between records of the respective record groups, an auxiliary control member for the deflector means associated with the records of said predetermined record group, said auxiliary control member being actuable through a succession of alternately arranged effective and ineffective deflector operating control positions, a pair of complementally arranged actuating means for said auxiliary control member, each effective for advancing said control member from a related one of said control positions to the next succeeding control position, one of said actuating means being responsive to the operation of said first mentioned impulse actuating member and the other of said actuating means being responsive to the operation of said further impulse actuating member, and disabling means effective upon the operation of said one actuating means for preventing concurrent operation of said other actuating means, whereby the position of said deflector means determined by the operation of said first mentioned impuse actuating member will be maintained until the next operation of said further impulse actuating member without the concurrent operation of said first mentioned impulse actuating member.

46. In a machine of the class described controlled by records prearranged in individual record groups, individual means for feeding and sensing seriatim records of each group, segregating means associated with each feeding means each including deflecting means operable for segregating records from each of said record groups, means operated by the respective sensing means for detecting sequential relationships between records of the respective groups, said detecting means including an impulse actuating member operated on each occurrence of an equal sequence relation between records from the respective groups and a further impulse actuating member operated upon each occurrence of a change in data designation between successive records of a predetermined one of said record groups, means controlled by said sequence detecting means for selectively enabling the operation of said feeding means to feed records from said groups in accordance with a predetermined sequential order, means controlled by said sequence detecting means for enabling the operation of the segregating means for the other one of said record groups, said controlled means being settable to operate the said other group deflector means upon each occurrence of a predetermined relationship between records of the respective record groups, an auxiliary control member for the deflector means associated with the records of said predetermined record group, said auxiliary control member being actuable through a succession of alternately arranged effective and ineffective deflector operating control positions, a pair of complementally arranged actuating means for said auxiliary control member, each effective for advancing said control member from a related one of said control positions to the next succeeding control position, one of said actuating means being responsive to the operation of said first mentioned impulse actuating member and the other of said actuating means being responsive to the operation of said further impulse actuating member, disabling means effective upon the operation of said one actuating means for preventing concurrent operation of said other actuating means, and means for presetting said auxiliary control member in a variety of operative relationships to said actuating means, whereby in one setting said auxiliary control member is actuated to an ineffective control position upon the operation of said first mentioned impulse actuating member and in another setting said auxiliary control member is actuated to an effective control position upon the operation of said first mentioned impulse actuating member.

References Cited in the file of this patent

UNITED STATES PATENTS

| | | |
|---|---|---|
| 2,158,872 | Johnstone et al. | May 16, 1939 |
| 2,211,094 | Braun | Aug. 13, 1940 |
| 2,280,924 | McDonnell | Apr. 28, 1942 |
| 2,372,909 | Page et al. | Apr. 3, 1945 |
| 2,379,828 | Rubidge et al. | July 3, 1945 |
| 2,496,124 | Ferry | Jan. 31, 1950 |
| 2,562,252 | Wockewfuss | July 31, 1951 |
| 2,615,568 | Constance | Oct. 28, 1952 |
| 2,681,145 | Ferry et al. | June 15, 1954 |
| 2,702,629 | Schutt et al. | Feb. 22, 1955 |

FOREIGN PATENTS

| | | |
|---|---|---|
| 655,629 | Great Britain | July 25, 1951 |